US009819779B2

(12) United States Patent
Lee et al.

(10) Patent No.: US 9,819,779 B2
(45) Date of Patent: Nov. 14, 2017

(54) METHOD AND DEVICE FOR PROVIDING FUNCTION OF MOBILE TERMINAL

(71) Applicant: SAMSUNG ELECTRONICS CO., LTD., Suwon-si (KR)

(72) Inventors: Dae-ho Lee, Suwon-si (KR); Jung-hye Min, Yongin-si (KR); Kyung-ho Jeong, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 0 days.

(21) Appl. No.: 14/815,457

(22) Filed: Jul. 31, 2015

(65) Prior Publication Data
US 2016/0036953 A1 Feb. 4, 2016

(30) Foreign Application Priority Data

| Jul. 31, 2014 | (KR) | 10-2014-0098635 |
| Jan. 2, 2015 | (KR) | 10-2015-0000289 |
| Mar. 30, 2015 | (KR) | 10-2015-0044551 |

(51) Int. Cl.
*H04M 1/725* (2006.01)
*H04W 84/18* (2009.01)
(Continued)

(52) U.S. Cl.
CPC .......... *H04M 1/7253* (2013.01); *G06F 1/163* (2013.01); *H04M 1/05* (2013.01); *H04M 1/576* (2013.01);
(Continued)

(58) Field of Classification Search
None
See application file for complete search history.

(56) References Cited

U.S. PATENT DOCUMENTS

| 6,466,232 B1 * | 10/2002 | Newell | G06F 1/163 |
| | | | 345/3.1 |
| 7,127,261 B2 * | 10/2006 | Van Erlach | G06Q 30/0239 |
| | | | 455/41.2 |

(Continued)

FOREIGN PATENT DOCUMENTS

| KR | 10-1275859 A | 6/2013 |
| KR | 10-2014-0049999 A | 4/2014 |

OTHER PUBLICATIONS

Communication dated Dec. 11, 2015 issued by the International Searching Authority in counterpart International Patent Application No. PCT/KR2015/007900 (PCT/ISA/210, PCT/ISA/220 and PCT/ISA/237).

(Continued)

*Primary Examiner* — Matthew Sams
(74) *Attorney, Agent, or Firm* — Sughrue Mion, PLLC

(57) ABSTRACT

A mobile terminal includes a communicator configured to communicate with wearable devices; a memory configured to store capability information indicating capabilities of the wearable devices; and a processor configured to determine a first wearable device and a second wearable device among the wearable devices capable of executing a function of the mobile terminal, based on the capability information, the first wearable device being configured to perform a first sub-function for executing the function of the mobile terminal, the second wearable device being configured to perform a second sub-function to be executed together with the first sub-function to execute the function of the mobile terminal,
the processor being configured to control the first wearable device to perform the first sub-function and to control the second wearable device to perform the second sub-function.

24 Claims, 88 Drawing Sheets

(51) Int. Cl.
*H04M 1/60* (2006.01)
*G06F 1/16* (2006.01)
*H04M 1/05* (2006.01)
*H04M 1/57* (2006.01)

(52) U.S. Cl.
CPC .......... *H04M 1/6066* (2013.01); *H04W 84/18* (2013.01)

(56) References Cited

U.S. PATENT DOCUMENTS

| | | | |
|---|---|---|---|
| 7,248,894 B2* | 7/2007 | Fujieda | H04Q 9/04 340/506 |
| 7,418,281 B2* | 8/2008 | Guyette | H04M 1/72533 345/169 |
| 7,996,571 B2* | 8/2011 | Salokannel | G06F 13/385 455/567 |
| 9,131,332 B2* | 9/2015 | Newham | H04M 1/6066 |
| 9,148,473 B1* | 9/2015 | Sharma | H04L 67/10 |
| 2002/0068600 A1 | 6/2002 | Chihara et al. | |
| 2006/0178110 A1* | 8/2006 | Nurminen | A63B 24/0021 455/41.2 |
| 2007/0041582 A1* | 2/2007 | Lam | H04M 1/6058 379/441 |
| 2007/0233881 A1* | 10/2007 | Nochta | G06F 9/5044 709/228 |
| 2007/0281614 A1* | 12/2007 | Oliver | H04B 1/3805 455/41.2 |
| 2007/0281762 A1* | 12/2007 | Barros | H04M 1/6066 455/575.6 |
| 2008/0168436 A1* | 7/2008 | Shwartz | G06F 8/61 717/174 |
| 2008/0248750 A1* | 10/2008 | Tsui | H02J 7/0055 455/41.2 |
| 2009/0252311 A1 | 10/2009 | Kuiken | |
| 2010/0203833 A1* | 8/2010 | Dorsey | G06F 17/30035 455/41.2 |
| 2010/0240309 A1* | 9/2010 | Barbotin | H04B 1/71637 455/41.3 |
| 2013/0198694 A1 | 8/2013 | Rahman et al. | |
| 2014/0073256 A1 | 3/2014 | Newham et al. | |
| 2014/0086428 A1* | 3/2014 | Kim | H04M 1/6066 381/74 |
| 2014/0101755 A1 | 4/2014 | Tang | |
| 2014/0106677 A1 | 4/2014 | Altman | |
| 2014/0120839 A1* | 5/2014 | Lam | H04W 84/18 455/41.2 |
| 2014/0135644 A1 | 5/2014 | Kim | |
| 2014/0194064 A1* | 7/2014 | Murakami | H04W 4/008 455/41.2 |
| 2014/0334271 A1* | 11/2014 | Park | G04G 21/04 368/10 |
| 2015/0031301 A1* | 1/2015 | Holman | H04W 4/008 455/41.2 |
| 2015/0065055 A1* | 3/2015 | Newham | H04W 4/008 455/41.3 |
| 2015/0065893 A1* | 3/2015 | Ye | A61B 5/6898 600/483 |

OTHER PUBLICATIONS

Communication dated Apr. 19, 2016, issued by the European Patent Office in counterpart European Patent Application No. 15178686.0.

* cited by examiner

FIG. 40

| OPERATION | CAPABILITY |
|---|---|
| RELATED INFORMATION DISPLAY OPERATION | DISPLAY CAPABILITY |
| AUDIO INPUT OPERATION | AUDIO INPUT CAPABILITY |
| AUDIO OUTPUT OPERATION | AUDIO OUTPUT OPERATION |
| TRANSMISSION/ RECEPTION OPERATION | COMMUNICATION CAPABILITY |

FIG. 42

| OPERATION | CAPABILITY |
|---|---|
| RELATED INFORMATION DISPLAY OPERATION | DISPLAY CAPABILITY |
| AUDIO INPUT OPERATION | AUDIO INPUT CAPABILITY |
| AUDIO OUTPUT OPERATION | AUDIO OUTPUT OPERATION |
| TRANSMISSION/ RECEPTION OPERATION | COMMUNICATION CAPABILITY |

METHOD AND DEVICE FOR PROVIDING FUNCTION OF MOBILE TERMINAL

CROSS-REFERENCE TO RELATED APPLICATIONS

This application claims the benefit of Korean Patent Application No. 10-2014-0098635, filed on Jul. 31, 2014, Korean Patent Application No. 10-2015-0000289, filed on Jan. 2, 2015, and Korean Patent Application No. 10-2015-0044551, filed on Mar. 30, 2015, each filed in the Korean Intellectual Property Office, the disclosures of which are incorporated herein by reference in their entireties.

BACKGROUND

1. Field

One or more exemplary embodiments relate to a method of providing a function of a mobile terminal by using wearable devices connected to the mobile terminal, and an electronic device therefor.

2. Description of the Related Art

Various types of wearable devices may be operatively connected to a mobile terminal. One wearable device may be connected to the mobile terminal, or a plurality of wearable devices may be connected to the mobile terminal. These wearable devices may execute specific operations according to specific purposes. For example, a speaker or an earphone, which executes an audio output function of the mobile device, and a smart watch, which complements a display function of the mobile device, are commercially available. The mobile terminal performs a plurality of operations so as to execute a specific function. For example, the mobile terminal performs a radio wave transmission or reception operation, an audio input or output operation, and a user interface (UI) providing operation so as to execute a call function. An earphone with a microphone may be connected to the mobile terminal to execute an audio input or output function. However, since a general wearable device executes only a specific function, it may be difficult to execute all functions of the mobile terminal through a simple connection between a certain wearable device and the mobile terminal.

Therefore, there is a need for a system that is capable of executing a function of a mobile terminal by using operations of wearable devices connected to the mobile terminal according to a requested function, without separate user operations.

SUMMARY

Additional aspects will be set forth in part in the description which follows and, in part, will be apparent from the description, or may be learned by practice of the presented exemplary embodiments.

According to an aspect of an exemplary embodiment, a mobile terminal includes: a communicator configured to communicate with wearable devices; a memory configured to store capability information indicating capabilities of the wearable devices; and a processor configured to determine a first wearable device and a second wearable device among the wearable devices, based on the capability information, the first wearable device being configured to perform a first sub-function for executing a function of the mobile terminal, the second wearable device being configured to execute a second sub-function to be executed together with the first sub-function to execute the function of the mobile terminal, wherein the processor is configured to control the first wearable device to perform the first sub-function and to control the second wearable device to perform the second sub-function.

The processor may be configured to control the communicator to transmit, to the first wearable device, information about a user interface for executing the function of the mobile terminal.

The processor may be configured to access the capability information to determine a wearable device, which is capable of executing a sub-function for executing the function of the mobile terminal, among the wearable devices, as a wearable device that is to execute the sub-function.

The memory may be further configured to store mapping information which may include device performance information indicating device performance capabilities of the wearable devices and minimum performance information indicating a minimum performance required for executing the sub-function for executing the function of the mobile terminal, and the processor may be configured to access the device performance information and the minimum performance information to determine the wearable device that is to execute the sub-function for executing the function of the mobile terminal.

The processor may be configured to access the device performance information and the minimum performance information to determine the wearable device, which is capable of executing the sub-function with performance required for the sub-function for executing the function of the mobile terminal, as the wearable device that is to execute the sub-function.

The processor may be configured to access the device performance information and the minimum performance information to determine a wearable device, among the wearable devices, that is to execute a user interface for executing the function of the mobile terminal.

The processor may be configured to control the second sub-function to be executed by the second wearable device by using sub-function execution result data of the first wearable device, which is received from the first wearable device.

According to an aspect of another exemplary embodiment, a mobile terminal includes: a communicator configured to communicate with wearable devices; a memory configured to store capability information indicating capabilities of the wearable devices; and a processor configured to determine a first sub-function and a second sub-function based on the capability information, the first sub-function being configured to be executed by a first wearable device for executing a function of the mobile terminal, the second sub-function being configured to be executed by a second wearable device together with the first sub-function, so as to execute the function of the mobile terminal, wherein the processor may be configured to control the communicator to transmit information about the first sub-function to the first wearable device and transmit information about the second sub-function to the second wearable device.

According to an aspect of another exemplary embodiment, a mobile terminal includes: a communicator configured to communicate with wearable devices; a memory configured to store mapping information which maps sub-functions for executing a function of the mobile terminal to wearable devices that are to execute the sub-functions; and a processor configured to recognize connections of a first wearable device and a second wearable device, among the wearable devices, that are to perform the sub-functions based on the mapping information, wherein when the connection of the second wearable device is recognized, the processor may be configured to control the communicator to transmit, to the first wearable device, information for executing a first sub-function that is to be executed together with a second sub-function to be executed by the second wearable device to execute the function of the mobile terminal, and when the connection of the second wearable device is not recognized, the processor may be configured to control the communicator to transmit, to the first wearable device, information for executing the first sub-function which is to be executed, without executing the second sub-function of the second wearable device, to execute the function of the mobile terminal.

According to an aspect of another exemplary embodiment, a wearable device includes: a communicator configured to receive, from a mobile terminal, information for executing a first sub-function according to connection information indicating whether wearable devices that are to execute sub-functions for executing a function of the mobile terminal are connected to the mobile terminal; and a processor configured to, when other wearable device is connected to the mobile terminal, execute the first sub-function together with a second sub-function to be executed by the other wearable device to execute the function of the mobile terminal based on the information for executing the first sub-function and to, when other wearable device is not connected to the mobile terminal, execute the first sub-function, without the second sub-function of the other wearable device being executed, to execute the function of the mobile terminal, based on the information for executing the first sub-function.

According to an aspect of another exemplary embodiment, a method of executing a function of a mobile terminal includes: generating capability information indicating capabilities of wearable devices; determining a first wearable device and a second wearable device among the wearable devices based on the capability information, the first wearable device being configured to perform a first sub-function for executing a function of the mobile terminal, the second wearable device being configured to perform a second sub-function to be executed together with the first sub-function to execute the function of the mobile terminal; controlling the first wearable device to execute the first sub-function; and controlling the second wearable device to execute the second sub-function.

The method may further include transmitting, to the first wearable device, information about a user interface for executing the function of the mobile terminal.

The method may further include determining, based on the capability information, a wearable device, which is capable of executing a sub-function for executing the function of the mobile terminal, among the wearable devices, as a wearable device that is to execute the sub-function.

The method may further include storing, in the mobile terminal, mapping information including device performance information indicating device performance capabilities of the wearable devices and minimum performance information indicating a minimum performance required for executing the sub-function for executing the function of the mobile terminal, and the determining may include analyzing the device performance information and the minimum performance information to determine the wearable device that is to perform the sub-function for executing the function of the mobile terminal.

The determining may include analyzing the device performance information and the minimum performance information to determine the wearable device, which is capable of executing the sub-function with performance required for the sub-function for executing the function of the mobile terminal, as the wearable device that is to perform the sub-function.

The method may further analyzing using the device performance information and the minimum performance information to determine a wearable device, among the wearable devices, that is to execute a user interface for executing the function of the mobile terminal.

The method may further include determining the second sub-function to be executed by the second wearable device by using sub-function execution result data of the first wearable device, which is received from the first wearable device.

According to an aspect of another exemplary embodiments, a method of executing a function of a mobile terminal includes: generating capability information indicating capabilities of wearable devices; determining a first sub-function and a second sub-function based on the capability information, the first sub-function being configured to be executed by a first wearable device for executing a function of the mobile terminal, the second sub-function being configured to be executed by a second wearable device together with the first sub-function; transmitting information about the first sub-function to the first wearable device; and transmitting information about the second sub-function to the second wearable device.

According to an aspect of another exemplary embodiment, a method of executing a function of a mobile terminal includes: generating mapping information which maps sub-functions for executing a function of the mobile terminal to the wearable devices that are to perform the sub-functions; recognizing connections of a first wearable device and a second wearable device, among the wearable devices, that are to perform the sub-functions based on the mapping information stored in the memory; and transmitting information to the first wearable device, wherein the transmitting of the information to the first wearable device includes: when the connection of the second wearable device is recognized, transmitting, to the first wearable device, information for executing a first sub-function that is to be executed together with a second sub-function to be executed by the second wearable device to execute the function of the mobile terminal; and when the connection of the second wearable device is not recognized, transmitting, to the first wearable device, information for executing a first sub-function which is to be executed, without the second sub-function of the second wearable device being executed, to execute the function of the mobile terminal.

According to an aspect of another exemplary embodiment, a method of executing a sub-function of a wearable device includes: receiving information for executing a first sub-function according to connection information indicating whether wearable devices that are configured to perform sub-functions for executing a function of the mobile terminal are connected to the mobile terminal; when another wearable device is connected to the mobile terminal, executing the first sub-function together with a second sub-function to be executed by the other wearable device so as to execute the function of the mobile terminal based on the information for executing the first sub-function; and when other wearable device is not connected to the mobile terminal, executing the first sub-function, without the second sub-function of the other wearable device being executed, so as to execute the function of the mobile terminal, based on the information for executing the first sub-function.

According to an aspect of another exemplary embodiment, there is provided a non-transitory computer-readable recording medium having embedded thereon a program for causing a computer to execute one of the above-described methods.

BRIEF DESCRIPTION OF THE DRAWINGS

These and/or other aspects will become apparent and more readily appreciated from the following description of the exemplary embodiments, taken in conjunction with the accompanying drawings in which:

FIG. 40 is a diagram for describing a data structure in which a mobile terminal stores capability information corresponding to an operation, according to an exemplary embodiment;

FIG. 42 is a diagram illustrating operations performed when a mobile terminal executes functions, and capabilities required for the operations, according to an exemplary embodiment;

DETAILED DESCRIPTION

Figure 1:
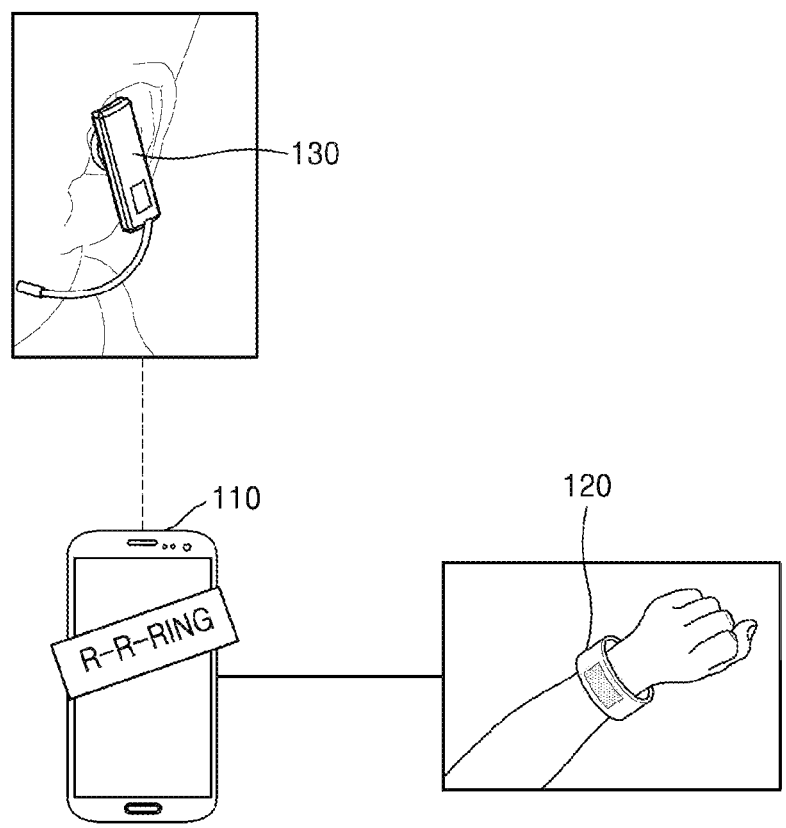
FIG. 1 is a diagram for describing a function providing system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions in regard to the exemplary embodiments, but the terms may vary according to the intention of those of ordinary skill in the art, precedents, or new technology in the art. In addition, specified terms may be selected by the applicant, and in this case, the detailed meaning thereof will be described in the detailed description of the exemplary embodiments. Thus, the terms used in the specification should be understood not as simple names but based on the meaning of the terms and the overall description of the exemplary embodiments.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The term "short-range wireless communication" as used herein may refer to at least one of wireless LAN (Wi-Fi), Bluetooth, ZigBee, Wi-Fi Direct (WFD), Ultra Wideband (UWB), Infrared Data Association (IrDA), Bluetooth Low energy (BLE), near field communication (NFC), and Ant+, but is not limited thereto.

Wireless LAN (Wi-Fi) may include an infrastructure mode in which an access point (AP) that transmits a wireless signal exchanges data with terminals within a predetermined range around the AP, and an ad-hoc mode in which terminals mutually exchange data in a peer-to-peer (P2P) way without the AP.

Bluetooth is a standard technology for wireless communication devices that perform wireless communication therebetween within a short range by using low power. UWB is a wireless communication technology used to transmit a large amount of data in a short period via a large spectrum frequency by using low power.

WFD is a new version of Wi-Fi technology and is mainly characterized in that WFD incorporates direct communication between devices. For example, devices in which WFD is installed may communicate with each other and share information with each other even when no hotspot, router, or AP is provided.

ZigBee is one of the IEEE 802.15.4 standards that support short-range wireless communication. ZigBee is a technology for short-range wireless communication within a distance of 10 m to 20 m and ubiquitous computing in a wireless networking environment such as one that is established in a house or an office.

BLE refers to a core function of Bluetooth V 4.0 that is one of the short range communication technologies. BLE may have a relatively small duty cycle compared to a classic Bluetooth specification, may be produced at low costs, and may operate for several years with a coin-sized battery due to reduced mean power and standby power.

NFC, which is a sort of radio frequency ID (RFID) or electronic tag, refers to non-contact short range wireless communication using a frequency band of 13.56 MHz. NFC enables data communication between devices at a distance of 10 cm through a short range wireless communication technology. NFC may include a P2P mode, a reader/writer (RAN) mode, and a card emulation mode. Ant+ refers to a wireless communication technology with low power consumption and is used for short range communication by using a frequency band of 2.4 GHz.

The exemplary embodiments will be described with reference to the accompanying drawings in such a manner that the exemplary embodiments may be easily be carried out by a person of ordinary skill in the art. However, the exemplary embodiments may be implemented in various forms and are not limited to the exemplary embodiments described herein. In addition, descriptions of well-known functions and constructions will be omitted for clarity and conciseness, and similar reference numerals are assigned to similar components throughout the specification.

FIG. 1 is a diagram for describing a function providing system according to an exemplary embodiment.

Referring to FIG. 1, the function providing system according to the exemplary embodiment may include a mobile terminal 110, a first wearable device 120, and a second wearable device 130. The mobile terminal 110 according to the exemplary embodiment may provide a function of the mobile terminal 110 by using operations of the mobile terminal 110 and the wearable devices 120 and 130 according to connection states of the wearable devices 120 and 130 connected to the mobile terminal 110.

The term "function" as used herein may refer to an execution of at least one operation for achieving a specific objective. The execution of at least one operation for executing the function may refer to an execution of at least one sub-function for executing the function.

For example, the function as used herein may be executed by executing at least one sub-function for achieving a specific objective. For example, in a case where the execution of at least one operation is required for executing the function, the function may be executed by executing each sub-function for performing each operation. The sub-function required for executing the function may be executed to perform an operation corresponding to each sub-function.

The term "capability" may refer to whether or not a specific type of operation is capable of being performed. The function, the capability, and the operation may be described with respect to a device. Executing the function of the device may refer to performing at least one operation that is performed by the device so as to achieve a specific objective.

The capability of the device may refer to whether or not a specific device is capable of performing a specific type of operation.

Examples of the function may include a call function, a privacy protection function, a memo function, a multimedia playback function, a biometric information measuring function, and a navigation function. However, the exemplary embodiments are not limited thereto. Examples of the capability may include a communication capability, an information storage capability, an audio output capability, and a display capability. However, the exemplary embodiments are not limited thereto. Examples of the operation may include a communication operation, an information storage operation, an audio output operation, and a display operation. However, the exemplary embodiments are not limited thereto. The execution of each operation may refer to the execution of the sub-function of the function. A function type, a capability type, and an operation type for determining the function, the capability, and the operation may be determined in advance.

The function, the capability, and the operation will be described in more detail with reference to the call function. The mobile terminal 110, which executes the call function, may execute a communication operation of performing wireless communication with a base station by using a 2G, 3G, or 4G communication method, an audio output operation of providing a user with received audio data as audio information by using a speaker, and an audio input operation of generating voice data by recording a voice of a user from a microphone, as executions of a plurality of sub-functions for executing the call function. In addition, the mobile terminal 110 may perform the call function by performing an operation of providing a user interface (UI).

The function, the capability, and the operation of the privacy protection function will now be described. The mobile terminal 110 may perform the privacy protection function by performing a display operation of displaying a UI for inquiring of a user about whether to start a privacy protection mode by using a display unit, an audio output operation of providing the user with information to be provided to the user as audio information when the mode is the privacy protection mode, and a display operation of providing the user with information to be provided to the user as visual information when the mode is not the privacy protection mode, as executions of a plurality of sub-functions for executing the privacy protection function.

The capability of a device may be determined according to the operation type of the device, based on whether the corresponding device has a specific capability. For example, if an earphone is capable of performing an audio output operation, the device may be determined as having an audio output capability. If the earphone further includes a microphone and is capable of performing an audio input operation by executing audio recording, the device may be determined as having an audio input capability. If the earphone is capable of performing a Bluetooth communication operation, the device may be determined as having a wireless communication capability.

For example, the device may perform the operation according to the capability thereof. The device may execute a specific function by performing at least one operation.

For example, the mobile terminal 110 may execute the call function. The mobile terminal 110 may execute the call function by performing the communication operation, the audio output operation, and the audio input operation. In this example, the mobile terminal 110 may include the communication capability, the audio output capability, and the audio input capability so as to execute the call function. For example, the call function may include an audio input operation performed by using a microphone having the audio input capability, an audio output operation performed by using a speaker having the audio output capability, and a communication operation performed by using a communication unit having the communication capability.

The mobile terminal 110 according to the exemplary embodiment may provide the function of the mobile terminal 110 by using operations performed by a plurality of wearable devices connected to the mobile terminal 110. The mobile terminal 110 according to the exemplary embodiment may determine whether the plurality of wearable devices are connected to the mobile terminal 110. The mobile terminal 110 according to the exemplary embodiment may acquire, from the wearable device, information about operations that may be performed by the wearable device connected to the mobile terminal 110. Alternatively, the mobile terminal 110 according to the exemplary embodiment may previously store, in a memory, information about operations that may be performed by the wearable device connected to the mobile terminal 110. The mobile terminal 110 may determine whether the wearable device is capable of performing the operation, and execute the function of the mobile terminal 110 by interworking with the operations of the wearable devices connected to the mobile terminal 110.

The mobile terminal 110 according to the exemplary embodiment may execute the connection to at least one wearable device. The mobile terminal 110 may transmit and receive data by executing the connection to at least one wearable device. The mobile terminal 110 may be a portable terminal such as a smart phone and a tablet personal computer (PC), a stationary terminal such as a desktop PC, or a repeater such as a home network server. However, the exemplary embodiments are not limited thereto.

The mobile terminal 110 may identify a wearable device connected thereto. The mobile terminal 110 may generate capability information, that is, information about operations that may be performed by the wearable device connected thereto. For example, the mobile terminal 110 may receive, from the wearable device, information about operations that may be performed by the wearable device connected thereto. The mobile terminal 110 may receive the capability information about the wearable device from the wearable device and store the capability information about the wearable device in a storage. The mobile terminal 110 may include at least one of a memory and a database as the storage. Alternatively, the mobile terminal 110 may prestore capability information about some wearable devices. For example, the mobile terminal 110 may prestore capability information about wearable devices, released by the same company, in the storage. Alternatively, the mobile terminal 110 may receive information about operations that may be performed by the wearable device from the wearable device or an external device (for example, a PC or a server), instead of prestoring the capability information. For example, when the mobile terminal 110 is connected to the wearable device, the mobile terminal 110 may receive, from the wearable device, capability information about the wearable device connected thereto. Various situations or conditions in which the mobile terminal 110 receives the capability information about the wearable device will be described below in detail with reference to exemplary embodiments.

The capability information about the wearable device, which is stored in the storage, may be updated. For example, in a case where the mobile terminal 110 receives new capability information in such a state that the mobile terminal 110 stores the capability information, the mobile terminal 110 may update the prestored capability information. In order to update the capability information, the mobile terminal 110 may request the capability information from the wearable device when the mobile terminal 110 is connected to the wearable device, or may periodically request the capability information from the wearable device after the mobile terminal 110 is connected to the wearable device. Alternatively, upon occurrence of an event such as a user input, the mobile terminal 110 may request the capability information from the wearable device. In order to update the capability information, the mobile terminal 110 may request the capability information from an external device, such as a PC or a server.

In a case where the capability information about the wearable device is updated, all of the capability information about the operations that may be performed by the wearable device may be received and updated, or only the capability information about the wearable device corresponding to a specific function of the mobile terminal may be received and updated. Alternatively, only the information changed in the prestored capability information about the mobile terminal 100 may be partially updated.

The updating of the capability information may be managed with version information. For example, the mobile terminal 110 may compare the version information of the prestored capability information with the version information of the new capability information for updating and perform updating when the version information of the new capability information is later than the version information of the prestored capability information. The magnitudes of the capabilities may be compared by comparing the operation performance. The performance at which the wearable device performs a specific operation may be expressed with performance information. The magnitudes of the capabilities may be compared by using the performance information. As described above, the performance at which the wearable device performs a specific operation may be managed with the performance information. The performance information may be prestored in the wearable device, or the performance information measured by the wearable device may be stored. Alternatively, the mobile terminal 110 may receive the performance information about the wearable device from the wearable device and store and mange the performance information about the wearable device. The performance information may be managed in a state of being included in the capability information. The performance information may be updated. For example, in a case where the mobile terminal 110 receives new performance information in such a state that the mobile terminal 110 stores the capability information, the mobile terminal 110 may update the prestored performance information. In order to update the performance information, the mobile terminal 110 may request the wearable device for the performance information when the mobile terminal 110 is connected to the wearable device, or may periodically request the wearable device for the performance information after the mobile terminal 110 is connected to the wearable device. Alternatively, upon occurrence of an event such as a user input, the mobile terminal 110 may request the wearable device for the performance information. In order to update the performance information, the mobile terminal 110 may request the external device, such as a PC or a server, for the performance information.

An example of comparing the magnitudes of the capabilities by using the performance information will be described below. For example, when data transmission performance information about the first wearable device 120, which performs a wireless communication operation by using an orthogonal frequency division multiplexing (OFDM) communication method, has a greater value than data transmission performance information about the second wearable device 130, which performs a wireless communication operation by using a code division multiple access (CDMA) communication method, it may be determined that the data transmission performance of the first wearable device 120 is higher than the data transmission performance of the second wearable device. In this manner, the mobile terminal 110 may compare the data transmission performance information about the first and second wearable devices 120 and 130 and determine that the data transmission capability of the first wearable device 120 is relatively higher than the data transmission capability of the second wearable device 130. In addition, the mobile terminal 110 may determine that the wireless communication capability including the data transmission capability is relatively higher in the first wearable device 120 than in the second wearable device 130.

The performance information may be expressed by using a commonly used unit according to a capability type. Accordingly, the magnitudes of the capabilities may be numerically compared with each other. For example, the wireless communication capabilities may be compared with each other based on a bit rate per second. The mobile terminal 110 may determine whether to use the operation of the wearable device according to a connection state of the wearable device connected thereto. For example, when the wearable device is disconnected from the mobile terminal 110, the mobile terminal 110 may determine not to use the operation of the wearable device.

The mobile terminal 110 may determine whether to use the operation of the wearable device according to a setting state of the wearable device connected thereto. For example, the wearable device may be set such that the control from other devices is not allowed. In this case, the mobile terminal 110 may not control the corresponding wearable device. Therefore, the mobile terminal 110 may determine not to use the operation of the corresponding wearable device.

The first wearable device 120 and the second wearable device 130, according to an exemplary embodiment, may be devices that are connected to the mobile terminal 110 to transmit data to the mobile terminal 110 and receive data from the mobile terminal 110. The wearable device may refer to a device used while being worn on or attached to the user's body. However, the exemplary embodiments are not limited thereto. The first wearable device 120 and the second wearable device 130 may be devices that operate at positions spaced apart from the user's body.

The first wearable device 120 and the second wearable device 130, according to an exemplary embodiment, may be connected to the mobile terminal 110 via a wired or wireless network. For example, the first wearable device 120 and the second wearable device 130 may be connected to the mobile terminal 110 via the same network. According to another exemplary embodiment, the first wearable device 120 and the second wearable device 130 may be connected to the mobile terminal 110 via different networks.

The first wearable device 120 and the second wearable device 130, according to an exemplary embodiment, may provide the mobile terminal 110 with executable operation information thereof and/or capability information thereof. The first wearable device 120 and the second wearable device 130, according to an exemplary embodiment, may perform the relevant operations in response to an operation execution request from the mobile terminal 110.

Figure 2:
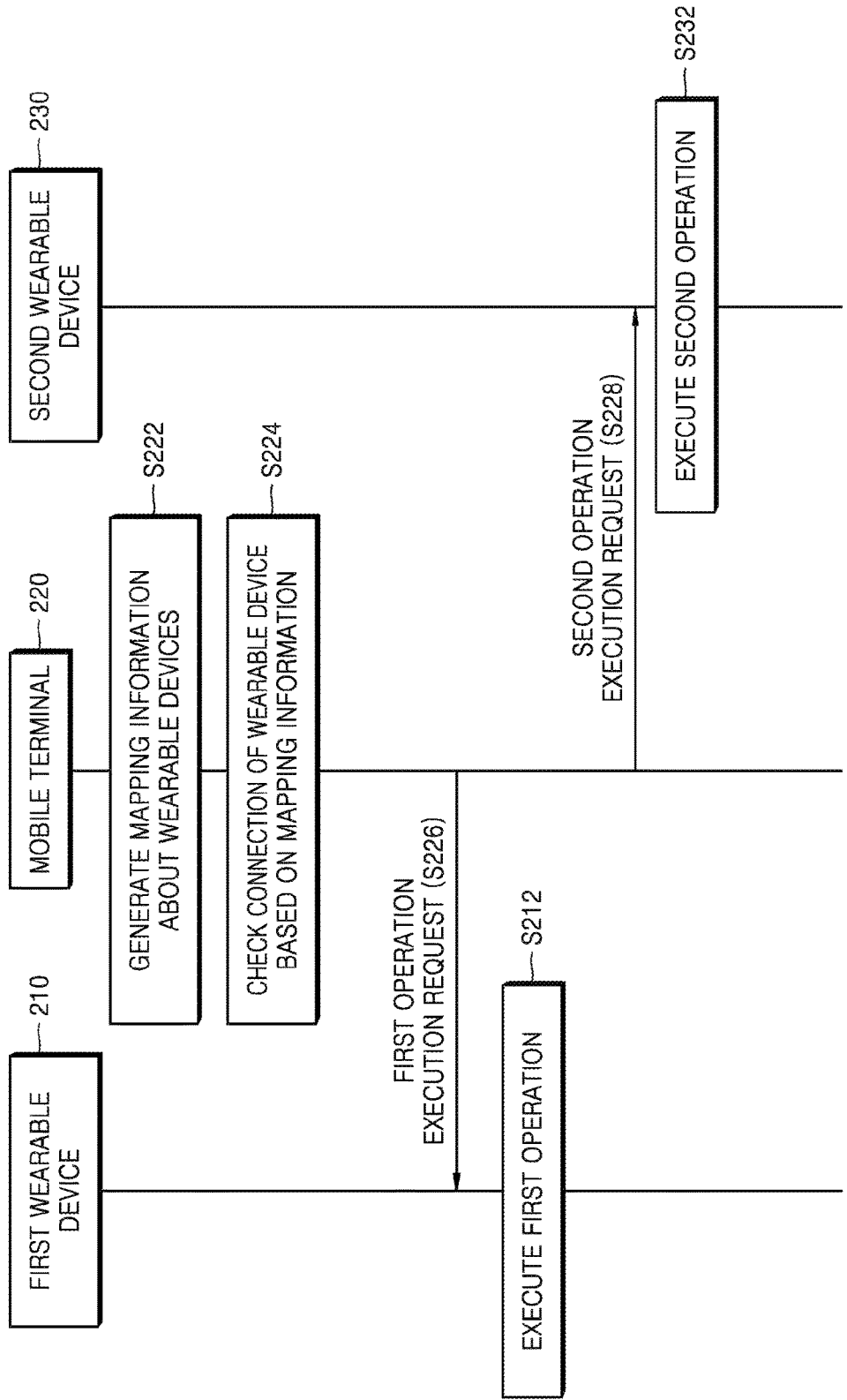
FIG. 2 is a flowchart of an operation of a function providing system, according to an exemplary embodiment.

FIG. 2 is a flowchart of the operation of the function providing system, according to an exemplary embodiment. In operation S222, a mobile terminal 220 may generate mapping information about a plurality of wearable devices. The mapping information may be information indicating a wearable device that performs an operation required when a specific function is executed. For example, the mapping information may indicate an operation required when a specific function is executed. The mapping information may indicate a wearable device used for performing a required operation. For example, the mapping information may indicate that a request to execute a specific operation is to be transmitted to a specific device. The mapping information may include information about which operation is performed by a specific device used for executing a specific function.

For example, in order to execute the call function, the mobile terminal 220 may set the mapping information as follows. The mapping information may indicate that an audio output operation is performed by using an earphone from among wearable devices. The mapping information may indicate that an audio output request and audio data are to be transmitted to the earphone from among the wearable devices. The mapping information may indicate that an audio input operation is performed by using a microphone from among the wearable devices. The mapping information may indicate that an audio input request is to be transmitted to the microphone from among the wearable devices. The microphone may be provided inside the earphone. The mapping information may indicate that a UI provided to the user so as to execute the call function is provided to a smart watch. The mapping information may indicate that UI data and a request to execute the UI provided to the user so as to execute the call function should be transmitted to the smart watch.

According to another exemplary embodiment, in order to execute the privacy protection function, the mobile terminal 220 may set the mapping information as follows. The mapping information may indicate that a UI provided to the user so as to execute the privacy protection function is provided to the smart watch. The mapping information may indicate that UI data and a request to execute the UI provided to the user so as to execute the privacy protection function should be transmitted to the smart watch. When the information to be provided to the user is private information, the mobile terminal 220 may provide the information in the form of auditory information through the earphone. When the information to be transmitted to the user is not private information, the mobile terminal 220 may provide the information in the form of visual information through the smart watch. In order for the mobile terminal 220 to provide such information to the user, the mapping information may indicate that the auditory information is to be provided through the earphone from among the wearable devices and the visual information is to be provided to the smart watch from among the wearable devices. The mobile terminal 220 may use the mapping information to determine to which wearable device the auditory information is to be provided and to which wearable device the visual information is to be provided.

According to another exemplary embodiment, in order to execute the music playback function, the mobile terminal 220 may set the mapping information as follows. The mapping information may indicate that an audio output operation is performed by using the earphone from among the wearable devices. The mapping information may indicate that an audio output request and music audio data are to be transmitted to the earphone from among the wearable devices. The mapping information may indicate that a UI provided to the user so as to execute the music playback function is provided to the smart watch. The mapping information may indicate that UI data and a request to execute the UI provided to the user so as to execute the music playback function should be transmitted to the smart watch.

The mobile terminal 220 may prestore mapping information about at least one wearable device in a memory. Alternatively, when the wearable devices are connected to the mobile terminal 220, the mobile terminal 220 may generate mapping information about operations performed by the wearable devices through a communication method or a communication module by which the wearable devices are connected. Alternatively, the mobile terminal 220 may download capability information about at least one wearable device from the external device, such as a PC or a server, or may directly receive capability information about at least one wearable device from the corresponding wearable device. The mapping information may be periodically updated. For example, in a case where the mobile terminal 220 receives new mapping information in such a state that the mobile terminal 220 stores the mapping information, the mobile terminal 220 may update the prestored mapping information. In order to update the mapping information, the mobile terminal 220 may request the mapping information from the wearable device when the mobile terminal 110 is connected to the wearable device, or may periodically request the mapping information from the wearable device after the mobile terminal 110 is connected to the wearable device. Alternatively, upon occurrence of an event such as a user input, the mobile terminal 110 may request the mapping information from the wearable device. In order to update the mapping information, the mobile terminal 110 may request the mapping information from an external device, such as a PC or a server.

In operation S224, the mobile terminal 220 may check the connection of the wearable device based on the mapping information. The mobile terminal 220 may check whether the wearable device having been connected to the mobile terminal 220 still maintains the connection to the mobile terminal 220, based on the mapping information. For example, the mobile terminal 220 may check whether the mobile terminal 220 is connected to the wearable device designated in the mapping information, with reference to the mapping information, so as to execute the call function. For example, the mobile terminal 220 may check whether the earphone for audio output is connected to the mobile terminal 220, with reference to the mapping information. The mobile terminal 220 may be connected to the earphone by using a wireless communication method, such as Bluetooth or ZigBee. For example, the mobile terminal 220 may check whether the smart watch for providing a UI is connected to the mobile terminal 220, with reference to the mapping information. The mobile terminal 220 may be connected to the smart watch by using a wireless communication method, such as Bluetooth or ZigBee.

In operation S226, the mobile terminal 220 may transmit a first operation execution request to the first wearable device 210. The mobile terminal 220 may transmit the first operation execution request to the operation executing subject determined based on the mapping information.

For example, the mobile terminal 220 may transmit the operation execution request to the wearable device designated in the mapping information, with reference to the mapping information, so as to execute the call function. For example, when the first operation is the audio output operation, the mobile terminal 220 may transmit audio data and a request to execute the audio output operation to the earphone, with reference to the mapping information, so as to output audio data. Alternatively, when the first operation is the UI providing operation, the mobile terminal 220 may transmit UI data and a request to provide the UI to the smart watch, with reference to the mapping information, so as to provide the UI.

In operation S212, the first wearable device 210 may perform the first operation. The first wearable device 210 may perform the first operation in response to the first operation execution request received from the mobile terminal 220. The first wearable device 210 may generate a first operation execution result as a result of performing the first operation. The first operation execution result may be an output generated when the first wearable device 210 performs the first operation and may be generated as many different types of output information. For example, the first wearable device 210 may perform the first operation to output audio data, output a vibration, display a screen, or generate data-processing result data. The output generated by the first wearable device 210 is not limited to the above examples. Optionally, the first wearable device 210 may transmit the first operation execution result to the mobile terminal 220. The first wearable device 210 may transmit result data, which is generated as the first operation execution result, to the mobile terminal 220.

In operation S228, the mobile terminal 220 may transmit a second operation execution request to the second wearable device 230. The mobile terminal 220 may transmit the second operation execution request to the second wearable device 230 by using the mapping information. The second operation execution request may be transmitted before the first wearable device performs the first operation, may be transmitted at the same time as the execution of the first operation, or may be transmitted after the execution of the first operation is completed.

The mobile terminal 220 may transmit the second operation execution request to the second wearable device 230 such that the second operation to be performed at the same time as the operation of the first wearable device is performed by the second wearable device so as to execute the function of the mobile terminal 220. The execution of the first operation and the second operation at the same time is not limited to the simultaneous execution of the first and second operations, and may alternatively refer to both the first operation and the second operation being performed within a certain time frame of each other so as to execute the function of the mobile terminal 220.

The mobile terminal 220 may transmit the second operation execution request to the operation executing subject determined based on the mapping information. For example, when the second operation is the audio output operation, the second operation execution request may be transmitted to the second wearable device capable of performing the audio output operation based on the mapping information.

In operation S232, the second wearable device 230 may perform the second operation. The second wearable device 230 may perform the second operation in response to the second operation execution request received from the mobile terminal 220.

Figure 3:
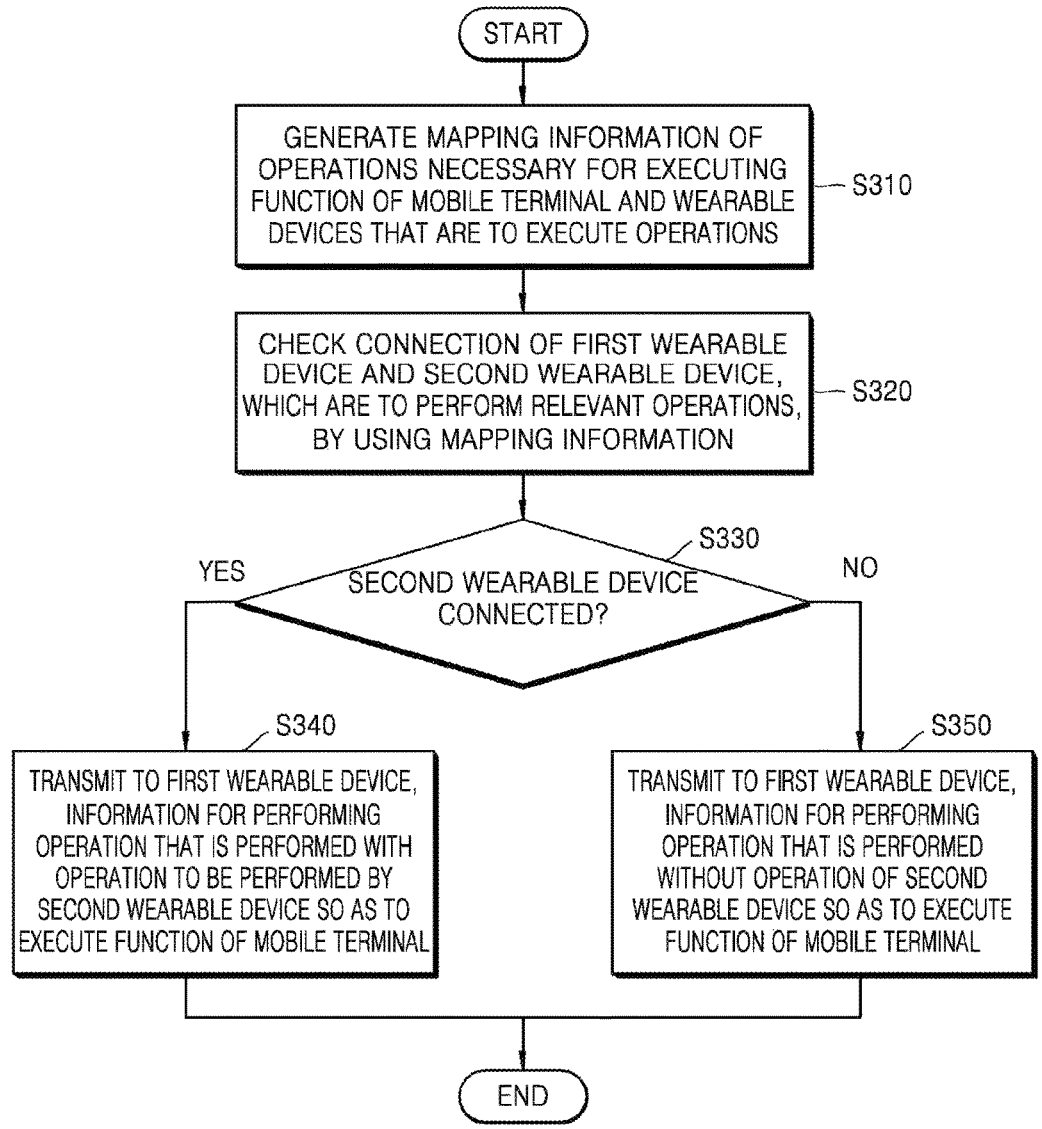
FIG. 3 is a flowchart of an operation of a mobile terminal, according to an exemplary embodiment.

FIG. 3 is a flowchart of the operation of the mobile terminal 220, according to an exemplary embodiment. In operation S310, the mobile terminal 220 according to the exemplary embodiment may generate mapping information about operations for executing the function of the mobile terminal 220 and wearable devices that are to execute the operations.

As described above, the function may include at least one operation. In addition, the operation may be stereotyped according to the capability. The mapping information may indicate which operation is capable of being performed by the wearable device connected to the mobile terminal 220. Furthermore, the mapping information may indicate whether the wearable device is connected to the mobile terminal 220.

As described above, the mobile terminal 220 may prestore the mapping information about at least one wearable device in the memory. When the wearable device is connected to the mobile terminal 220, the mobile terminal 220 may store, in the memory, information about a communication method or a communication module by which the wearable device is connected to the mobile terminal 220 and generate the mapping information about the operations performed by the wearable device. Alternatively, the mobile terminal 220 may generate the mapping information by downloading capability information about at least one wearable device from the external device, such as a PC or a server, or by directly receiving capability information about at least one wearable device from the corresponding wearable device and storing the received capability information in the memory. The memory may include any type of storage medium. Examples of the memory may include a volatile memory and a non-volatile memory. The memory may include a disk-shaped storage medium.

In operation S320, the mobile terminal 220 may check the connection of the first wearable device 210 and the second wearable device 230, which are to perform the relevant operations, by using the mapping information stored in the memory. The connection may refer to a connection by which two different devices perform communication and are in a data transmittable or receivable state. The connection may include a connection via a wireless communication and/or a wired communication.

The mobile terminal 220 may transmit information to the first wearable device 210. The type of the transmitted information is not limited to any particular type. More specifically, in operation S330, the mobile terminal 220 may determine whether the second wearable device 230 is connected thereto.

The mobile terminal 220 may determine whether the second wearable device 230 is connected to the mobile terminal 220, by using connection information about the second wearable device 230 which is included in the mapping information. For example, in a case where the mapping information indicates that the second wearable device 230 is connected to the mobile terminal 220, the mobile terminal 220 may determine that the second wearable device 230 is connected thereto. In a case where the mapping information indicates that the second wearable device 230 is not connected to the mobile terminal 220, the mobile terminal 220 may determine that the second wearable device 230 is not connected thereto.

Alternatively, in order to determine whether the second wearable device 230 is connected to the mobile terminal 220 so as to perform a specific operation, the mobile terminal 220 may use the mapping information to determine whether the second wearable device 230 connected thereto is present with respect to a specific communication module or a specific communication method.

In a case where a specific wearable device is connected with respect to the specific communication module or the specific output method, the mapping information may store information about the connected specific wearable device with respect to the specific communication module or the specific output method.

Alternatively, in order to determine whether the second wearable device 230 is connected to the mobile terminal 220 so as to perform a specific operation, the mobile terminal 220 may use the mapping information to determine whether the second wearable device 230 capable of performing the specific operation is present. The mapping information may include information about the wearable device capable of performing the operation. In a case where a specific wearable device is connected, the mapping information may store information about whether the specific wearable device is connected.

In operation S340, when the second wearable device 230 is connected to the mobile terminal 220, the mobile terminal 220 may transmit, to the first wearable device 210, information for performing an operation that is performed together with an operation to be performed by the second wearable device so as to execute the function of the mobile terminal 220.

The mobile terminal 220 may distribute operations, which are to be performed so as to execute the function of the mobile terminal 220, to the wearable devices connected to the mobile terminal 220.

For example, in order to execute the call function, the mobile terminal 220 may distribute a video output operation to the first wearable device 210 having a video output capability and distribute an audio input or output operation to the second wearable device 230 having an audio input or output capability.

As described above, the feature of the operations being performed at the same time may refer to the executions of the respective operations being concurrently performed so as to execute the function of the mobile terminal 220. A specific associative relation, a specific relative relation, or a specific anteroposterior relation may exist between the respective operations. For example, whether to perform the second operation may be determined according to the execution result of the first operation, or the method of performing the second operation may be changed according to the execution result of the first operation. Therefore, the first operation and the second operation may be performed in association with each other. Since the second operation may be performed at the same time as the first operation or may be performed before or after the first operation, the first operation and the second operation may have an anteroposterior relation. Alternatively, the second operation may be performed by an identical or similar operation to the first operation, or the second operation may be performed in association with the identical or similar operation. However, the above-described relations may not exist between the operations.

In operation S350, when the second wearable device 230 is not connected to the mobile terminal 220, the mobile terminal 220 may transmit, to the first wearable device 210, information for performing an operation that is performed without an operation of the second wearable device so as to execute the function of the mobile terminal 220. In a case where a plurality of wearable devices are not connected or the operation cannot be distributed to the plurality of wearable devices, the mobile terminal 220 may distribute the operation to only one wearable device.

For example, in a case where the first wearable device 210 capable of performing the video output operation is connected, the mobile terminal 220 may transmit information for performing the video output operation to the first wearable device 210, while performing the audio input or output operation.

Figure 4:
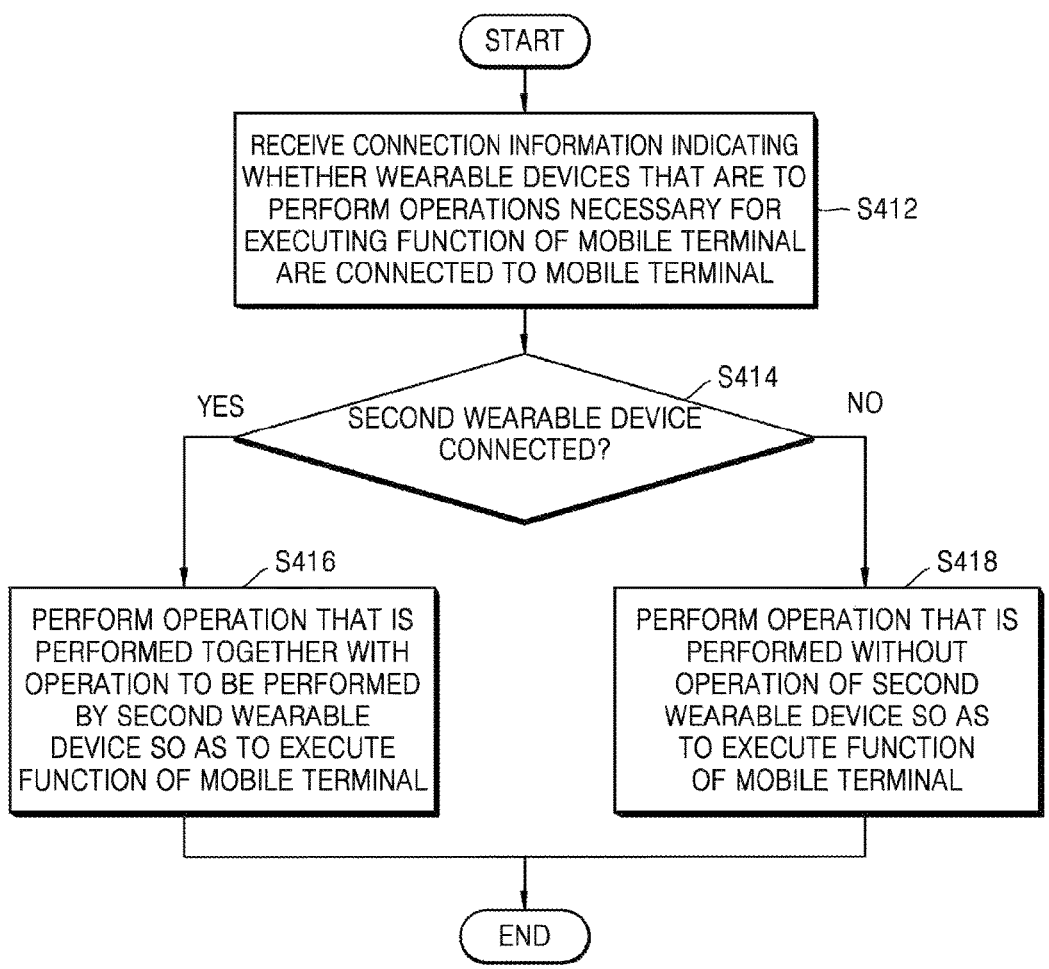
FIG. 4 is a flowchart of an operation of a first wearable device, according to an exemplary embodiment.

FIG. 4 is a flowchart of an operation of the first wearable device 210, according to an exemplary embodiment. The operation of the first wearable device 210, according to the exemplary embodiment, will be described with reference to FIG. 4.

In operation S412, the first mobile terminal 210 according to the exemplary embodiment may receive connection information from the mobile terminal 220. The connection information may be information indicating whether the wearable devices that are to perform operations for executing the function of the mobile terminal 220 are connected to the mobile terminal 220.

In operation S414, the first wearable device 210 may determine whether the second wearable device 230 is connected to the mobile terminal 220, based on the connection information about the wearable devices that is received from the mobile terminal 220. When the connection information about the wearable devices that is received from the mobile terminal 220 indicates that the second wearable device 230 is connected to the mobile terminal 220, the first wearable device 210 may determine that the second wearable device 230 is connected to the mobile terminal 220.

In operation S416, when the second wearable device 230 is connected to the mobile terminal 220, the first wearable device 210 may perform an operation that is performed together with an operation to be performed by the second wearable device 230 so as to execute the function of the mobile terminal 220.

In operation S418, when the second wearable device 230 is not connected to the mobile terminal 220, the first wearable device 210 may perform an operation that is performed without the operation of the second wearable device 230 so as to execute the function of the mobile terminal 220.

FIGS. 5 to 24 are diagrams for describing a method of providing a call function of a mobile terminal 110 in a function providing system, according to an exemplary embodiment.

Figure 5:
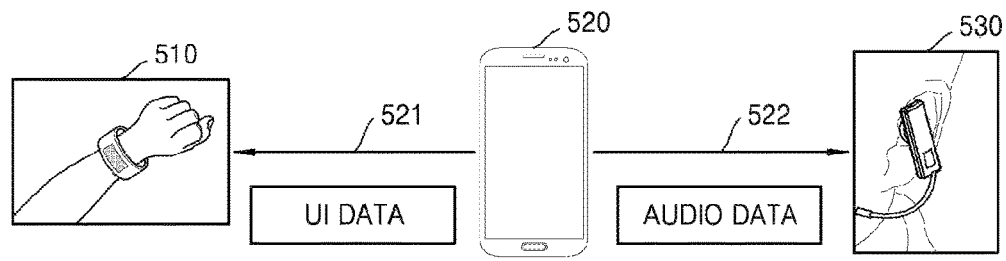
FIGS. 5, 6, 7, 8, 9, 10, 11, 12, 13, 14, 15, 16, 17, 18, 19, 20, 21, 22, 23 and 24 are diagrams for describing a method by which a function providing system provides a call function of a mobile terminal, according to an exemplary embodiment.

FIG. 5 is a conceptual diagram for describing the function providing system for providing the call function, according to an exemplary embodiment.

The function providing system for providing the call function, according to the exemplary embodiment, may include a smart watch 510, a smart phone 520, and an earphone 530.

The smart phone 520 may correspond to the above-described mobile terminal 110. The smart watch 510 may correspond to the above-described first wearable device 120 and the earphone 530 may correspond to the above-described second wearable device 130. It is assumed that the earphone 530 includes a microphone.

The terms "first" and "second" used in the first wearable device 120 and the second wearable device 130 are conceptually used for convenience of discrimination. In another exemplary embodiment, the smart watch 510 may correspond to the above-described second wearable device 130 and the earphone 530 may correspond to the above-described first wearable device 120.

Referring to FIG. 5, the smart phone 520 may be connected to the smart watch 510 and the earphone 530. A communication method between the smart phone 520 and the smart watch 510 may be equal to or different from a communication method between the smart phone 520 and the earphone 530. For example, the smart phone 520 may communicate with the smart watch 510 through a Bluetooth connection, and the smart phone 520 may communicate with the earphone 530 through a wired connection. Alternatively, the smart phone 520 may communicate with the earphone 530 through Bluetooth connection. Many other communication protocols may also be employed according to other exemplary embodiments.

In operation 521, the smart phone 520 may provide UI data to the smart watch 510 such that the smart watch 510 controls the call function. In operation 522, the smart phone 520 may provide audio data to the earphone 530 so as to execute the call function. The UI is a device or software that enables smooth interaction between the user and the mobile terminal 520 or between the user and the wearable devices 510 and 530.

Figure 6:
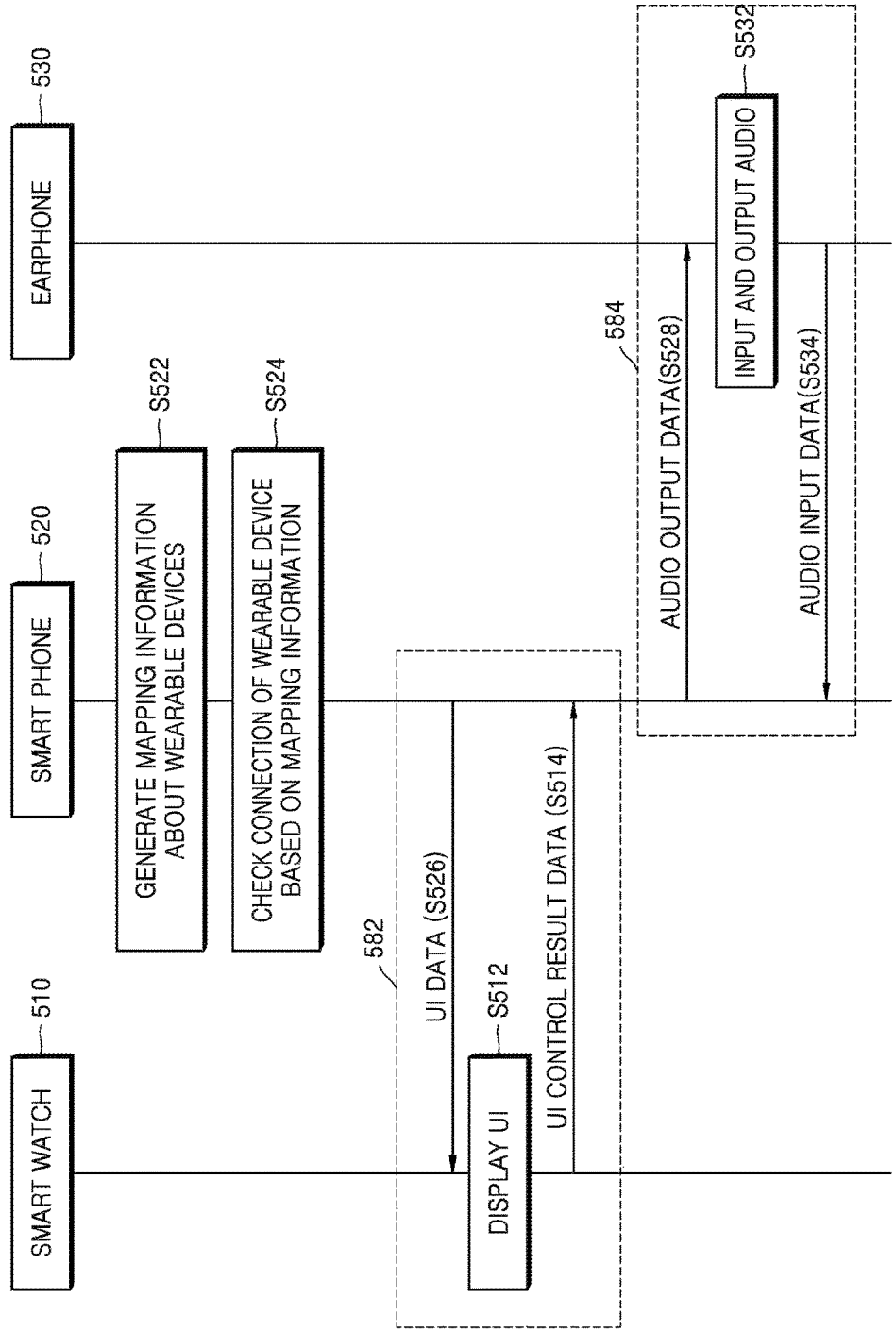

FIG. 6 is a flowchart of a method performed by the system of FIG. 5 to provide the call function, according to an exemplary embodiment.

In operation S522, the smart phone 520 may generate mapping information about a plurality of wearable devices. In operation S524, the smart phone 520 may check the connection of the wearable device according to the mapping information.

In operation 582, when the smart watch 510 is connected to the smart phone 520, the smart phone 520 may control the smart watch 510 to display a UI. Specifically, in operation S526, the smart phone 520 may transmit UI data to the smart watch 510. In operation 512, the smart watch 510 may display a UI according to the UI data received from the smart phone 520. In operation S514, the smart watch 510 may transmit UI control result data to the smart phone 520.

In operation 584, when the earphone 530 is connected to the smart phone 520, the smart phone 520 may control the earphone 530 to output audio data and input audio. Specifically, in operation S528, the smart phone 520 may transmit audio output data to the earphone 530.

The smart phone 520 may transmit output audio data to the earphone according to the UI control result data received from the smart watch 510. The output audio data may be audio data of other users that the smart phone 520 receives from a base station or other terminal. The smart watch 510 may transmit, to the smart phone 520, control data generated by the UI operation of the user. The smart phone 520 may determine whether to transmit the output audio data to the earphone 530 by using the control data received from the smart phone 520. In operation S532, the earphone 530 may output the audio by using the audio output data. In operation S532, the earphone 530 may receive the audio of the user and output audio data. In operation 534, the earphone 530 may transmit the received audio data to the smart phone 520. The smart phone 520 may perform the call function by transmitting the audio data received from the earphone 530 to the base station or other terminal.

Figure 7:
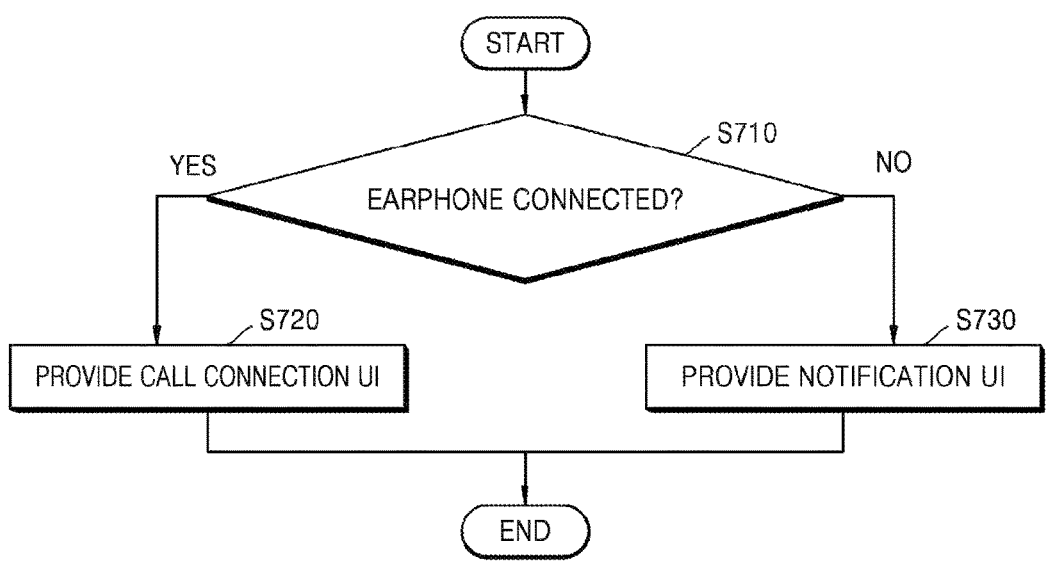

FIG. 7 is a flowchart of a method by which an earphone 530 provides a UI to a smart watch 510, according to an exemplary embodiment. An operation execution request transmitted from a mobile terminal to a first wearable device may be changed according to a connection state of a second wearable device, and the operation of the second wearable device may not be performed. For example, the UI provided through the smart watch 510 in operation S582 of FIG. 6 may be changed according to the connection state of the earphone 530, and operation 584 may not be performed. Details will be described below with reference to FIG. 7.

In operation S710, the smart phone 520 according to the exemplary embodiment may determine whether the earphone 530 is connected thereto. In operation S720, when the earphone 530 is connected to the smart phone 520, the smart phone 520 may transmit a call connection UI to the smart watch 510. In operation S730, when the earphone 530 is not connected to the smart phone 520, the smart phone 520 may provide a call notification UI to the smart watch 510. The call notification UI is an alternative UI that is provided when it is impossible or difficult to provide a UI for controlling the function of the mobile terminal such as the smart phone 520. The mobile terminal may provide the wearable device with information indicating that it is impossible or difficult to provide a control UI. Alternatively, the mobile terminal 110 may provide no UI when it is impossible or difficult to provide an operation control UI.

Figure 8:
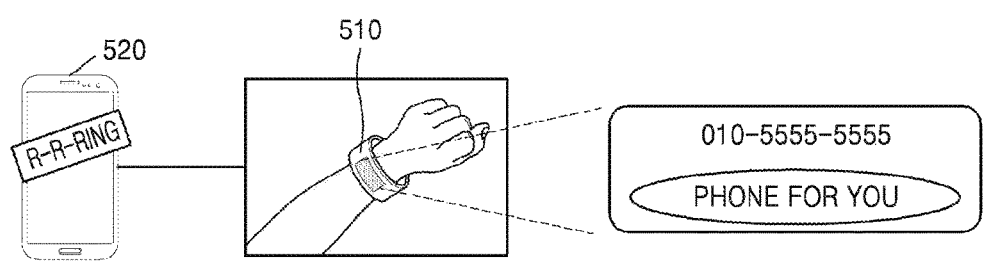

FIG. 8 is a conceptual diagram for describing a notification UI provided in the method of providing the call function, according to an exemplary embodiment.

The notification UI, which is provided from the smart phone 520 to the smart watch 510, may be a UI that notifies a reception of a call acceptance request. The notification UI, which is provided to the smart watch 510 as illustrated in FIG. 8, may be a UI that displays a phone number of a caller while notifying a reception of a phone call.

Figure 9:
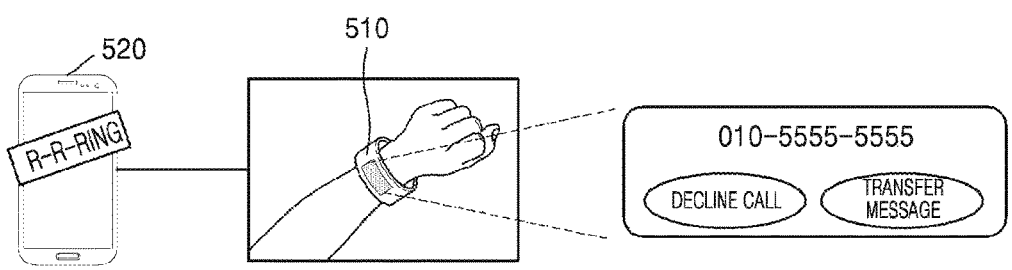

FIG. 9 is a conceptual diagram for describing a notification UI provided in the method of providing the call function, according to another exemplary embodiment.

Referring to FIG. 9, the notification UI according to another exemplary embodiment may notify that a call acceptance request is received together with a phone number of a caller. In addition, the notification UI according to another exemplary embodiment may include a call decline input object that allows the smart phone 520 to decline an incoming call, and a message transfer object that receives a message transfer input to transfer a message to a caller.

Figure 10:
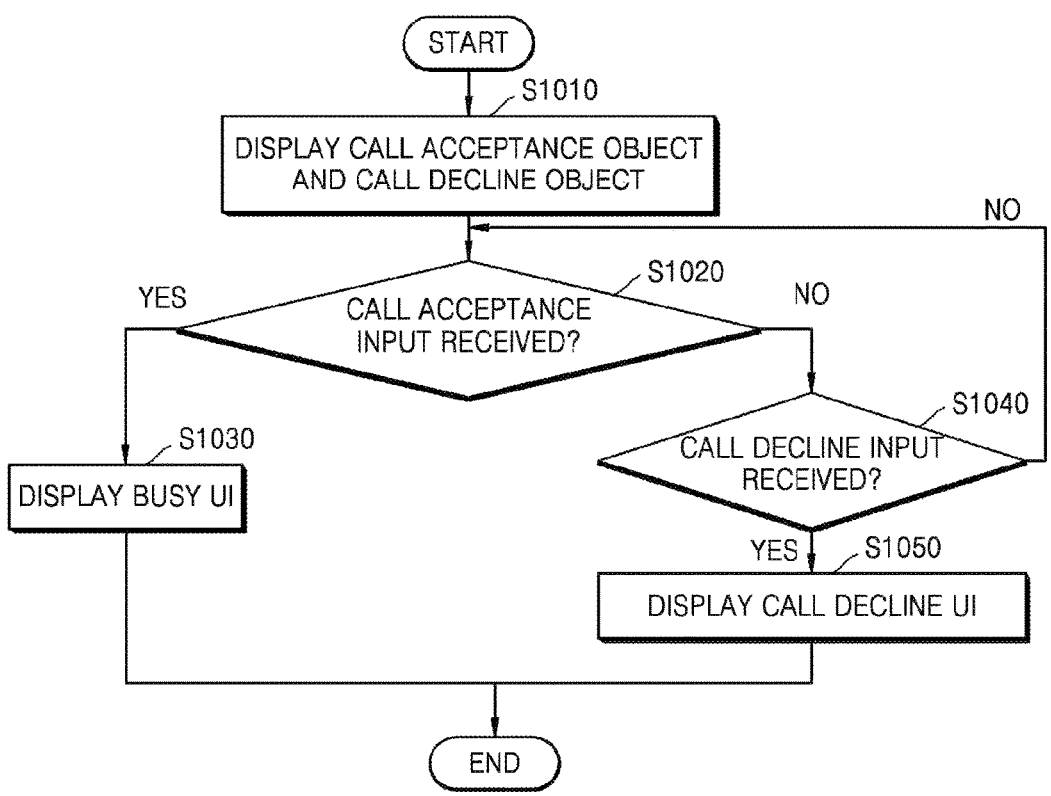

FIGS. 10 to 13 are diagrams for describing a call connection UI according to an exemplary embodiment. FIG. 10 is a flowchart for describing the call connection UI according to an exemplary embodiment. In operation S1010, the call connection UI may display a call acceptance object and a call decline object.

Figure 11:
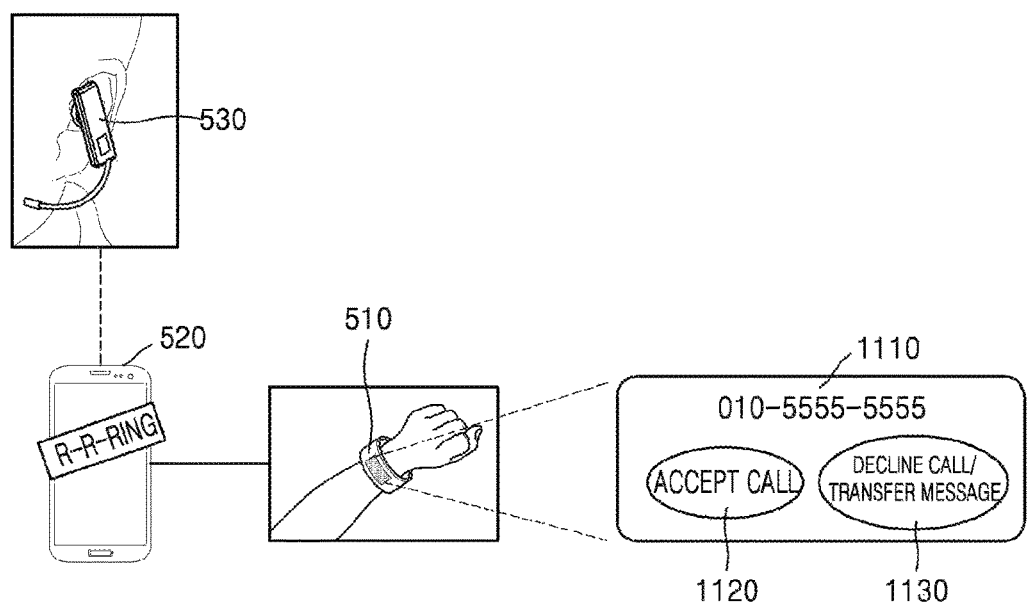

The call connection UI will be described below in more detail with reference to FIG. 11. FIG. 11 is a conceptual diagram for describing the call connection UI according to the exemplary embodiment.

A smart phone 520 according to an exemplary embodiment may be connected to an earphone 530 and a smart watch 510. When it is possible to control the operations of the earphone 530 and the smart watch 510, the smart phone 520 may perform the operations of the earphone 530 and the smart watch 510 and execute the call function.

When it is possible to control the operations of the earphone 530 and the smart watch 510, the smart phone 520 may provide the call connection UI to the smart watch 510. The smart watch 510 may provide the user with the call connection UI by using UI data provided from the smart phone 520.

As illustrated in FIG. 11, the call connection UI, which is provided to the smart watch 510, may include a caller number display object 1110, a call acceptance control object 1120, and a call decline/message transfer object 1130. These objects 1110, 1120, and 1130, which are included in the call connection UI described with reference to FIG. 11, are merely exemplary, and the types and the number of the objects 1110, 1120, and 1130 displayed on the call connection UI are not limited thereto.

The caller number display object 1110 may display a phone number or other identifying information of a caller. The call acceptance control object 1120 may be an object that receives a call acceptance input from a user by receiving a user input, such as a touch or input from a pointing device that is input to a corresponding object. The call decline/message transfer object 1130 may be an object that receives a call decline input or a message transfer input from a user by receiving a user input, such as a touch or input from a pointing device that is input to a corresponding object.

The smart watch 510 may generate the call acceptance input when the user touches the call acceptance object 1120 displayed on the smart watch 510. The smart watch 510 may transmit the call acceptance input to the smart phone 520.

Similarly, the smart watch 510 may generate the call decline input when the user touches the call decline/message transfer object 1130 displayed on the smart watch 510. The smart watch 510 may transmit the call decline input to the smart phone 520.

Referring again to FIG. 10, in operation S1020, the call connection UI may confirm whether the call acceptance input is received from the user. In operation S1030, the call connection UI may display a busy UI when the call acceptance input is received from the user. The busy UI will be described below in detail with reference to FIG. 12.

Figure 12:
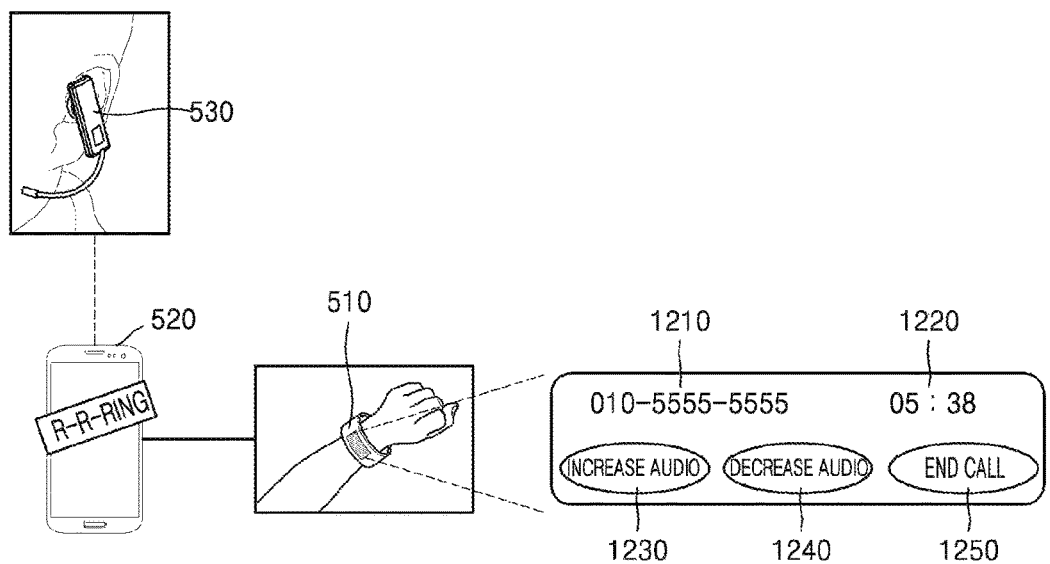

FIG. 12 is a conceptual diagram for describing the busy UI according to an exemplary embodiment.

A smart phone 520 may be connected to an earphone 530 and a smart watch 510. When the smart phone 520 performs the operations of the earphone 530 and the smart watch 510 and executes the call function of the smart phone 520, the smart phone 520 may provide the busy UI to the smart watch 510. The smart watch 510 may provide the user with the busy UI by using UI data received from the smart phone 520.

As illustrated in FIG. 12, the busy UI, which is provided to the smart watch 510, may include a caller number display object 1210, a call time display object 1220, an audio increase control object 1230, an audio decrease control object 1240, and a call end object 1250. These objects 1210, 1220, 1230, 1240, and 1250 are merely exemplary, and the types and the number of the objects 1210, 1220, 1230, 1240, and 1250 displayed on the busy UI are not limited thereto.

The smart watch 510 may perform control according to the objects when a user input is received through the audio increase control object 1230, the audio decrease control object 1240, and the call end object 1250. For example, when the user input is input through the audio increase control object 1230, the smart watch 510 may raise an audio volume.

Referring again to FIG. 10, in operation S1040, when the call acceptance input is not received from the user, the call connection UI may confirm whether the call decline input is received from the user. In operation S1050, the call connection UI may display a call decline UI when the call decline input is received from the user. When both the call acceptance input and the call decline input are not received, the call connection UI may confirm whether the call acceptance input or the call decline input is input again.

Figure 13:
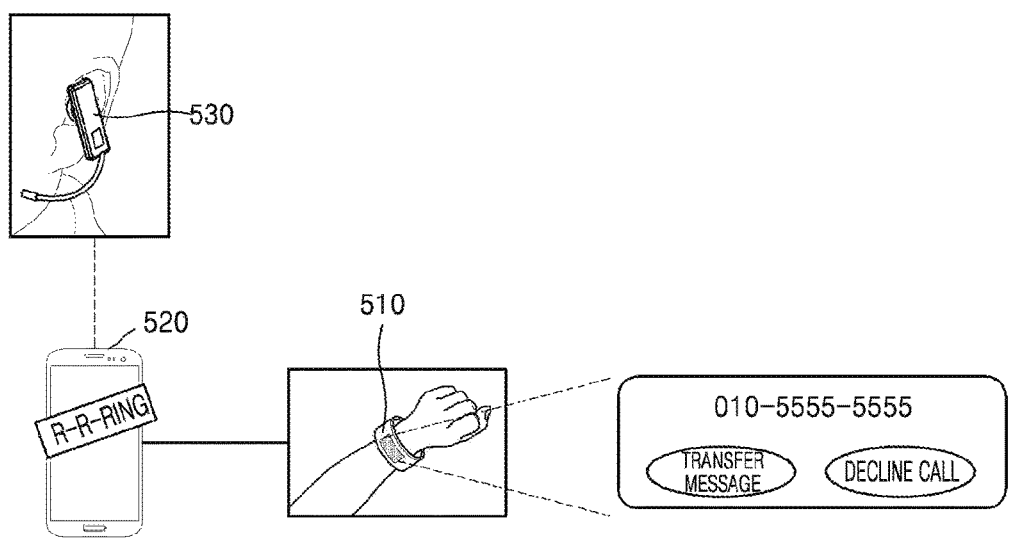

The call decline UI will be described below in more detail with reference to FIG. 13. FIG. 13 is a conceptual diagram for describing the call decline UI according to the exemplary embodiment.

A smart phone 520 according to an exemplary embodiment may be connected to an earphone 530 and a smart watch 510. When it is possible to execute the call function by using the operations of the earphone 530 and the smart watch 510, the smart phone 520 may provide the call decline UI to the smart watch 510. The smart watch 510 may provide the user with the call decline UI by using UI data received from the smart phone 520.

The call decline UI may include a caller number display object, a message transfer control object, and a call decline control object. When a user input of selecting the message transfer control object is generated, the smart watch 510 may transmit a message transfer request to the smart phone 520 so as to transfer a message to a caller. The smart watch 510 may display a list of messages to be transferred to a user and receive a user selection.

When a user input of selecting the call decline control object is generated, the smart watch 510 may transmit a call decline request to the smart phone 520.

A method by which the mobile terminal 110 according to the exemplary embodiment transmits operation execution requests to the first and second wearable devices 120 and 130 will be described below in detail. FIGS. 14 to 19 are conceptual diagrams for describing a method by a smart phone 520 as the mobile terminal 110 transmits operation execution requests to a smart watch 510 as the first wearable device 120 and an earphone 530 as the second wearable device 130, according to an exemplary embodiment. Assuming that the mobile terminal 110, the first wearable device 120, and the second wearable device 130 are the smart phone 520, the smart watch 510, and the earphone 530, respectively, the operations of the mobile terminal 110, the first wearable device 120, and the second wearable device 130 will be described below.

Figure 14:
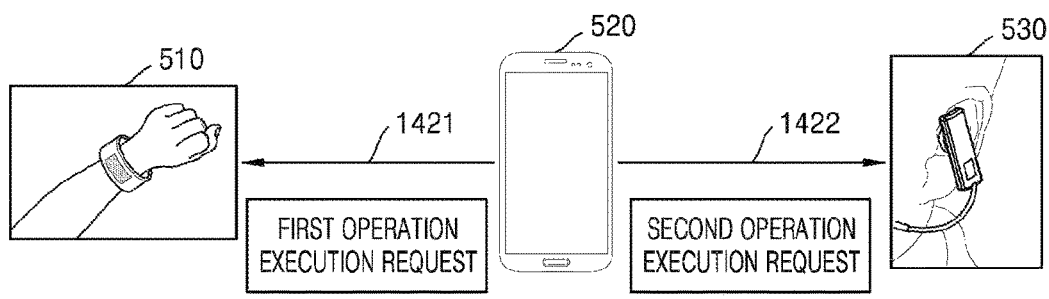

FIG. 14 is a flowchart of a method by which the mobile terminal 110 transmits the operation execution requests to the first and second wearable devices 120 and 130, according to an exemplary embodiment. As illustrated in FIG. 14, the smart phone 520 may transmit a first operation execution request 1421 to the smart watch 510 and transmit a second operation execution request 1422 to the earphone 530. The smart phone 520 may transmit the first operation execution request and the second operation execution request to the first and second wearable devices 510 and 530 at the same time or at different times.

Figure 15:
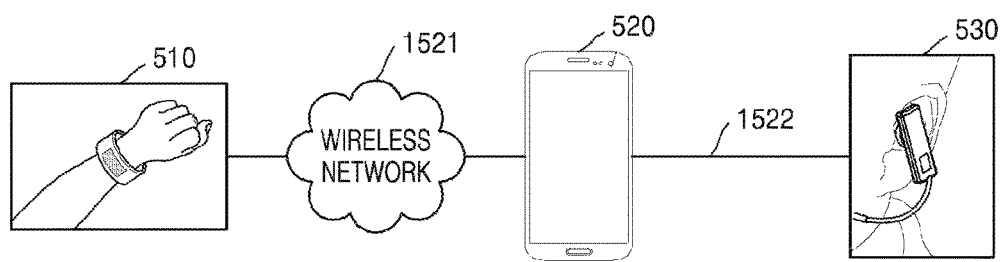
Figure 16:
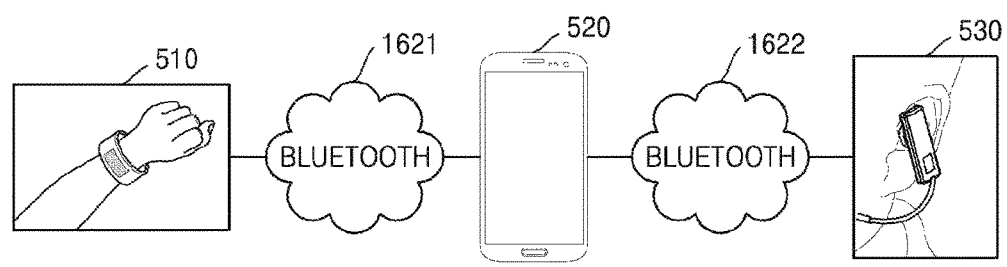
Figure 17:
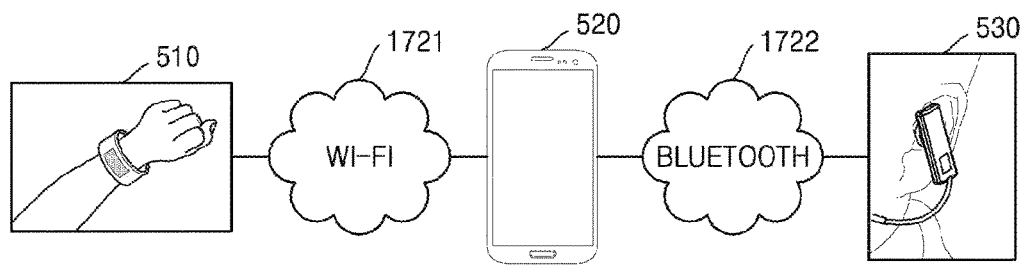

FIGS. 15 to 17 are conceptual diagrams for describing a communication method between the mobile terminal 110 and the first and second wearable devices 120 and 130, according to exemplary embodiments.

FIG. 15 is a conceptual diagram for describing a communication method between the mobile terminal 110 and the first and second wearable devices 120 and 130, according to an exemplary embodiment. The mobile terminal 110 according to the exemplary embodiment may transmit data to and receive data from the first wearable device 120 and the second wearable device 130 by using the same communication method or different communication methods.

Referring to FIG. 15, the smart phone 520 according to the exemplary embodiment may communicate with the smart watch 510 via a wireless network 1521 and communicate with the earphone 530 via a wired network 1522. This is merely exemplary and the communication method between the smart phone 520 and the first and second wearable devices 510 and 530 is not limited thereto. For example, the smart phone 520 may communicate with the smart watch 510 via a wired network and communicate with the earphone 530 via a wireless network. Alternatively, the smart phone 520 may communicate with both the smart watch 510 and the earphone 530 via a wired network or a wireless network.

For example, referring to FIG. 16, the smart phone 520 may transmit data to and receive data from the smart watch 510 and the earphone 530 by using Bluetooth communications 1621 and 1622. Referring to FIG. 17, the smart phone 520 may transmit data to and receive data from the smart watch 510 by using a Wi-Fi connection 1721 and transmit data to and receive data from the earphone 530 by using a Bluetooth connection 1722.

Figure 18:
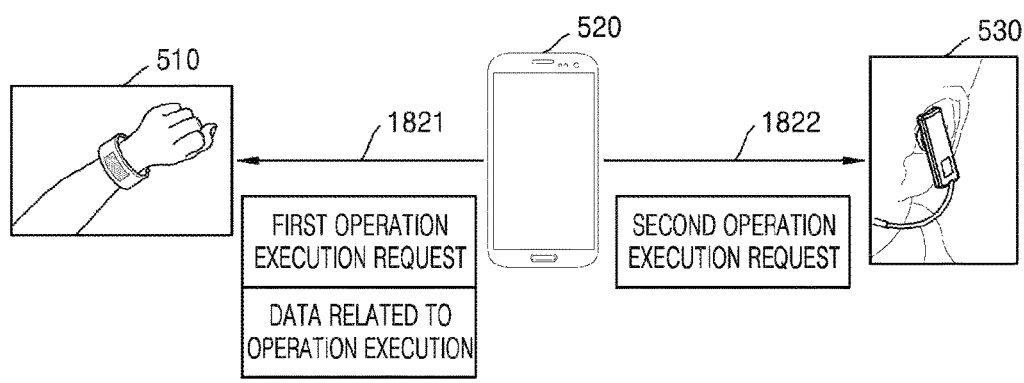

FIG. 18 is a diagram illustrating an example in which the smart phone 520 according to an exemplary embodiment transmits operation execution requests and data related to operation execution to the first and second wearable devices 510 and 530. The smart phone 520 according to an exemplary embodiment may transmit the operation execution requests and the data related to the operation execution to the first and second wearable devices 510 and 530. The data related to the operation execution may be transmitted before the request, at the same time as the request, or after the transmission of the request.

As illustrated in FIG. 18, the smart phone 520 may transmit both the operation execution request and the data related to the operation execution to only one wearable device and transmit only the operation execution request to the other wearable device. For example, the smart phone 520 may transmit a first operation execution request and data related to operation execution to the smart watch 510 and transmit a second operation execution request to the earphone 530.

Figure 19:
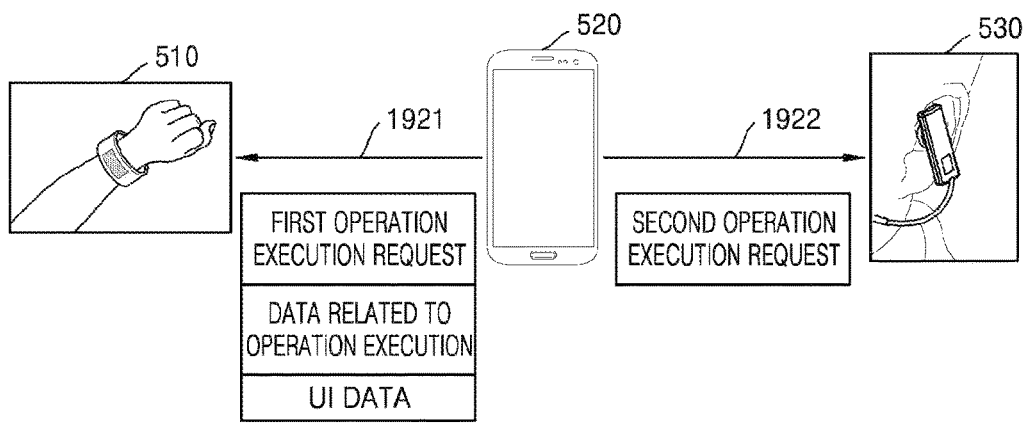

FIG. 19 is a diagram illustrating an example in which the smart phone 520 according to an exemplary embodiment transmits operation execution requests and data related to operation execution to the first and second wearable devices 510 and 530. When the wearable device is capable of performing a display operation and an input operation and provide a UI to a user, a UI for controlling the smart phone 520 may be provided to the wearable device. For example, the smart phone 520 may transmit data of the UI for controlling the smart phone 520 to the wearable device. The wearable device may display the UI by using the received UI data, receive a user input, and provide the UI to the user.

As illustrated in FIG. 19, the smart phone 520 may transmit the operation execution request, the data related to the operation execution, and the UI data to only one wearable device and transmit only the operation execution request to the other wearable device.

For example, the smart phone 520 may transmit a first operation execution request, data related to operation execution, and UI data to the smart watch 510 and transmit a second operation execution request to the earphone 530.

Hereinafter, a method by which a first wearable device controls a mobile terminal and a second wearable device, according to an exemplary embodiment, will be described in detail. FIGS. 20 to 24 are conceptual diagrams for describing a method by which a smart watch 510 controls an earphone 530 in a method of providing a function, according to an exemplary embodiment.

Figure 20:
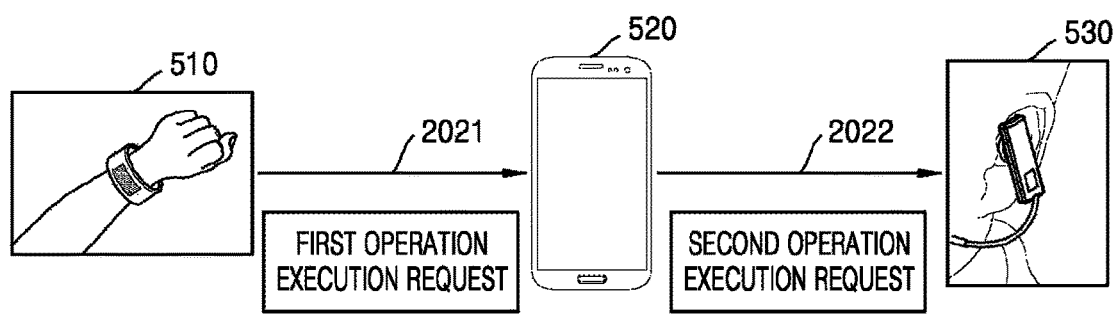

Referring to FIG. 20, the smart watch 510 may transmit first operation execution result data 2021 to the smart phone 520. The smart phone 520 may transmit, to the earphone 530, a second operation execution request 2022 for controlling the earphone 530 by using the first operation execution result data 2021 received from the smart watch 510.

Figure 21:
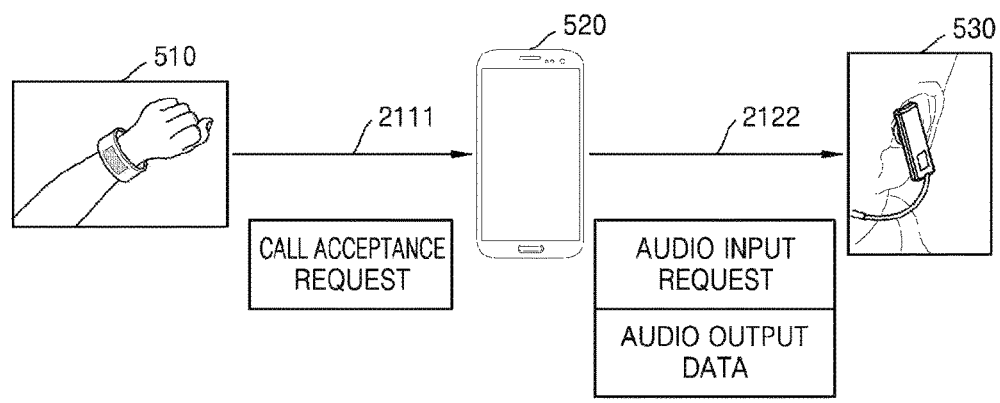

An operation by which the smart watch 510 starts a call will be described with reference to FIG. 21. The smart watch 510 may transmit a call acceptance request 2111 to the smart phone 520. The smart phone 520 may start the call in response to the call acceptance request received from the smart watch 510. The smart phone 520 may transmit, to the earphone 530, audio output data of the other party that is received from a base station or an external terminal in operation 2122. The smart phone 520 may also transmit an audio input request to the earphone 530.

Figure 22:
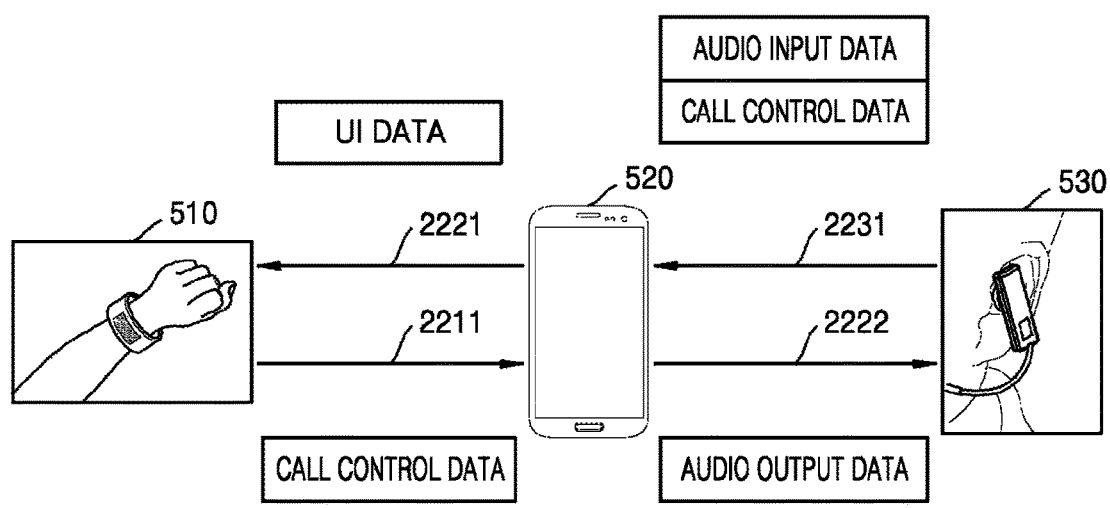

A data flow during a call in the method of providing the function, according to an exemplary embodiment, will be described below with reference to FIG. 22.

The smart phone 520 may transmit, to the smart watch 510, UI data including information generated during the call in operation 2221, so that the smart watch 510 displays the information generated during the call. For example, the UI data may include a phone number of a caller, caller identification, a photograph of the caller, and a call duration. In addition, the smart phone 520 may provide UI data to the smart watch 510 so that the user controls a call status during the call. The smart watch 510 may provide the user with the UI by using UI data received from the smart phone 520.

The smart watch 510 may receive a UI input from the user and generate call control data. For example, the smart watch 510 may receive a UI input which ends the call or a UI input which raises or lowers an audio volume. The smart watch 510 may transmit, to the smart phone 520, call control data including control information generated according to the UI input received from the user in operation 2211. The control information may include information about the control for raising or lowering the audio volume or ending the call.

The smart phone 520 may control the call by using the call control data received from the smart watch 510. For example, the smart phone 520 may end the call or raise or lower the audio volume of the earphone 530 by using the call control data. The smart phone 520 may transmit audio output data to the earphone 530 in operation 2222.

The earphone 530 may include a microphone. The microphone may receive the audio of the user. The microphone may record the audio of the user and generate audio input data. In addition, the earphone 530 may include a UI such as a physical button. The earphone 530 may receive a call control input from the user through the UI and generate call control data. For example, the earphone 530 may receive, from the user, a UI input which ends the call or a UI input which raises or lowers an audio volume. The earphone 530 may transmit the call control data to the smart phone 520 according to the UI input received from the user in operation 2231.

Figure 23:
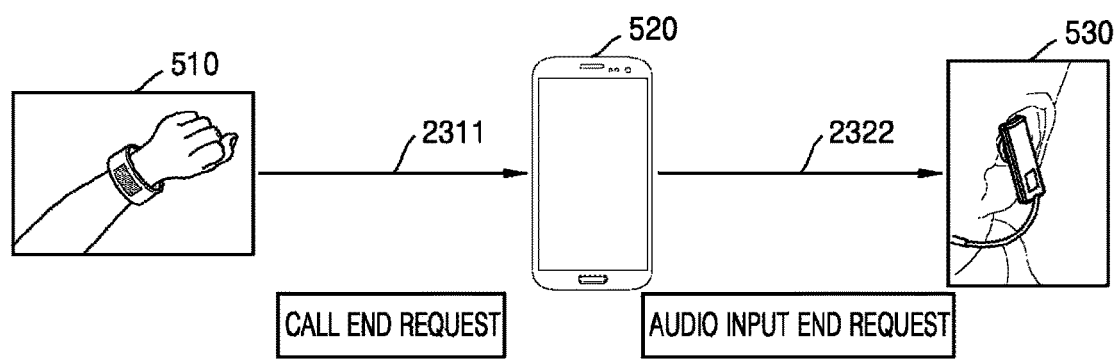

FIG. 23 is a conceptual diagram for describing a method by which a smart watch 510 ends a call in the method of providing the function, according to an exemplary embodiment.

First, the smart watch 510 recognizes the end of a call (a call end). For example, the smart watch 510 may receive a call end input from the user and recognize the call end. The smart watch 510 may transmit a call end request to the smart phone 520 in operation 2311. The smart phone 520 may end the call in response to the call end request received from the smart watch 510. The smart phone 520 may transmit an audio input end request to the earphone 530 in operation 2322. When the audio input end request is received from the smart phone 520, the earphone 530 may end an audio input operation of a microphone.

Figure 24:
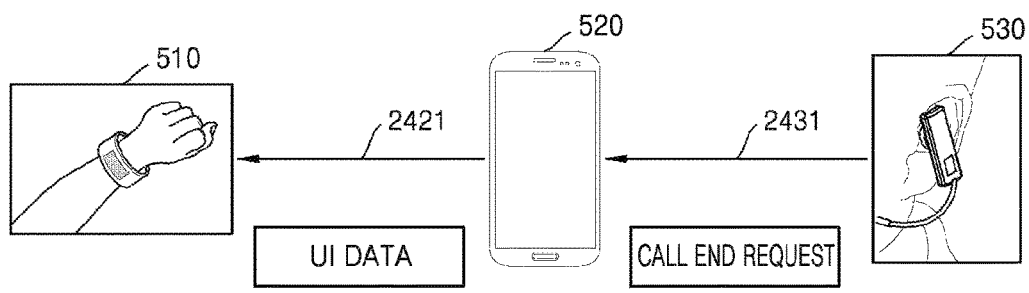

FIG. 24 is a conceptual diagram for describing a method by which an earphone 530 ends a call in the method of providing the function, according to an exemplary embodiment.

The earphone 530 may transmit a call end request to a smart phone 520 according to a call end input received from a user in operation 2431. The smart phone 520 may end the call in response to the call end request received from the earphone 530. The smart phone 520 may transmit UI data indicating the call end to a smart watch 510 in operation 2421. The smart watch 510 may provide the user with a UI indicating the call end by using the UI data received from the smart phone 520. As described above, the providing of the UI may be performed by displaying the UI on a display unit.

Figure 25:
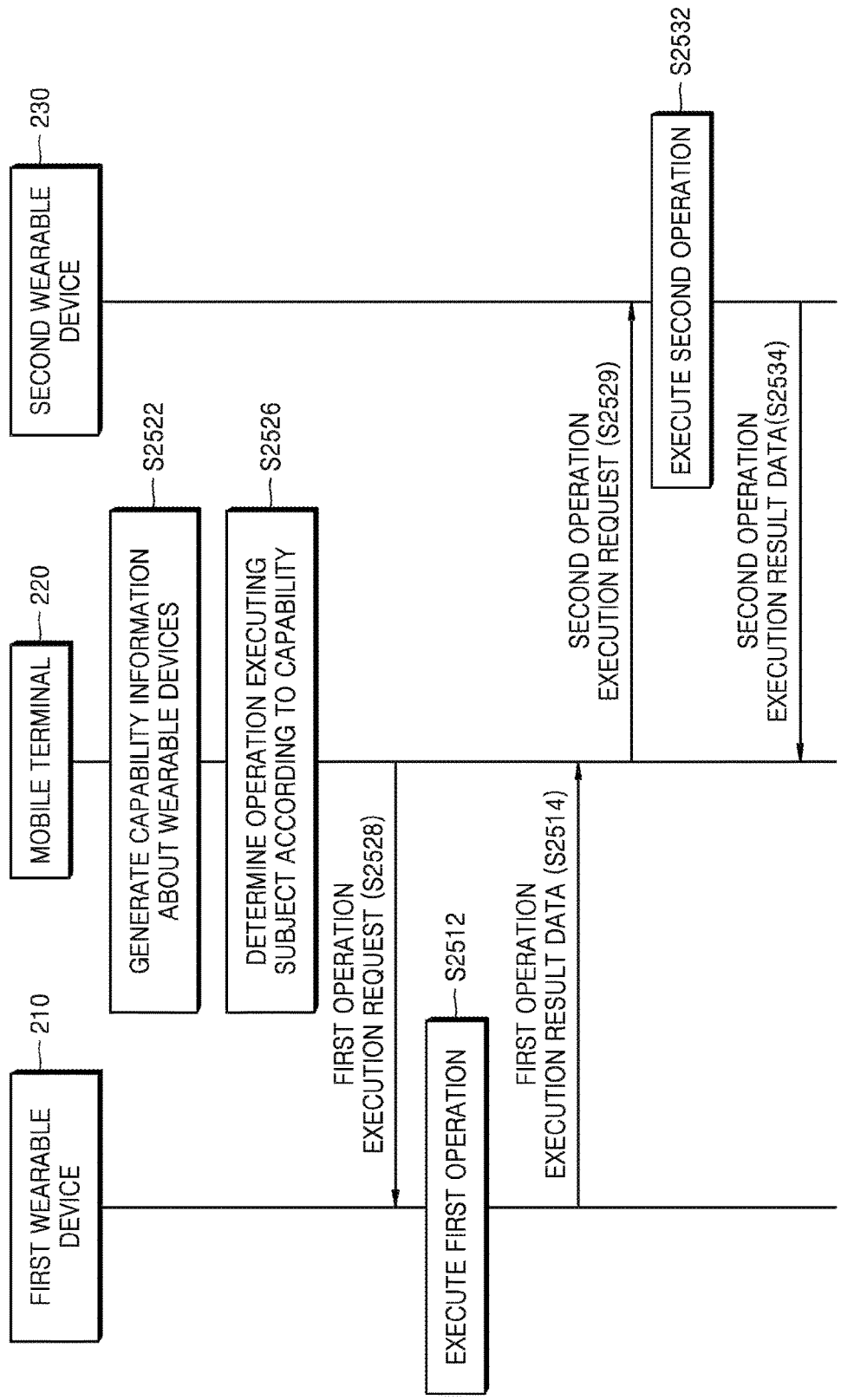
FIG. 25 is a flowchart of an operation of a function providing system, according to an exemplary embodiment.

FIG. 25 is a flowchart of an operation of a function providing system, according to an exemplary embodiment. In operation S2522, a mobile terminal 220 may generate capability information about a plurality of wearable devices. The capability information may be information about a capability to enable a wearable device to perform a specific operation.

The mobile terminal 220 may prestore the capability information about at least one wearable device in a memory. Alternatively, the mobile terminal 220 may download the capability information about at least one wearable device from an external device, such as a PC or a server. Alternatively, the mobile terminal 220 may directly receive the capability information about at least one wearable device from the corresponding wearable device. A method by which the mobile terminal 220 directly receives the capability information about the wearable device will be described below with reference to FIG. 27.

In operation S2526, the mobile terminal 220 may determine an operation executing subject according to capability. In operation S2528, the mobile terminal 220 may transmit a first operation execution request to a first wearable device 210. The mobile terminal 220 may transmit the second operation execution request to the operation executing subject determined based on the capability. For example, if the first wearable device 210 has a capability to perform a first operation, the mobile terminal 220 may transmit the first operation execution request to the first wearable device 210.

In operation S2512, the first wearable device 210 may perform the first operation. The first wearable device 210 may perform the first operation in response to the first operation execution request received from the mobile terminal 220.

The first wearable device 210 may generate a first operation execution result as a result of performing the first operation. The first operation execution result may be an output generated when the first wearable device 210 performs the first operation and may be generated as any of various types of outputs. For example, the first wearable device 210 may perform the first operation to output audio data, output a vibration, display a screen, or generate and output data-processing result data. The output generated by the first wearable device 210 is not limited to the above-described examples.

In operation S2514, the first wearable device 210 may transmit the first operation execution result to the mobile terminal 220. The first wearable device 210 may transmit result data, which is generated as the first operation execution result, to the mobile terminal 220. Since operation S2514 is optional, operation S2514 may be omitted.

In operation S2529, the mobile terminal 220 may transmit a second operation execution request to the second wearable device 230. The mobile terminal 220 may transmit the second operation execution request to the operation executing subject determined based on the capability. For example, if the second wearable device 230 has a capability to perform a second operation, the mobile terminal 220 may transmit the second operation execution request to the second wearable device 230.

In operation S2532, the second wearable device 230 may perform the second operation. The second wearable device 230 may perform the second operation in response to the second operation execution request received from the mobile terminal 220. The second wearable device 230 may generate a second operation execution result as a result of performing the second operation. The second operation execution result may be an output generated when the second wearable device 230 performs the second operation and may be generated as any of various types of outputs. For example, the first wearable device 230 may perform the second operation to output audio data, output a vibration, display a screen, or generate and output data-processing result data. The output generated by the second wearable device 230 is not limited to the above examples.

In operation S2534, the second wearable device 230 may transmit the second operation execution result to the mobile terminal 220. The second wearable device 230 may transmit result data, which is generated as the second operation execution result, to the mobile terminal 220. Since operation S2534 is optional, operation S2534 may be omitted.

Figure 26A:
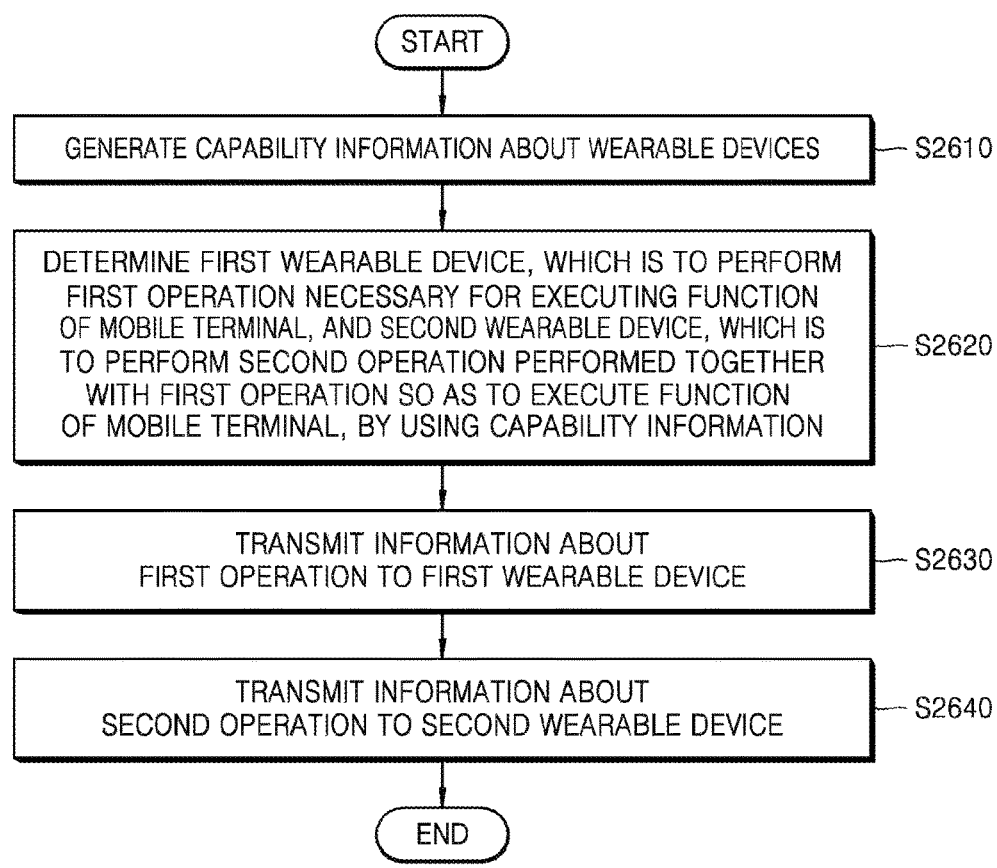
FIGS. 26A and 26B are flowcharts of a method by which a mobile terminal requests wearable devices to perform operations, so as to execute a function of the mobile terminal, according to an exemplary embodiment.

FIG. 26A is a flowchart of a method by which a mobile terminal 220 requests wearable devices to perform operations, so as to execute a function of the mobile terminal, according to an exemplary embodiment. In operation S2610, the mobile terminal 220 may generate capability information about a plurality of wearable devices. The capability information may be information about a capability to enable a wearable device to perform a specific operation.

In operation S2620, the mobile terminal 220 may determine a first wearable device 210, which is to perform a first operation for executing the function of the mobile terminal 220, and a second wearable device 230, which is to perform a second operation performed together with the first operation so as to execute the function of the mobile terminal 220, by using the capability information about the plurality of wearable devices. In other words, the mobile terminal 220 may determine the first wearable device 210, which is to perform a first sub-function for executing the function of the mobile terminal 220, and the second wearable device 230, which is to perform a second sub-function executed together with the first sub-function so as to execute the function of the mobile terminal 220, from among the plurality of wearable devices 210 and 230, by using the capability information about the plurality of wearable devices 210 and 230.

In operation S2630, the mobile terminal 220 may transmit information about the first operation to the first wearable device 210. In operation S2640, the mobile terminal 220 may transmit information about the second operation to the second wearable device 230.

Figure 26B:
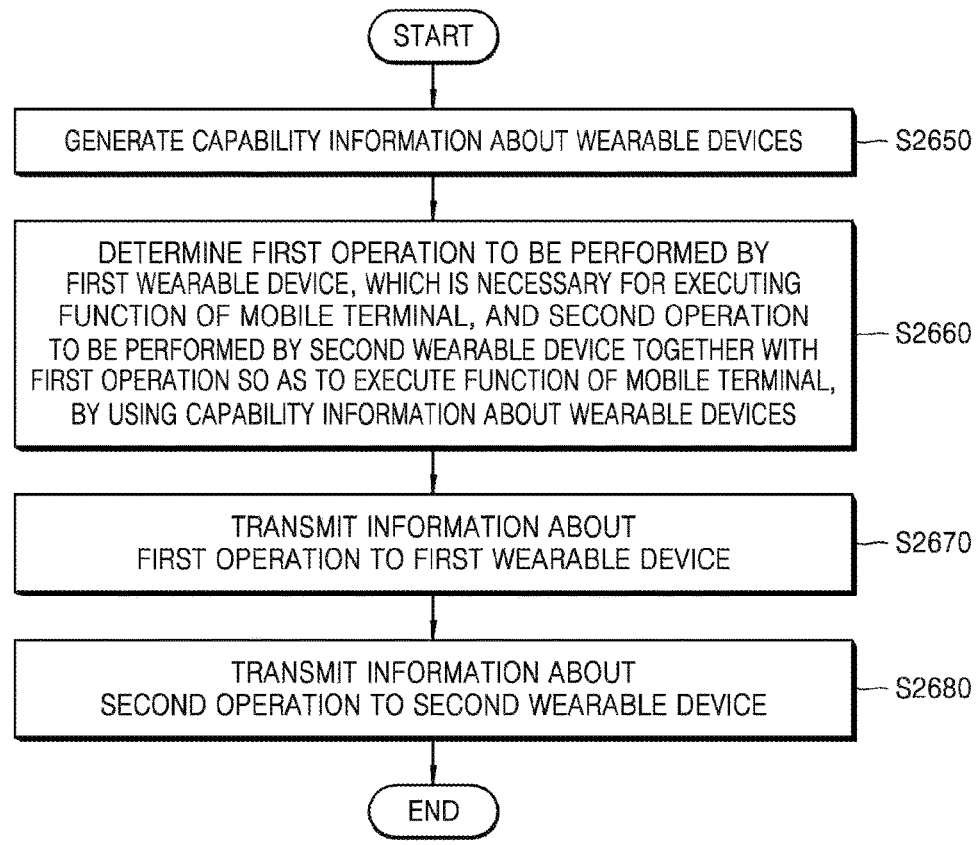

FIG. 26B is a flowchart of a method by which a mobile terminal 220 requests wearable devices to perform operations, so as to execute a function of the mobile terminal, according to another exemplary embodiment. In operation S2650, the mobile terminal 220 may generate capability information about a plurality of wearable devices.

In operation S2660, the mobile terminal 220 may determine the first operation to be performed by the first wearable device 210, which is for executing the function of the mobile terminal 220, and the second operation to be performed by the second wearable device 230 together with the first operation so as to execute the function of the mobile terminal 220, by using the capability information about the plurality of wearable devices 210 and 230. In operation S2660, the mobile terminal 220 may determine a first sub-function to be executed by the first wearable device 210, which is for executing the function of the mobile terminal 220, and a second sub-function to be executed by the second wearable device 230 together with the first sub-function so as to execute the function of the mobile terminal 220, by using the capability information about the plurality of wearable devices 210 and 230.

In operation S2670, the mobile terminal 220 may transmit information about the first operation to the first wearable device 210. In operation S2680, the mobile terminal 220 may transmit information about the second operation to the second wearable device 230.

Figure 27:
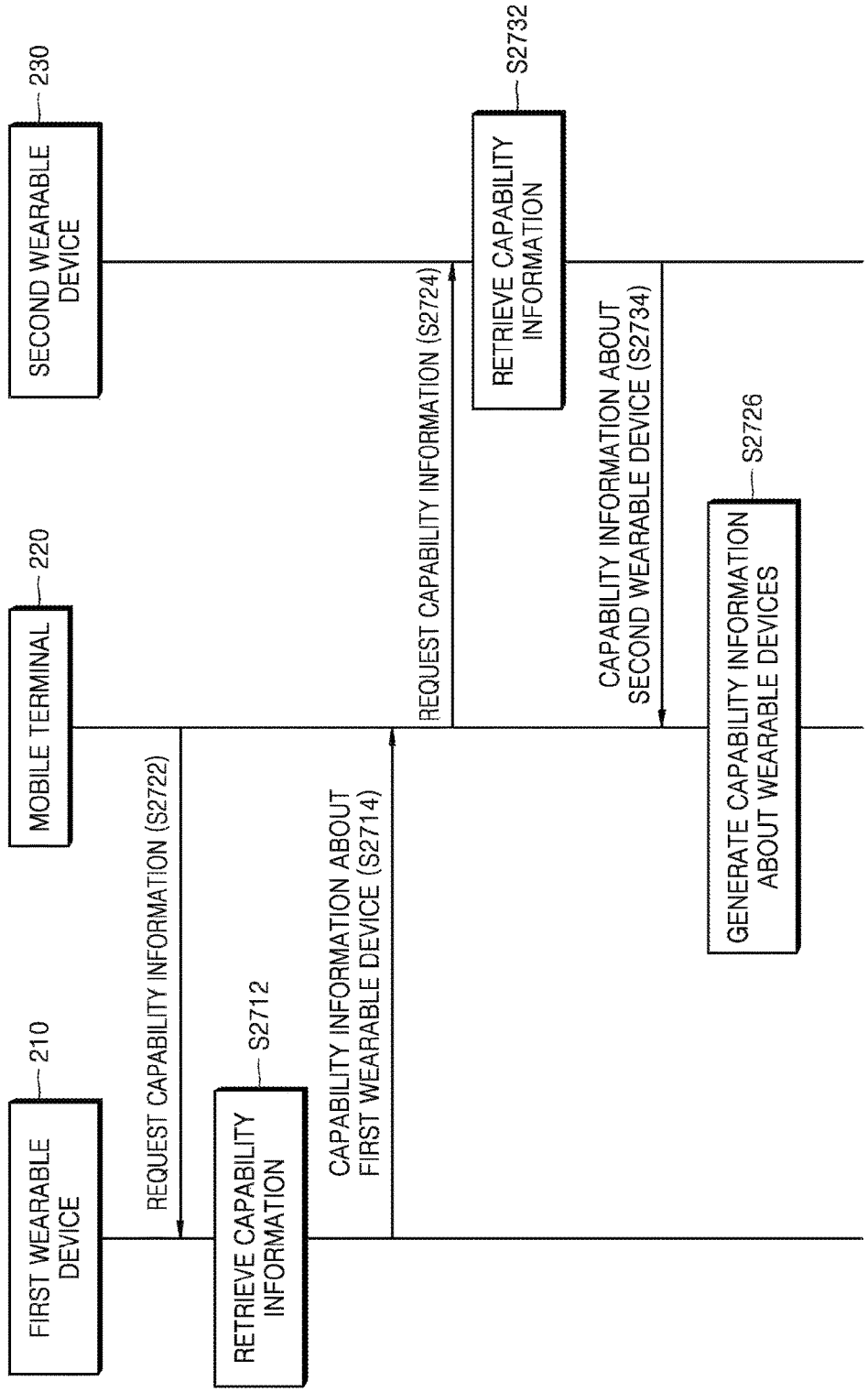
FIG. 27 is a flowchart of a method by which a function providing system receives capability information about wearable devices from wearable devices and generates capability information, according to an exemplary embodiment.

FIG. 27 is a flowchart of a method by which a function providing system receives capability information about wearable devices from the wearable devices and generates the capability information about the wearable devices, according to an exemplary embodiment. In operation S2722, the mobile terminal 220 may request capability information from a first wearable device 210. The capability information request may be a message transmitted from the mobile terminal 220 to the first wearable device 210 so that the mobile terminal 220 requests information about an operation that is capable of being performed by the first wearable device 210.

In operation S2712, the first wearable device 210 may retrieve capability information. The first wearable device 210 may retrieve the capability information in response to the capability information request received from the mobile terminal 220. The information about the capability of the wearable device, which is stored in the wearable device, will be described below with reference to FIGS. 28 to 31.

In operation S2714, the first wearable device 210 may transmit capability information about the first wearable device 210 to the mobile terminal 220. In operation S2724, the mobile terminal 220 may request capability information from a second wearable device 230. In operation S2732, the second wearable device 230 may retrieve capability information. The second wearable device 230 may retrieve the capability information in response to the capability information request received from the mobile terminal 220. In operation S2714, the first wearable device 210 may transmit capability information about the first wearable device 210 to the mobile terminal 220.

Operation S2722 in which the mobile terminal 220 requests the capability information from the first wearable device 210 and operation S2724 in which the mobile terminal 220 requests the capability information from the second wearable device 230 may be performed in many different ways, e.g., in series, in parallel, at the same time, at different times, etc. Therefore, operations in which the mobile terminal 220 receives the capability information from the first wearable device 210 and operations in which the mobile terminal 220 receives the capability information from the second wearable device 230 may be performed together.

Then, the mobile terminal 220 may generate capability information about at least one wearable device by using the capability information received from the wearable device. A method by which the mobile terminal 220 stores the capability information will be described below with reference to FIGS. 32 to 36.

In FIG. 27, time points at which the mobile terminal 220 requests the first wearable device 210 and the second wearable device 230 for the capability information may vary depending on various situations or conditions. For example, when the mobile terminal 220 is connected to at least one of the first wearable device 210 and the second wearable device 230, the mobile terminal 220 may request the capability information from the connected wearable device.

Alternatively, after the mobile terminal 220 is connected to at least one of the first wearable device 210 and the second wearable device 230, the mobile terminal 220 may request capability information from the connected wearable device.

Alternatively, upon the occurrence of an event such as receiving a user input, the mobile terminal 220 may request the capability information from the wearable device.

For example, when a user input requesting the function execution of the mobile terminal 220 is received, the mobile terminal 220 may request capability information from at least one of the first wearable device 210 and the second wearable device 230 related to the function execution. Examples of the user input requesting the function execution may include a user input requesting an execution of an application that performs the function execution, a user input selecting an icon representing the application, a user input unlocking a lock screen of the mobile terminal 220, and a user input of selecting multimedia content to be played back or executed by the function execution. Alternatively, the mobile terminal 220 may provide a UI of allowing the user to check whether to request the first wearable device 210 and the second wearable device 230 for the capability information, and request the first wearable device 210 and the second wearable device 230 for the capability information according to a user's acceptance through the UI.

The capability information, which is received by the mobile terminal 220, may be retained in a storage. After the capability information is stored in the storage, the access to the capability information may be limited after the elapse of a predetermined time. For example, when the function execution of the mobile terminal 220 using the capability information ends, the capability information may be encrypted, a password may be set to protect the capability information, or the capability information may be deleted from the storage or be automatically transmitted to an external device.

FIGS. 28 to 31 are diagrams of data structures in which capability information about wearable devices are stored in the wearable devices, according to exemplary embodiments.

Figure 28:
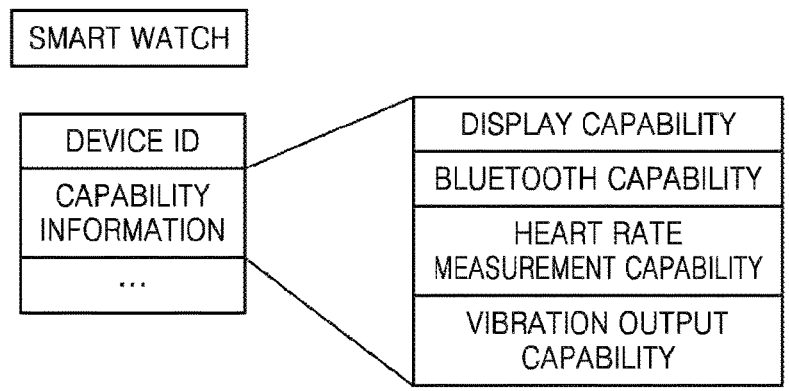
FIGS. 28, 29, 30 and 31 are block diagrams of data structures in which capability information about wearable devices are stored in the wearable devices, according to exemplary embodiments.

FIG. 28 is a diagram for describing, when the wearable device according to tanhe exemplary embodiment is a smart watch, a data structure of the smart watch that includes capability information about the smart watch. Referring to FIG. 28, the smart watch according to an exemplary embodiment may store a data structure, which includes a device ID or capability information, in a memory. The memory may further store information, such as a remaining battery capacity, as well as the information illustrated in FIG. 28. The device ID may be an identifier for identifying a specific device from among a plurality of wearable devices. Referring to FIG. 28, the smart watch according to an exemplary embodiment may store a display capability, a Bluetooth capability, a heart rate measurement capability, and a vibration output capability as information about capabilities of the smart watch. The capabilities of the smart watch illustrated in FIG. 28 are exemplary only and the exemplary embodiments are not limited thereto.

Figure 29:
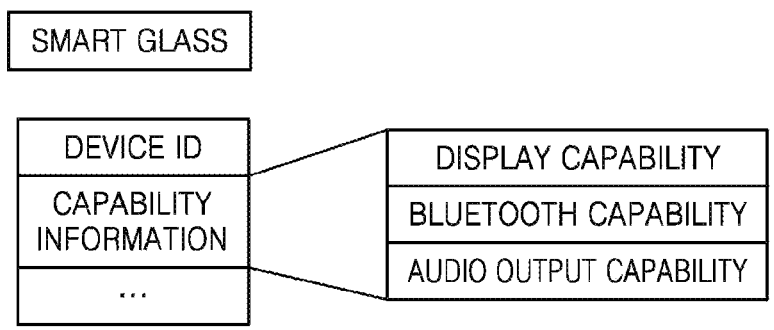

FIG. 29 is a diagram for describing, when the wearable device according to an exemplary embodiment is a smart glass, a data structure of the smart glass that stores capability information about the smart glass. Referring to FIG. 29, the smart glass according to an exemplary embodiment may store a data structure, which includes a device ID or capability information, in a memory. The memory may store further information as well as the information illustrated in FIG. 29. The device ID may be an identifier for identifying a specific device from among a plurality of wearable devices. Referring to FIG. 29, the smart glass according to an exemplary embodiment may store a display capability, a Bluetooth capability, and an audio output capability as information about capabilities of the smart glass. The capabilities of the smart glass illustrated in FIG. 29 are exemplary only and the exemplary embodiments are not limited thereto.

Figure 30:
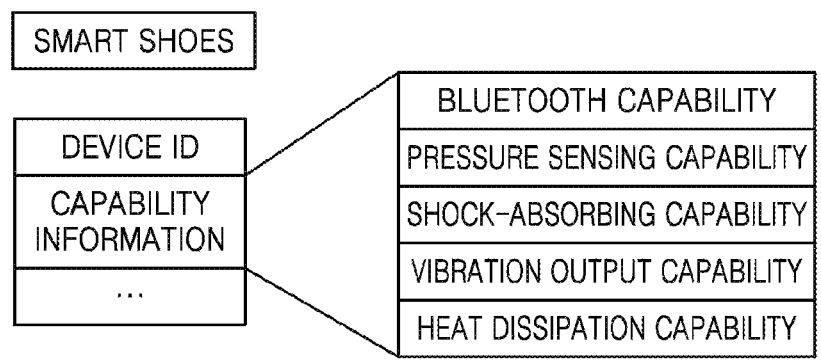

FIG. 30 is a diagram for describing, when the wearable device according to an exemplary embodiment is smart shoes, a data structure of the smart shoes that includes capability information about the smart shoes. Referring to FIG. 30, the smart shoes according to an exemplary embodiment may store a data structure, which includes a device ID or capability information, in a memory. The memory may further store information as well as the information illustrated in FIG. 30. The device ID may be an identifier for identifying a specific device from among a plurality of wearable devices. Referring to FIG. 30, the smart shoes according to an exemplary embodiment may store a display capability, a Bluetooth capability, a heart rate measurement capability, and a vibration output capability as information about capabilities of the smart shoes. The capabilities of the smart shoes illustrated in FIG. 30 are exemplary only and the exemplary embodiments are not limited thereto.

Figure 31:
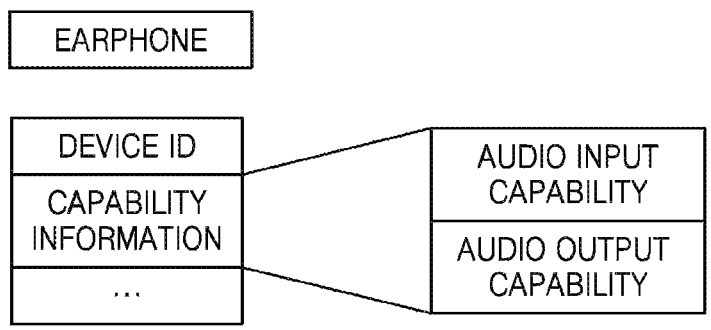

FIG. 31 is a diagram for describing, when the wearable device according to an exemplary embodiment is an earphone, a data structure of the earphone that includes capability information about the earphone. Referring to FIG. 31, the earphone according to an exemplary embodiment may store a data structure, which includes a device ID or capability information, in a memory. The memory may further store information as well as the information illustrated in FIG. 31. The device ID may be an identifier for identifying a specific device from among a plurality of wearable devices. Referring to FIG. 31, the earphone according to an exemplary embodiment may store an audio input capability and an audio output capability as information about capabilities of the earphone. The capabilities of the earphone illustrated in FIG. 31 are exemplary only and the exemplary embodiments are not limited thereto.

FIGS. 32 to 46 are diagrams for describing capability information about wearable devices, which is stored in a mobile terminal 220, according to exemplary embodiments.

Figure 32:
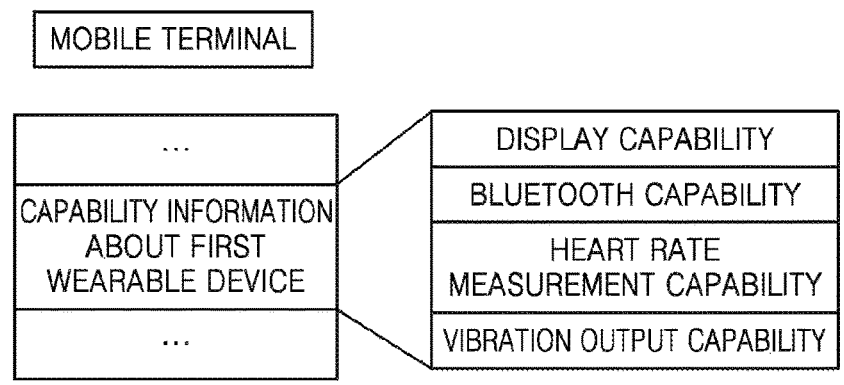
FIGS. 32, 33, 34, 35 and 36 are diagrams for describing capability information about wearable devices, which is stored in a mobile terminal, according to exemplary embodiments.

FIG. 32 is a diagram of a data structure of a memory in which the mobile terminal 220 stores capability information about the smart watch, according to an exemplary embodiment.

As illustrated in FIG. 32, the capability information about the first wearable device 210 may be stored in the memory of the mobile terminal 220. In the exemplary embodiment of FIG. 32, the mobile terminal 220 may store the capability information about the smart watch with respect to the first wearable device 210. In the exemplary embodiment of FIG. 32, the capability information about the first wearable device 210 may store a display capability, a Bluetooth capability, a heart rate measurement capability, and a vibration output capability, which are the capability information about the smart watch.

Figure 33:
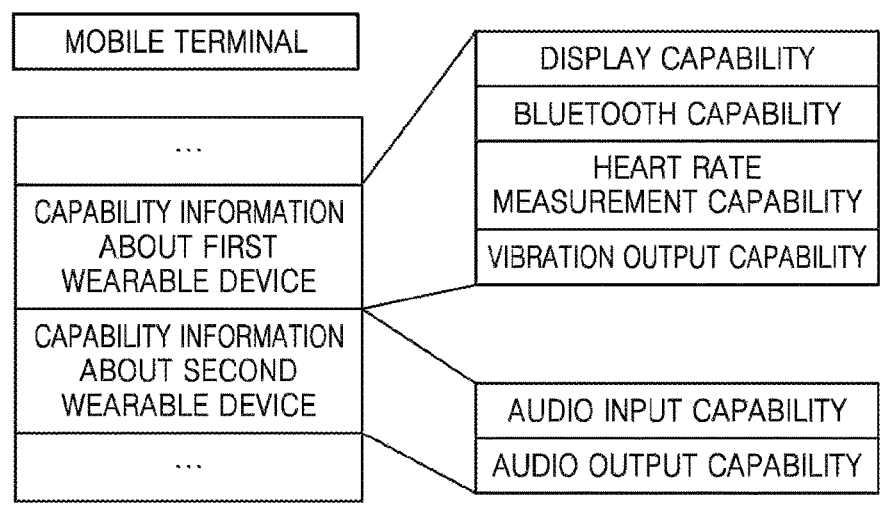

FIG. 33 is a diagram of a data structure of a memory in which the mobile terminal 220 stores capability information about the smart watch and the earphone.

As illustrated in FIG. 33, the capability information about the plurality of wearable devices may be stored in the memory of the mobile terminal 220. The mobile terminal 220 may set identifiers of the wearable devices in the order of connection to the mobile terminal 220. For example, if the smart watch is the first device to connect to the mobile terminal 220, the mobile terminal 220 may assign the identifier of the first wearable device 210 to the smart watch. If the earphone is the second device to connect to the mobile terminal 220, the mobile terminal 220 may recognize the earphone as the second wearable device 230 and assign the identifier of the second wearable device 230 to the earphone. This description is exemplary only and the exemplary embodiments are not limited thereto.

In the exemplary embodiment of FIG. 33, the mobile terminal 220 may store the capability information about the smart watch with respect to the first wearable device 210 and the capability information about the earphone with respect to the second wearable device 230. In the memory of the mobile terminal 220, it is possible to access the capability information about the wearable devices by using the identifiers of the wearable devices.

The first wearable device 210 and the second wearable device 230 may be distinguished from each other by using information about the connection states of the wearable devices, which is stored in the memory of the mobile terminal 220. For example, the device ID of the first wearable device 210 and the device ID of the second wearable device 230 may be stored in the memory of the mobile terminal 220. The identifiers, which are assigned to the wearable devices by the mobile terminal 220, may be used as a common key for distinguishing the device IDs of the wearable devices and the capability information about the wearable devices. These methods are exemplary and the exemplary embodiments are not limited thereto.

Figure 34:
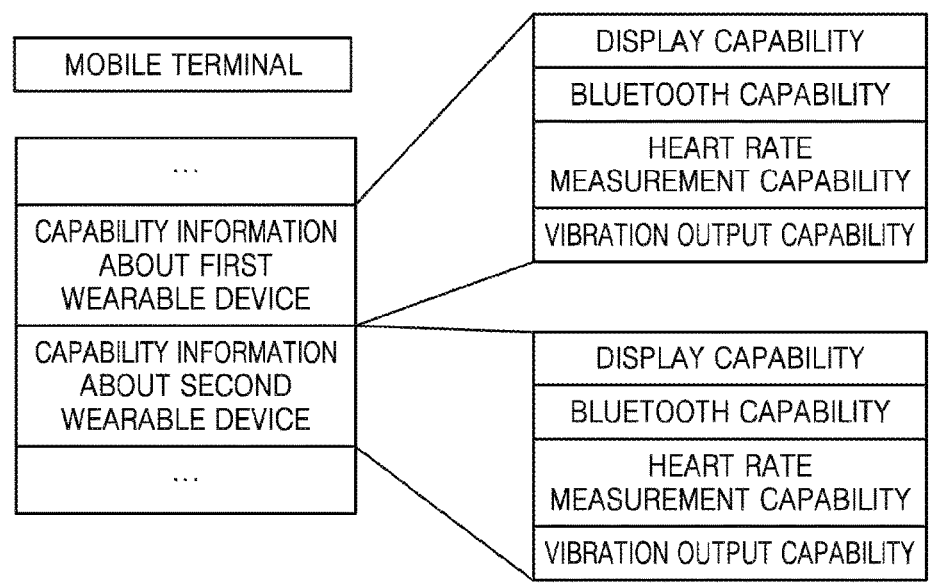

FIG. 34 is a diagram of a data structure of a memory in which the mobile terminal 220 stores capability information about two smart watches, according to an exemplary embodiment.

As illustrated in FIG. 34, the capability information about the same type of a plurality of wearable devices may be stored in the memory of the mobile terminal 220. The mobile terminal 220 may store the capability information about the first smart watch with respect to the first wearable device 210 and the capability information about the second smart watch with respect to the second wearable device 230.

The first wearable device 210 and the second wearable device 230 may be distinguished from each other by using information about the connection states of the wearable devices, which is stored in the memory of the mobile terminal 220. For example, the device ID of the first wearable device 210 and the device ID of the second wearable device 230 may be stored in a memory of a master device. These methods are exemplary only and the exemplary embodiments are not limited thereto.

Figure 35:
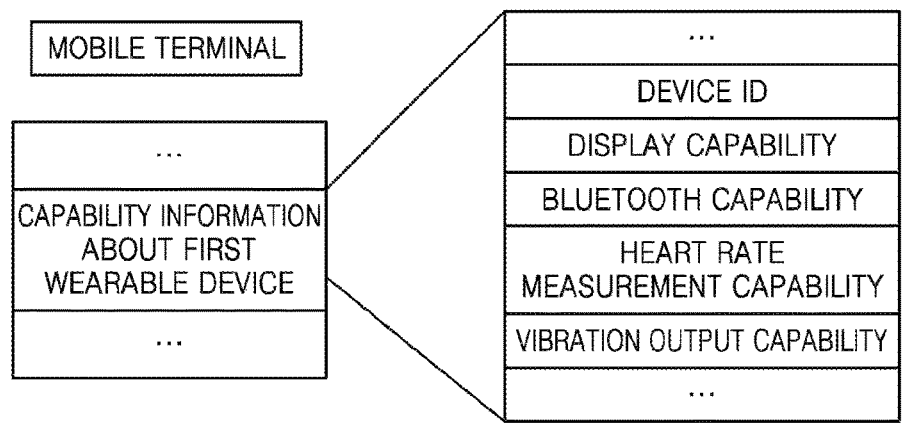

FIG. 35 is a diagram of a data structure of a memory in which the mobile terminal 220 stores capability information about the smart watch, according to an exemplary embodiment.

As illustrated in FIG. 35, the capability information about the wearable device may be stored together with information about the wearable devices that is stored. In the exemplary embodiment of FIG. 35, the mobile terminal 220 may store the device ID of the smart watch that is the first wearable device 210 and may further store the capability information about the smart watch, which includes a display capability, a Bluetooth capability, and a heart rate measurement capability.

Figure 36:
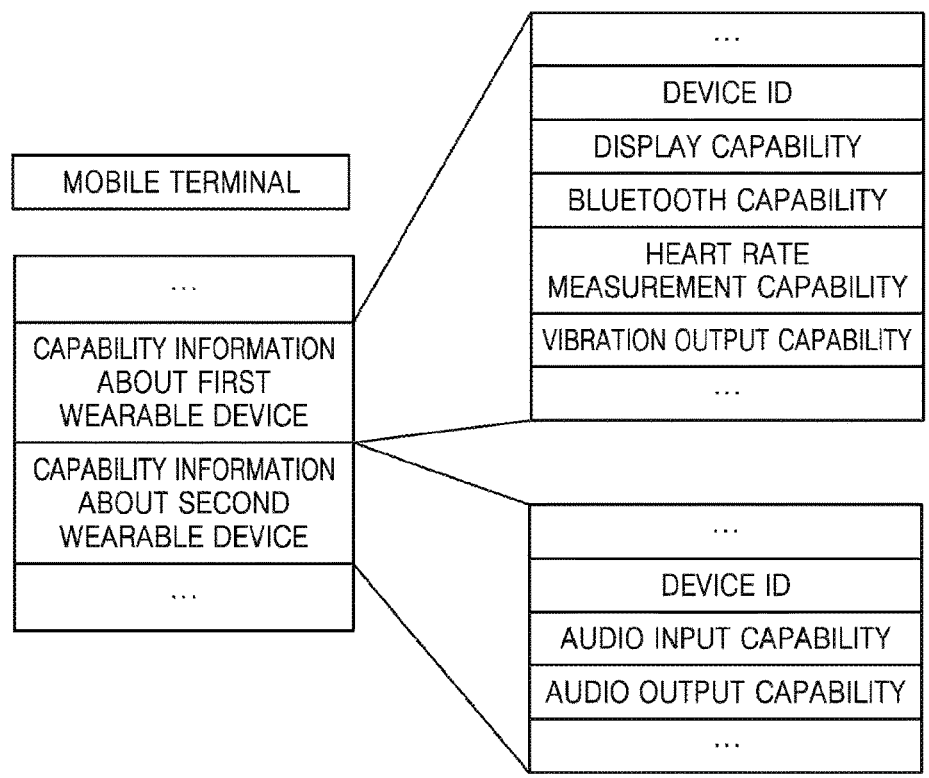

FIG. 36 is a diagram of a data structure of a memory in which the mobile terminal 220 stores capability information about the smart watch, according to an exemplary embodiment.

As illustrated in FIG. 36, capability information about a plurality of wearable devices may store capability information about the plurality of wearable devices together with information about the plurality of wearable devices. Referring to FIG. 36, information about a smart watch that is the first wearable device 210 may be stored in the memory of the mobile terminal 220 and include a device ID of the smart watch and capability information about the smart watch. The capability information about the smart watch may include a display capability, a Bluetooth capability, and a heart rate measurement capability. Similarly, information about an earphone which is the second wearable device 230 may include a device ID of the earphone and capability information about the earphone. The capability information about the earphone may include an audio input capability and an audio output capability. These methods are exemplary only and the exemplary embodiments are not limited thereto.

Figure 37:
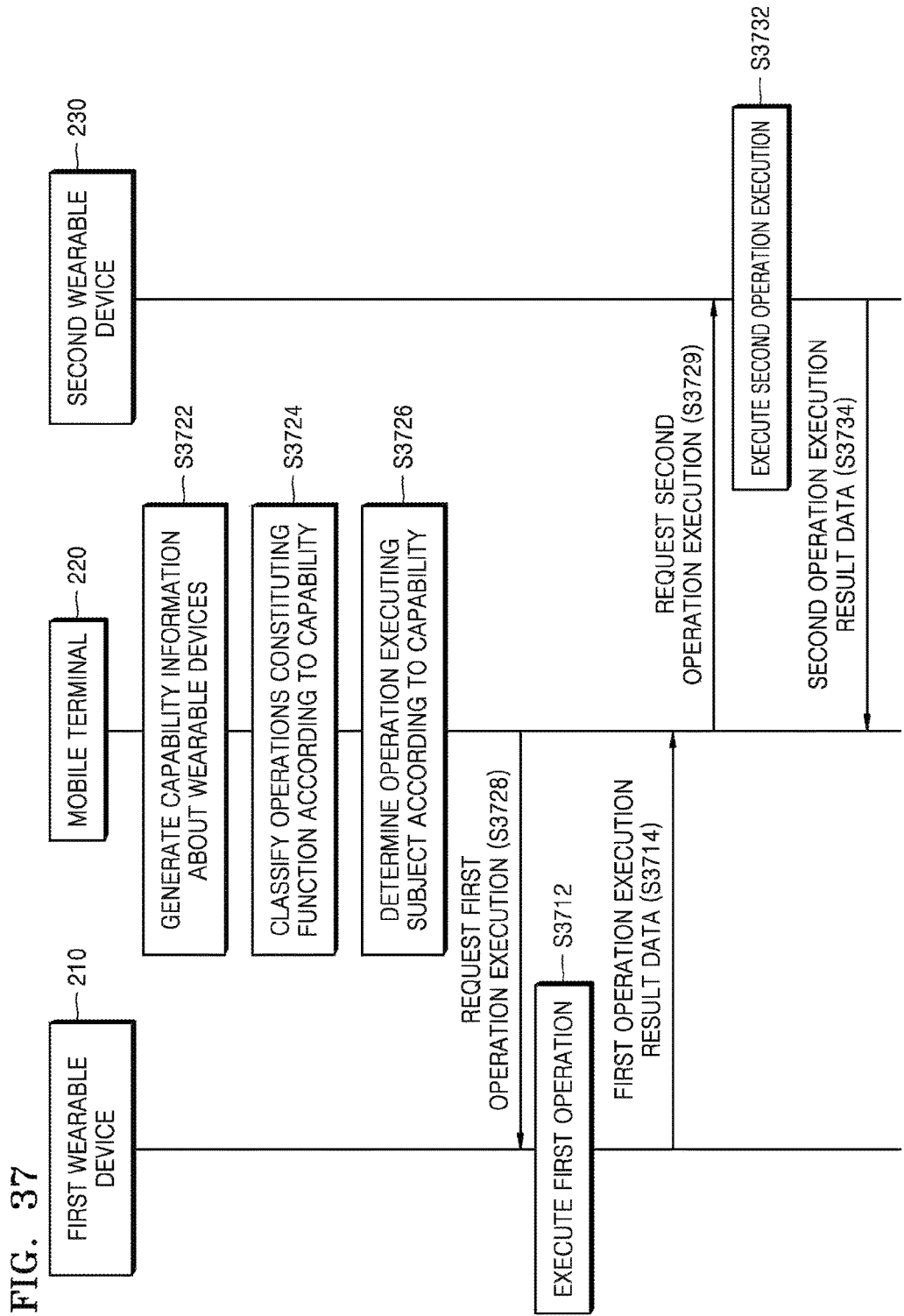
FIGS. 37 and 38 are flowcharts of a method by which a function providing system operates, taking into consideration capability, according to an exemplary embodiment.

FIG. 37 is a flowchart of an operation of a function providing system, according to an exemplary embodiment. The operation of the function providing system described with reference to FIG. 25 may further include operation S3724 which is an operation of classifying a plurality of operations constituting a function according to capability.

A description of the same operations previously described with reference to FIG. 25 will be omitted and operation S3724 will be described. In operation S3724, the mobile terminal 220 may classify the plurality of operations constituting the function by capability. The mobile terminal 220 may classify the call function into an audio input operation performed using a microphone having a recording capability, an audio output operation performed using a speaker having an audio output capability, an information display operation performed using a display unit having an information display capability, and a communication operation performed using a communication unit having a radio wave transmission or reception capability.

Figure 38:
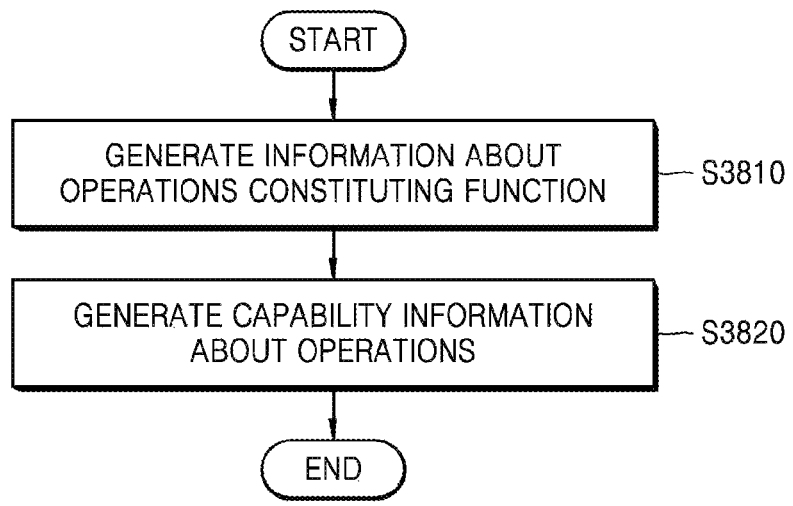

Details will be described below with reference to FIG. 38. FIG. 38 is a flowchart of a method by which the mobile terminal 220 classifies the plurality of operations constituting the function, according to an exemplary embodiment.

Figure 39:
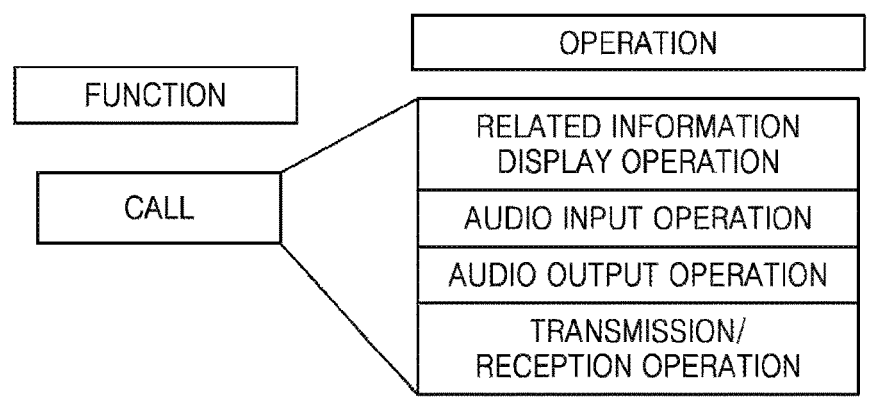
FIG. 39 is a diagram for describing a method of separating a call function into operations from among a plurality of functions capable of being executed by a mobile terminal.

Referring to FIG. 38, in operation S3810, the mobile terminal 220 may generate operation information about operations constituting the function. FIG. 39 is a conceptual diagram for describing a method by which the mobile terminal 220 generates operation information about the operations constituting the function, according to an exemplary embodiment.

A method of separating the call function into operations from among a plurality of functions capable of being executed by the mobile terminal 220 will be described below with reference to FIG. 39. As illustrated in FIG. 39, the call function may be separated into a plurality of operations. For example, the call function may include an information display operation, an audio input operation, an audio output operation, and a transmission or reception operation.

The information display operation may be an operation in which the mobile terminal 220 displays information when the user is on the phone. The audio input operation may be an operation in which the mobile terminal 220 receives audio (e.g., voice data) of the user. The audio output operation may be an operation in which the mobile terminal 220 outputs the audio of the user. The transmission or reception operation may be an operation in which the mobile terminal 220 transmits the audio of the user that is received from another device, or receives the audio of the user from other device.

As illustrated in FIG. 39, the mobile terminal 220 may previously receive information about the operations constituting the function. For example, the mobile terminal 220 may receive operation information from the user. Alternatively, the mobile terminal 220 may receive the operation information from another master device or other external devices such as a server or a wearable device.

The mobile terminal 220 may prestore information about operations constituting the function. The mobile terminal 220 may prestore information about operations constituting the function with respect to each of a plurality of functions.

Referring again to FIG. 38, in operation S3820, the mobile terminal 220 may generate capability information about each operation. FIG. 40 is a diagram for describing a data structure in which the mobile terminal 220 stores capabilities corresponding to the operations, according to an exemplary embodiment. FIG. 40 illustrates capability information about capabilities for a wearable device for performing the operations.

As illustrated in FIG. 40, the capabilities for the wearable device for performing the operations constituting the call function may be stored in the mobile terminal 220. In order to perform the information display operation, it may be necessary for the wearable device to have a display capability. In order to perform the audio input operation, it may be necessary for the wearable device to have an audio input capability. In order to perform the audio output operation, it may be necessary for the wearable device to have an audio output capability. In order to perform the transmission or reception operation, it may be necessary for the wearable device to have a communication capability.

As illustrated in FIG. 40, the mobile terminal 220 may generate capability information about capabilities for performing the operations. The mobile terminal 220 may receive the capability information from the user or from an external device. The capability information may be prestored in the mobile terminal 220.

The mobile terminal 220 may manage the operation information and the capability information by using separate data sets. For example, as illustrated in FIG. 40, the mobile terminal 220 may match and store the operation information and the capability information in a memory. According to another exemplary embodiment, the mobile terminal 220 may store the operation information in the memory after including the capability information about the operations in the operation information.

Figure 41:
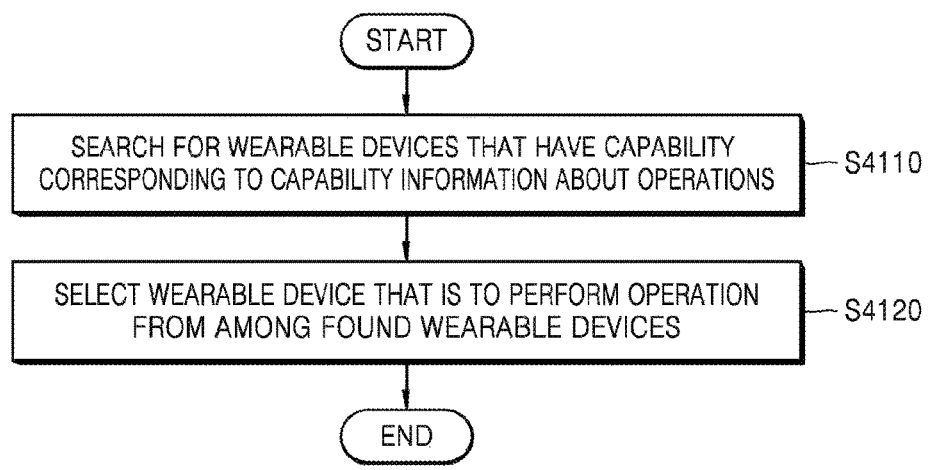
FIG. 41 is a flowchart of a method by which a mobile terminal determines an operation executing subject, according to an exemplary embodiment.

FIG. 41 is a flowchart of a method by which the mobile terminal 220 determines an operation executing subject, according to an exemplary embodiment. In operation S4110, the mobile terminal 220 may search for wearable devices that has a capability corresponding to the capability information about the operations. Operation S4110 will be described below with reference to FIGS. 42 to 48. In operation S4120, the mobile terminal 220 may select a wearable device that is to perform the operation from among the found wearable devices. Operation S4120 will be described below with reference to FIGS. 49 to 61.

FIG. 42 is a diagram illustrating operations performed by the function execution of the mobile terminal 220 and capabilities for the operations, according to an exemplary embodiment.

A method by which the mobile terminal 220 determines a wearable device that is to perform the information display operation during the execution of the call function will be described below with reference to FIG. 42.

The mobile terminal 220 according to an exemplary embodiment may perform the information display operation during the execution of the call function. For example, the mobile terminal 220 may know that the mobile terminal 220 should perform the information display operation at a specific time point by using function execution order information stored in the memory. As illustrated in FIG. 42, the mobile terminal 220 may know that the mobile terminal 220 should have a display capability so as to perform the information display operation, with reference to the operation information and the capability information.

According to another exemplary embodiment, the mobile terminal 220 may recognize a situation that an operation requiring a specific capability may occur during the execution of the function. The mobile terminal 220 may recognize that it may be required to perform the specific capability during the execution of the function. For example, the mobile terminal 220 may recognize a situation that an operation requiring a display capability may occur during the execution of the function. The operation may be the information display operation. For example, when a screen output signal or output data is generated during the execution of the function, the mobile terminal 220 may recognize a situation that an operation requiring a display capability may be occurring. The mobile terminal 220 may recognize that it may be necessary to perform an operation requiring a specific capability by using a signal or data generated during the execution of the call function.

Figure 43:
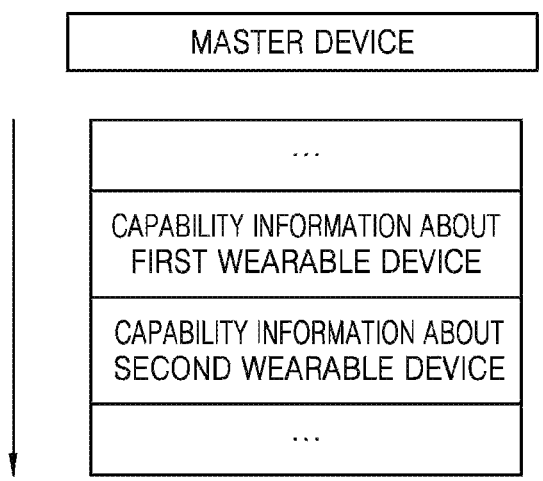
FIG. 43 is a conceptual diagram for describing a method of finding a wearable device having capacity to execute an operation by using capability information about wearable devices stored in a mobile terminal.

FIG. 43 is a conceptual diagram for describing a method of finding a wearable device having capacity to execute an operation by using capability information about wearable devices that is stored in the mobile terminal 220.

The mobile terminal 220 according to an exemplary embodiment may select a wearable device having a capability to execute the operation by using capability information about the wearable devices that is stored in the memory. The capability information about the wearable devices may be sequentially or non-sequentially stored in the memory of the mobile terminal 220. Separate indexes may be used for accessing the capability information about the wearable devices.

FIG. 43 illustrates an example in which the capability information about the wearable devices is sequentially stored in the memory of the mobile terminal 220. In the exemplary embodiment of FIG. 43, the mobile terminal 220 may sequentially retrieve the capability information about the wearable devices.

Figure 44:
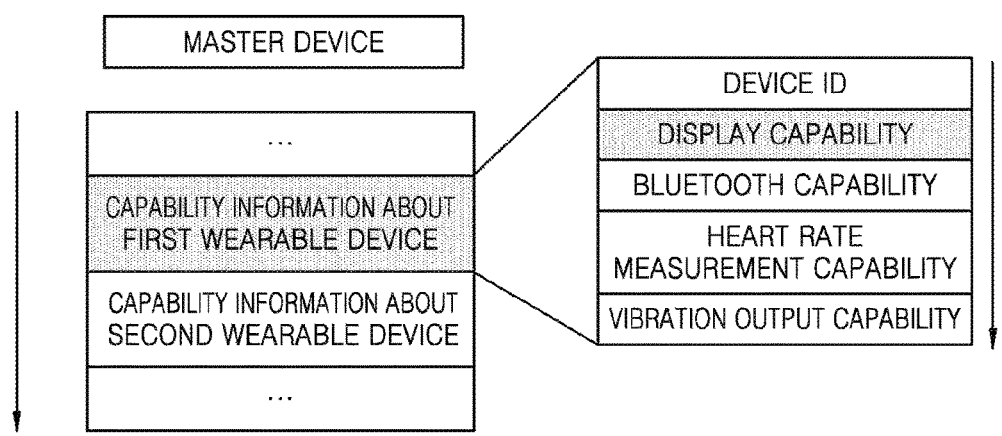
FIG. 44 is a diagram illustrating capability information about wearable devices stored in a memory of a mobile terminal, according to an exemplary embodiment.

FIG. 44 is a diagram illustrating capability information about wearable devices that is stored in the memory of the mobile terminal 220, according to an exemplary embodiment.

Referring to FIG. 44, the mobile terminal 220 may retrieve capability information about the first wearable device 210. The memory may store a display capability and a Bluetooth capability as the capability information about the first wearable device 210. The mobile terminal 220 may confirm that the display capability exists in the capability information about the first wearable device 210 and determine that the first wearable device 210 is a device capable of performing a display operation. The mobile terminal 220 may end the searching for the wearable device. If the display capability does not exist in the capability information about the first wearable device 210, the mobile terminal 220 may retrieve capability information about a next wearable device.

Figure 45:
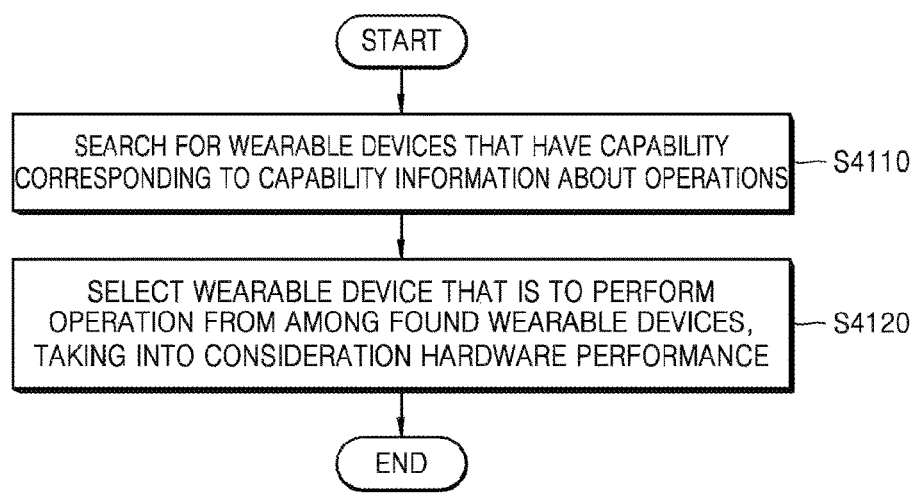
FIG. 45 is a flowchart of a method of specifying a device for performing an operation when a mobile terminal successfully searches for a plurality of devices having a specific capability, according to exemplary embodiments.

FIG. 45 is a flowchart of a method of specifying a wearable device for performing an operation when the mobile terminal 220 successfully searches for a plurality of devices having a specific capability.

In operation S4510, the mobile terminal 220 may search for a wearable device that has a capability corresponding to the capability information about the operations. The mobile terminal 220 may end the searching for additional wearable devices when a wearable device having the required capability is found during the retrieval of the capability information about the wearable devices. On the other hand, the mobile terminal 220 may continue to search for the wearable device having the required capability even when the wearable device having the required capability is found.

In operation S4520, the mobile terminal 220 may select a wearable device that is to perform the operation, taking into consideration hardware performance of the found wearable devices.

FIGS. 46 to 49 are diagrams for describing examples in which the mobile terminal 220 according to an exemplary embodiment selects a first wearable device 210 and a K-th wearable device as a plurality of wearable devices having a display capability, according to an exemplary embodiment.

Figure 46:
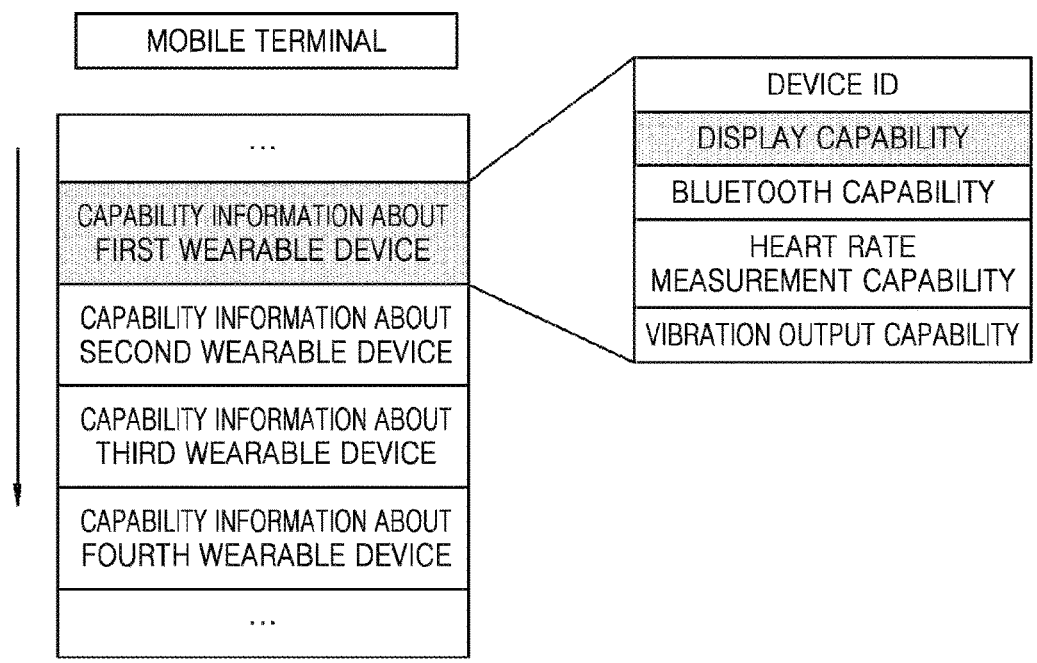
FIGS. 46, 47, 48 and 49 are diagrams for describing examples in which a mobile terminal selects a first wearable device and a K-th wearable device as a plurality of wearable devices having a display capability, according to exemplary embodiments.

In FIG. 46, the mobile terminal 220 may know that the first wearable device 210 has the display capability by retrieving the capability information about the first wearable device 210. The mobile terminal 220 may determine the first wearable device 210 as a device having the display capability. The mobile terminal 220 may end the searching for the device, but the mobile terminal 220 may store, in the memory, information indicating that the first wearable device 210 has the capability and continue to search for other devices having the display capability so as to select a plurality of wearable devices.

Figure 47:
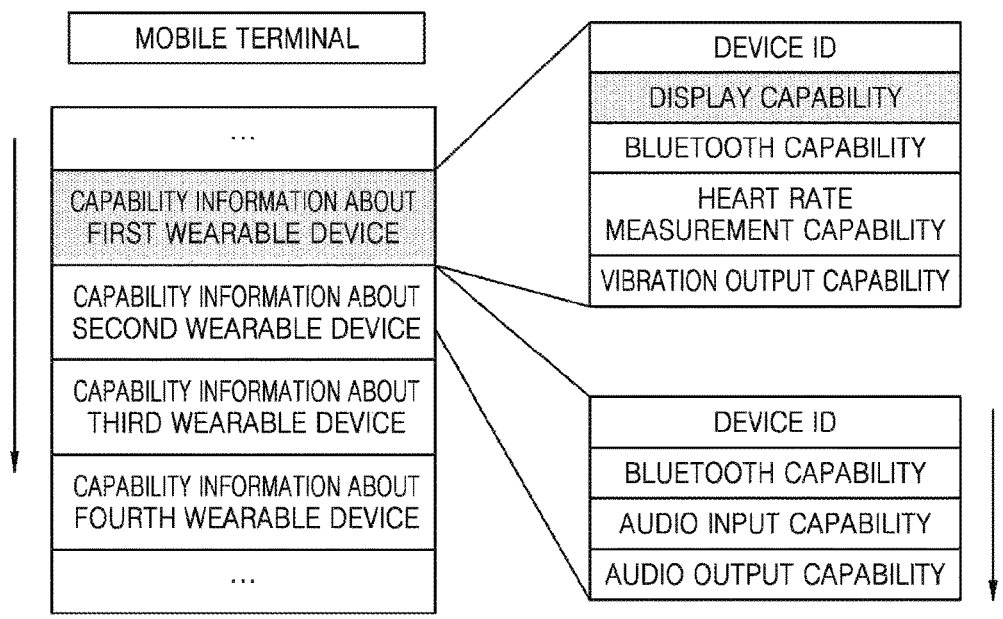

In FIG. 47, the mobile terminal 220 may know that the second wearable device 230 does not have the display capability by retrieving the capability information about the second wearable device 230. The mobile terminal 220 may retrieve the capability information about a next wearable device, without separately processing capability information about the second wearable device 230.

Figure 48:
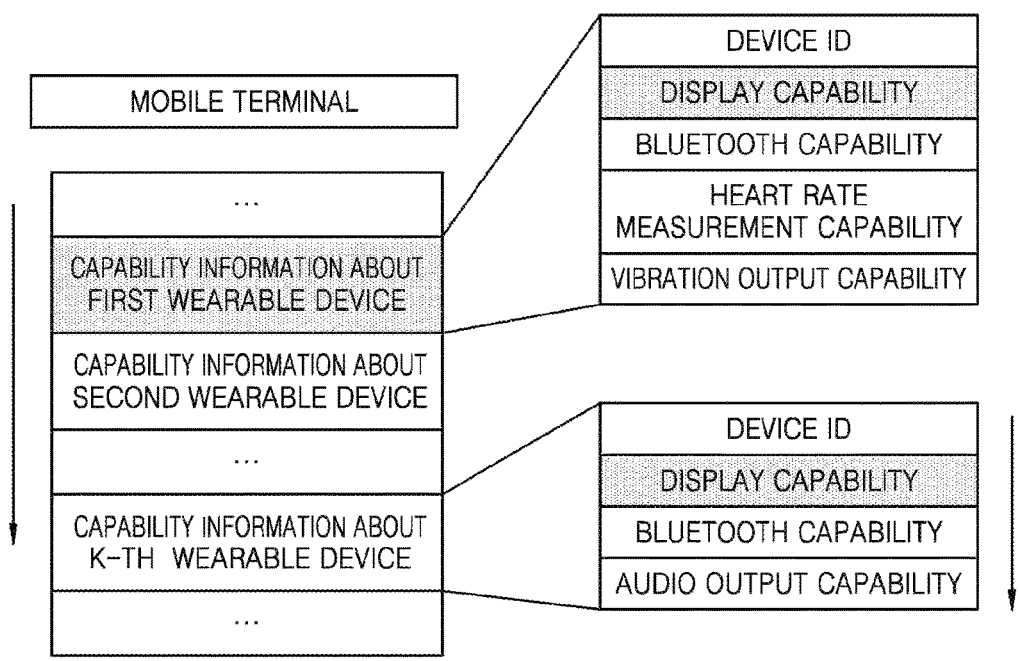

In FIG. 48, as a result of sequentially retrieving capability information about the wearable devices, the mobile terminal 220 may retrieve capability information about the K-th wearable device. The mobile terminal 220 may confirm that the display capability is included in the capability information about the K-th wearable device and determine that the K-th wearable device has the display capability.

Figure 49:
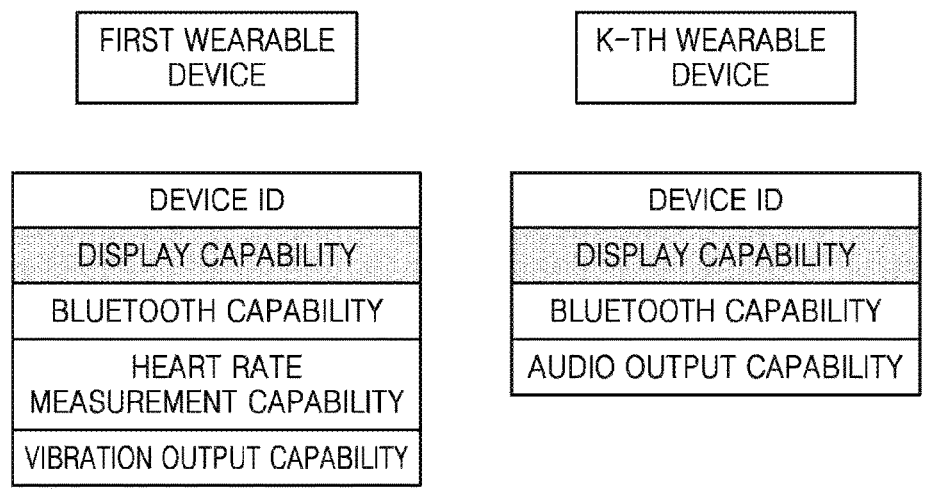

Lastly, as illustrated in FIG. 49, the mobile terminal 220 may determine the first wearable device 210 and the K-th wearable device as the wearable devices having the display capability.

Figure 50:
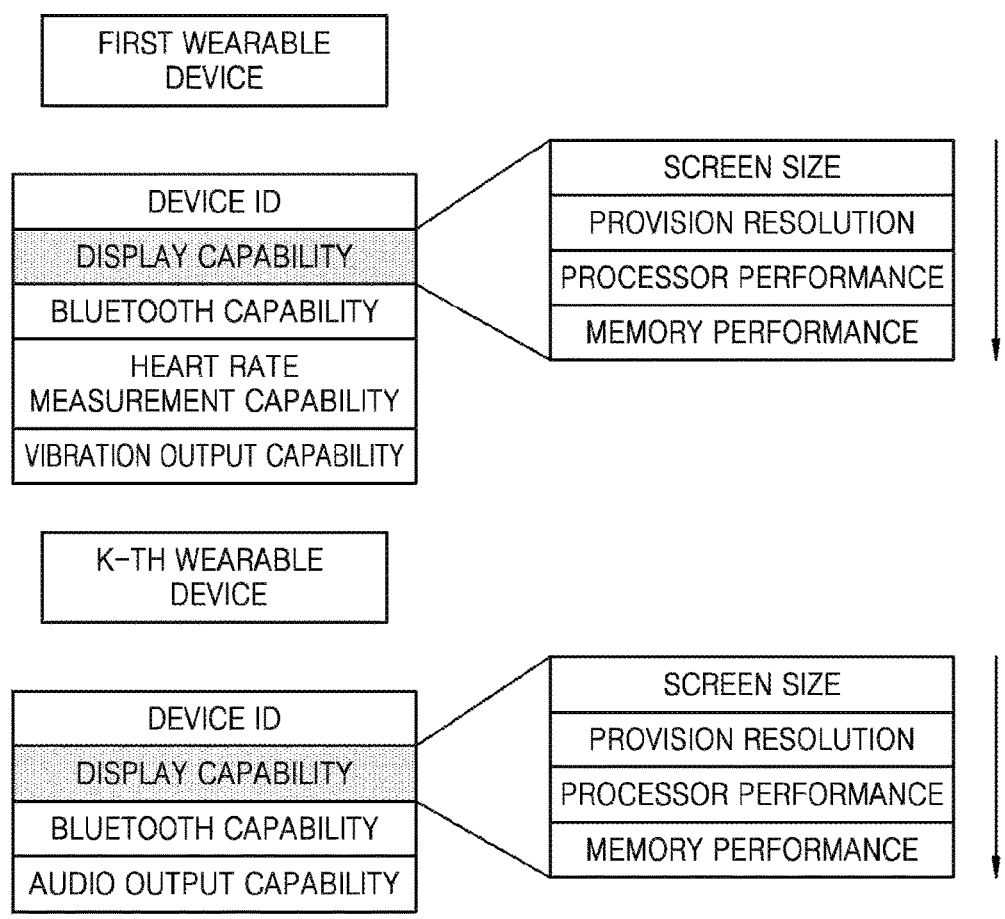
FIGS. 50, 51 and 52 are diagrams for describing a method by which a mobile terminal compares hardware performances of wearable devices, according to exemplary embodiments.
Figure 51:
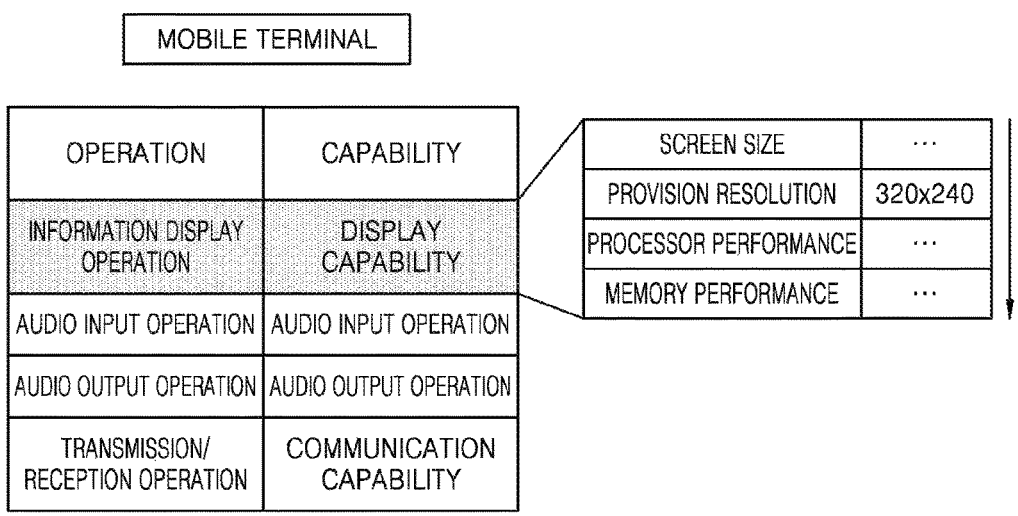
Figure 52:
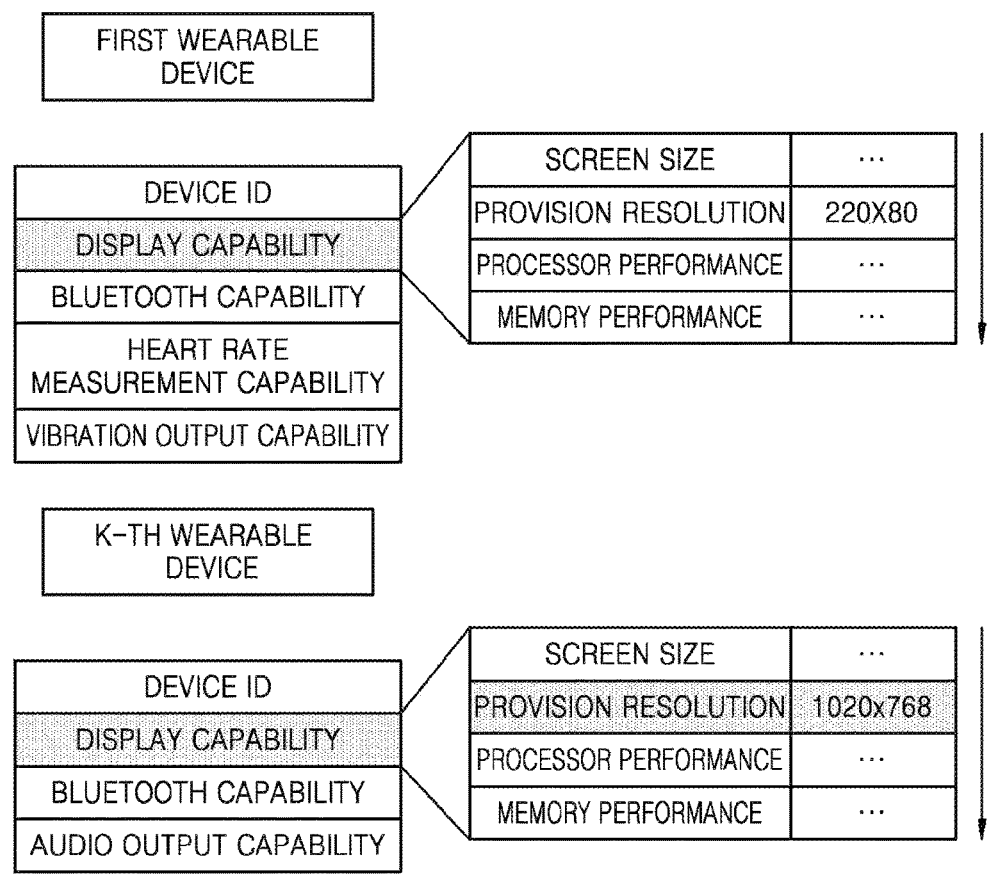

FIGS. 50 to 52 are diagrams for describing a method by which the mobile terminal 220 compares hardware performances of wearable devices, according to exemplary embodiments.

FIG. 50 is a conceptual diagram of a data structure of performance information about the wearable device that is stored in the memory of the mobile terminal 220, according to an exemplary embodiment. As illustrated in FIG. 50, the capability information about the wearable device may include hardware performance information and software performance information about the wearable device.

In the exemplary embodiment of FIG. 50, the first wearable device 210 and the K-th wearable device may include hardware performance and/or software performance with respect to a screen size, a provision resolution, processor performance, and memory performance in the case of the display capability. This list of types of performance is exemplary and the types of performances according to exemplary embodiments are not limited thereto.

The mobile terminal 220 may select a wearable device that is to perform the operation, taking into consideration performance for a specific capability. Alternatively, the mobile terminal 220 may select a wearable device that is to perform the operation, taking into consideration performances for a plurality of capabilities. For example, the mobile terminal 220 may calculate a performance score with respect to at least two capabilities and select a wearable device by using the calculated performance score. The mobile terminal 220 may apply different weights to different hardware performances FIG. 51 is a conceptual diagram of a data structure in which the mobile terminal 220 stores minimum performance information in a memory with respect to minimum hardware performance required to have the capability, according to an exemplary embodiment.

The mobile terminal 220 according to an exemplary embodiment may store the minimum performance information in the memory with respect to the capability required for performing a specific operation. The minimum performance information may be determined with respect to a specific capability. The minimum performance information may be information indicating minimum performance required for the wearable device so as to perform a specific operation that the wearable device is requested to perform from the mobile terminal 220. The mobile terminal 220 according to an exemplary embodiment may determine the wearable device that is to perform the specific operation by using the minimum performance information. For example, the mobile terminal 220 according to an exemplary embodiment may determine the wearable device that is to perform the specific operation by using the minimum performance information stored in the mobile terminal 220 and the performance information about the wearable device that is acquired from the wearable device.

For example, even when there is a wearable device capable of performing the specific operation, the mobile terminal 220 according to an exemplary embodiment may compare the performance information about the wearable device with respect to the specific operation with the minimum performance information about the mobile terminal 220, and determine the corresponding wearable device as the wearable device that is to perform the specific operation only when the performance information about the wearable device satisfies the minimum performance.

The mobile terminal 220 according to an exemplary embodiment may determine the wearable device, which is to perform the specific operation, by transmitting, to the wearable device, the minimum performance information about the specific capability to perform the specific operation, and receiving, from the wearable device, whether the minimum performance is satisfied. According to another exemplary embodiment, the mobile terminal 220 according to an exemplary embodiment may determine the wearable device, which is to perform the specific operation, by receiving, from the wearable device, the performance information to perform the specific operation, and comparing the performance information received from the wearable device with the minimum performance information. For example, if the performance for the specific capability of the wearable device is equal to or higher than the minimum performance, the mobile terminal 220 and the wearable device may be determined as satisfying the minimum performance.

Details will be described below with reference to FIG. 51. As illustrated in FIG. 51, the mobile terminal 220 according to an exemplary embodiment may store the minimum performance information in the memory with respect to the display capability required for performing an information display operation. The minimum performance information may be determined with respect to a specific capability. The minimum performance information may be information indicating minimum performance required for the wearable device so as to perform a specific operation that the wearable device is requested to perform from the mobile terminal 220. For example, the minimum performance information about the display capability may be determined based on a screen size, a provision resolution, processor performance, or memory performance. Referring to FIG. 51, the provision resolution, which is minimally required for performing the information display operation, may be 320×240, although it is understood that the minimum provision resolution may be greater or less than 320×240 according to exemplary embodiments. Therefore, in the exemplary embodiment of FIG. 51, the minimum performance information about the provision resolution in the display capability is 320×240.

FIG. 52 is a conceptual diagram of a data structure in which hardware performances of wearable devices are stored in the memory of the mobile terminal 220, according to an exemplary embodiment.

As illustrated in FIG. 52, the maximum resolution at which the first wearable device 210 has the display capability is 220×80, and the maximum resolution at which the K-th wearable device is capable of executing the display capability is 1020×768.

The mobile terminal 220 may select the K-th wearable device, which is capable of providing a higher resolution than 320×240, that is, the minimum resolution of the display required for performing the information display operation, as the wearable device for performing the information display operation.

According to an exemplary embodiment, the mobile terminal 220 may select one wearable device, based on a preset criterion, when there are a plurality of wearable devices that provide a higher resolution than the minimum resolution of the display required for performing the information display operation. For example, the mobile terminal 220 may select a wearable device, the maximum resolution of which has the smallest difference from the required resolution of the display. Alternatively, the mobile terminal 220 may select a wearable device, the aspect ratio of which is substantially equal to the aspect ratio of the required resolution of the display.

Figure 53:
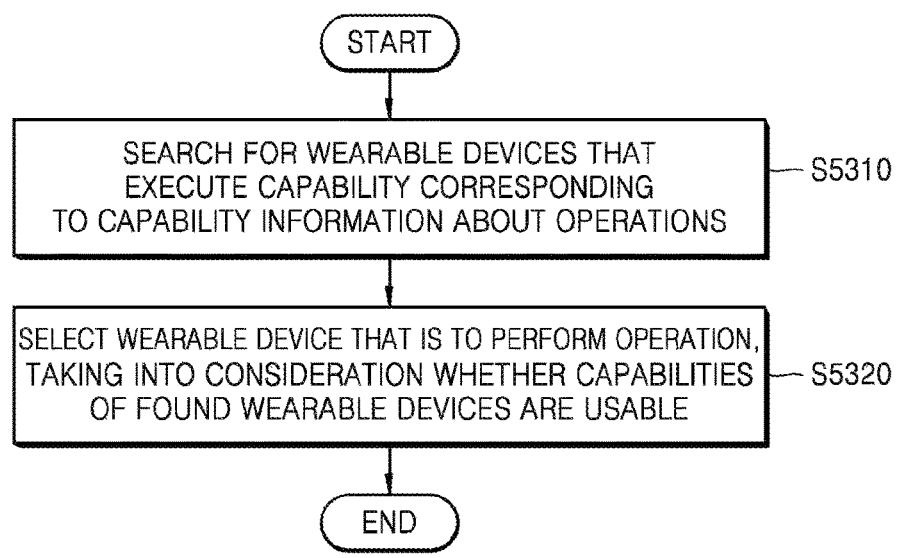
FIG. 53 is a flowchart of a method by which a mobile terminal selects a wearable device, which is to perform an operation, from among a plurality of wearable devices, according to another exemplary embodiment.

FIG. 53 is a flowchart of a method by which the mobile terminal 220 selects a wearable device that is to perform an operation from among a plurality of wearable devices, according to another exemplary embodiment.

In operation S5310, the mobile terminal 220 may search for wearable devices that execute a capability corresponding to the capability information about operations. In the above-described manner, the mobile terminal 220 may search for wearable devices having the capability to perform the operations. In operation S5320, the mobile terminal 220 may select a wearable device that is to perform the operation, taking into consideration whether capabilities of found wearable devices are usable. The mobile terminal 220 may determine the wearable device that is to perform the operation, taking into consideration various factors, such as whether the user is enabled to recognize information provided from the wearable devices, whether the mobile terminal 220 is enabled to control the wearable devices, whether the user wears the wearable devices, and/or whether the mobile terminal 220 is enabled to display a notification to the user in a case where the mobile terminal 220 provides a UI. Hereinafter, the above-described situations will be described with reference to the accompanying drawings.

Figure 54:
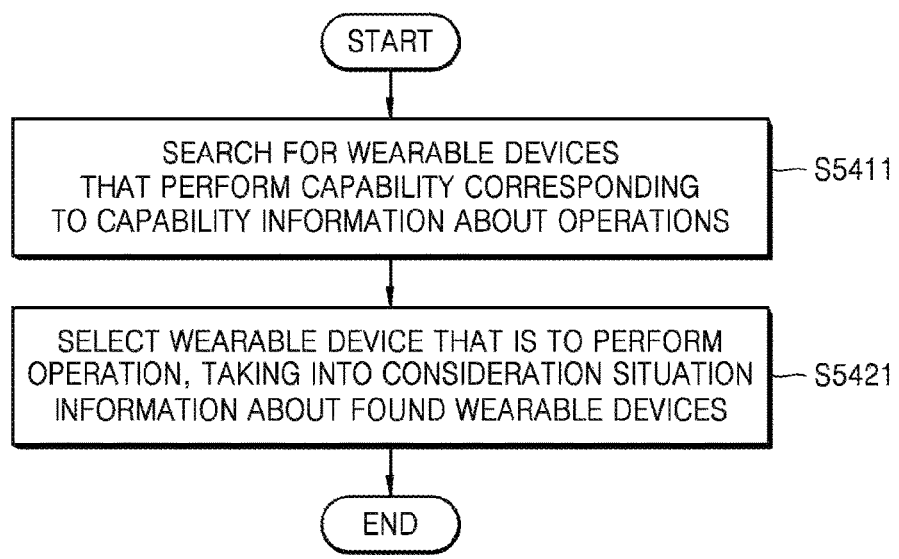
FIG. 54 is a flowchart of a method by which a mobile terminal selects a wearable device, which is to perform an operation, from among a plurality of wearable devices, taking into consideration situation information, according to an exemplary embodiment.

FIG. 54 is a flowchart of a method by which the mobile terminal 220 selects a wearable device that is to perform an operation from among a plurality of wearable devices, taking into consideration situation information, according to an exemplary embodiment. In operation S5411, the mobile terminal 220 may search for wearable devices that have a capability corresponding to capability information about operations.

In operation S5421, the mobile terminal 220 may select a wearable device that is to perform the operation, taking into consideration situation information about found wearable devices. The mobile terminal 220 may take into consideration wearing position information about the wearable devices as the situation information about the wearable devices. For example, the mobile terminal 220 may determine whether to display information around a wrist of the user or whether to display information in a user's field of vision and may determine whether to display information to the user through the smart watch or whether to display information to the user through the smart glass.

Alternatively, the mobile terminal 220 may take into consideration an environment where the wearable device is located. For example, the mobile terminal 220 may use luminous intensity input from an illuminance sensor to determine whether the user may not be able to instantly recognize the smart watch because the smart watch is covered with a collar. Alternatively, the mobile terminal 220 may use biometric information. When the wearable device measures biometric information, the mobile terminal 220 may determine that the user is wearing the corresponding wearable device and perform an information display operation by using the corresponding wearable device.

Figure 55:
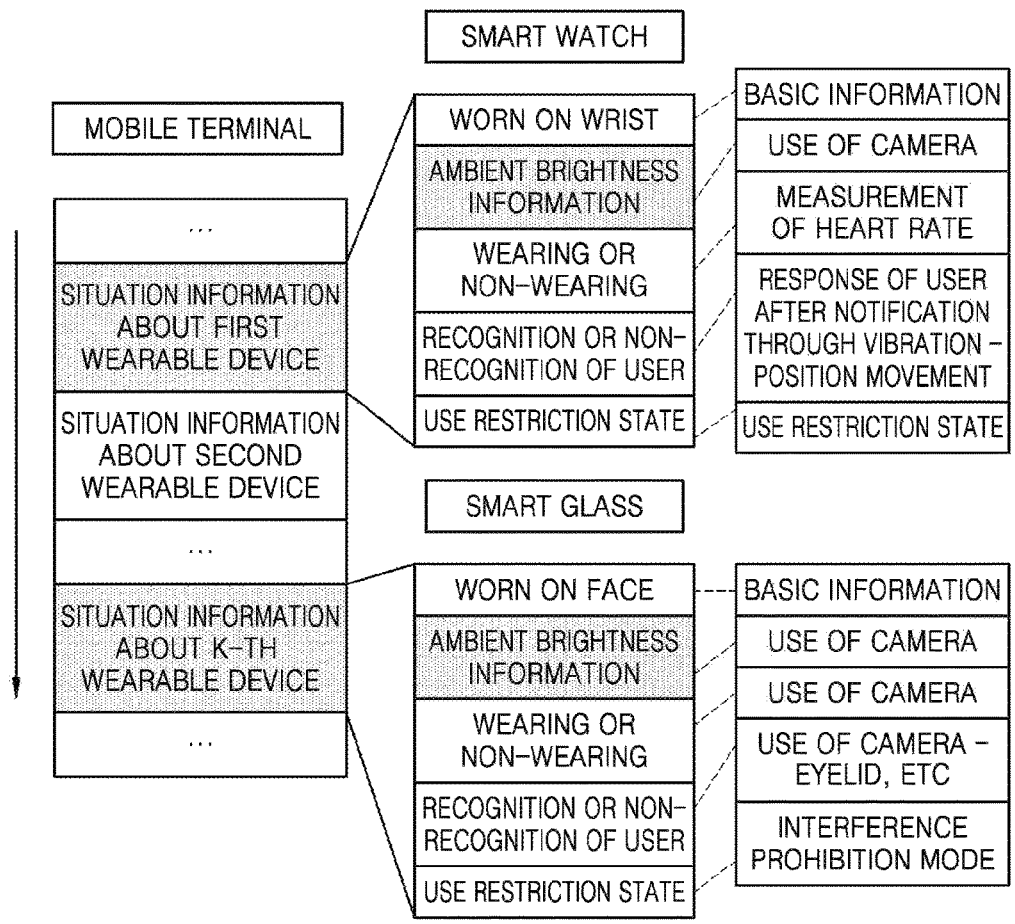
FIG. 55 is a diagram for describing a method by which a mobile terminal stores situation information data of wearable devices in a memory, according to an exemplary embodiment.

FIG. 55 is a diagram for describing a method by which the mobile terminal 220 stores situation information data of wearable devices in a memory, according to an exemplary embodiment. The mobile terminal 220 may store the situation information about the wearable devices with respect to each of the wearable device.

Referring to FIG. 55, a first wearable device 210 is a smart watch and a K-th wearable device is a smart glass. In the exemplary embodiment of FIG. 55, situation information about the first wearable device 210 and the K-th wearable device may include wearing positions, ambient brightness information, and wearing or non-wearing of the wearable devices.

For example, the mobile terminal 220 may use ambient brightness information among pieces of situation information about the first wearable device 210 and the K-th wearable device to determine a wearable device as a device that is to perform the information display operation, when the corresponding wearable device has ambient brightness of a preset illuminance or higher.

The acquiring of the situation information will be described below in more detail. The mobile terminal 220 may receive, from the first wearable device 210, basic information indicating that the first wearable device 210 is the smart watch, and acquire situation information indicating that the first wearable device 210 is worn on a wrist of the user.

In addition, the mobile terminal 220 may use a camera module of the first wearable device 210 to acquire ambient brightness information about the first wearable device 210. The mobile terminal 220 may use a heart rate measurement module of the first wearable device 210 to acquire information about whether the user wears the first wearable device 210 and may use a vibration module of the first wearable device 210 to confirm whether the user recognizes the first wearable device 210.

Similarly, the mobile terminal 220 may receive, from the K-th wearable device, basic information indicating whether the K-th wearable device is the smart glass, and acquire situation information indicating whether the K-th wearable device is worn on a face. The mobile terminal 220 may use a camera module of the K-th wearable device to acquire ambient brightness information about the K-th wearable device, information about whether the K-th wearable device is worn, and information about whether the user recognizes information displayed on the K-th wearable device. In addition, the mobile terminal 220 may acquire, from the K-th wearable device, information about whether an interference prohibition mode is set to the K-th wearable device and determine whether the mobile terminal 220 is capable of controlling the K-th wearable device under the current situation.

Figure 56:
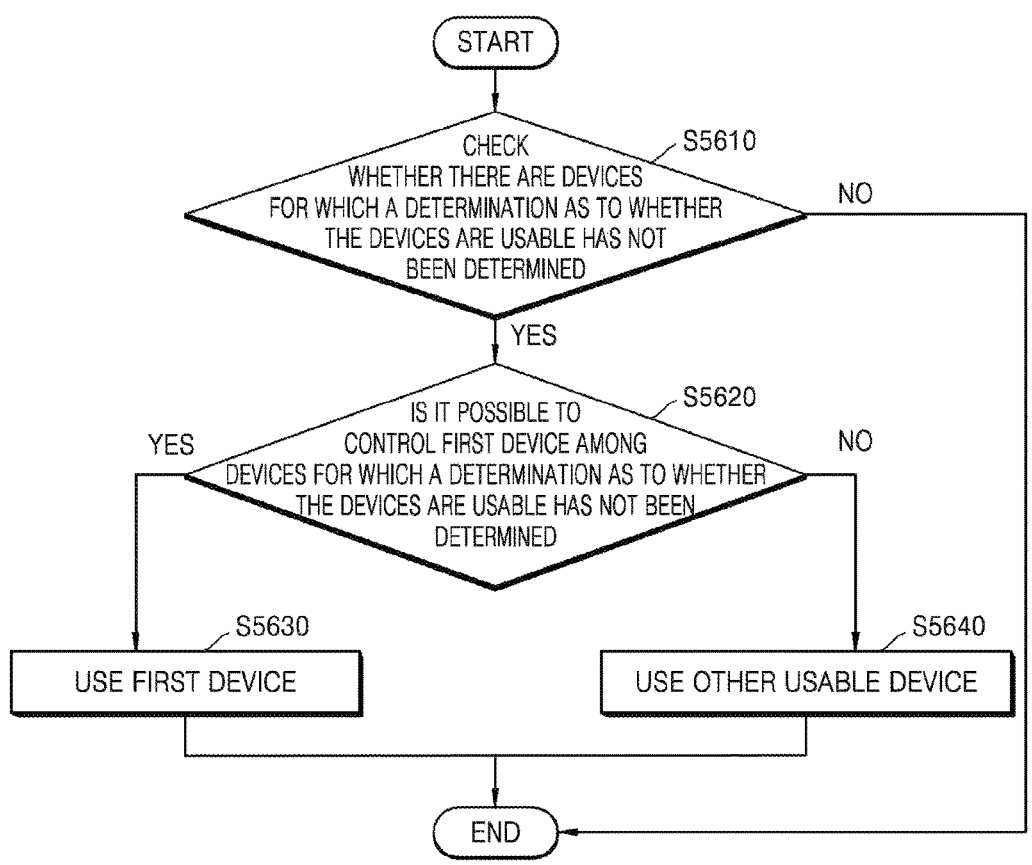
FIG. 56 is a flowchart of a method by which a mobile terminal determines a device having a capability to perform an operation from among a plurality of devices, according to an exemplary embodiment.

FIG. 56 is a flowchart of a method by which the mobile terminal 220 determines a device having a capability to perform an operation from among a plurality of devices, according to an exemplary embodiment.

In operation S5610, the mobile terminal 220 may check whether there are devices for which a determination as to whether the devices are usable has not been determined. If there are no devices for which a determination as to whether the devices are usable has not been determined, the mobile terminal 220 may determine that there is no usable device.

In operation S5620, the mobile terminal 220 may determine whether it is possible to control the first device in a list of devices for which a determination as to whether the devices are usable has not been determined. When a wearable device is in an uncontrollable state, the situation information may indicate that the corresponding wearable device is in the uncontrollable state. Alternatively, when the mobile terminal 220 transmits a response request to a wearable device and does not receive a response from the corresponding wearable device, the mobile terminal 220 may determine the corresponding wearable device as being in the uncontrollable state. Alternatively, when the mobile terminal 220 transmits a control request to a wearable device and does not receive a response from the corresponding wearable device, the mobile terminal 220 may determine the corresponding wearable device as being in the uncontrollable state.

In operation S5630, when it is possible to control the first device in the list of devices for which a determination as to whether the devices are usable has not been determined, the mobile terminal 220 may perform the operation by using the corresponding first device.

In operation S5640, when it is impossible to control the first device in the list of devices for which a determination as to whether the devices are usable has not been determined, the mobile terminal 220 may perform the operation by using another usable device. The mobile terminal 220 may re-determine usable devices with respect to other devices except for the first device in the list of devices for which a determination as to whether the devices are usable has not been determined. For example, the mobile terminal 220 may perform operation S5610 and subsequent operations on the other devices except for the first device in the list of devices for which a determination as to whether the devices are usable has not been determined.

Figure 57:
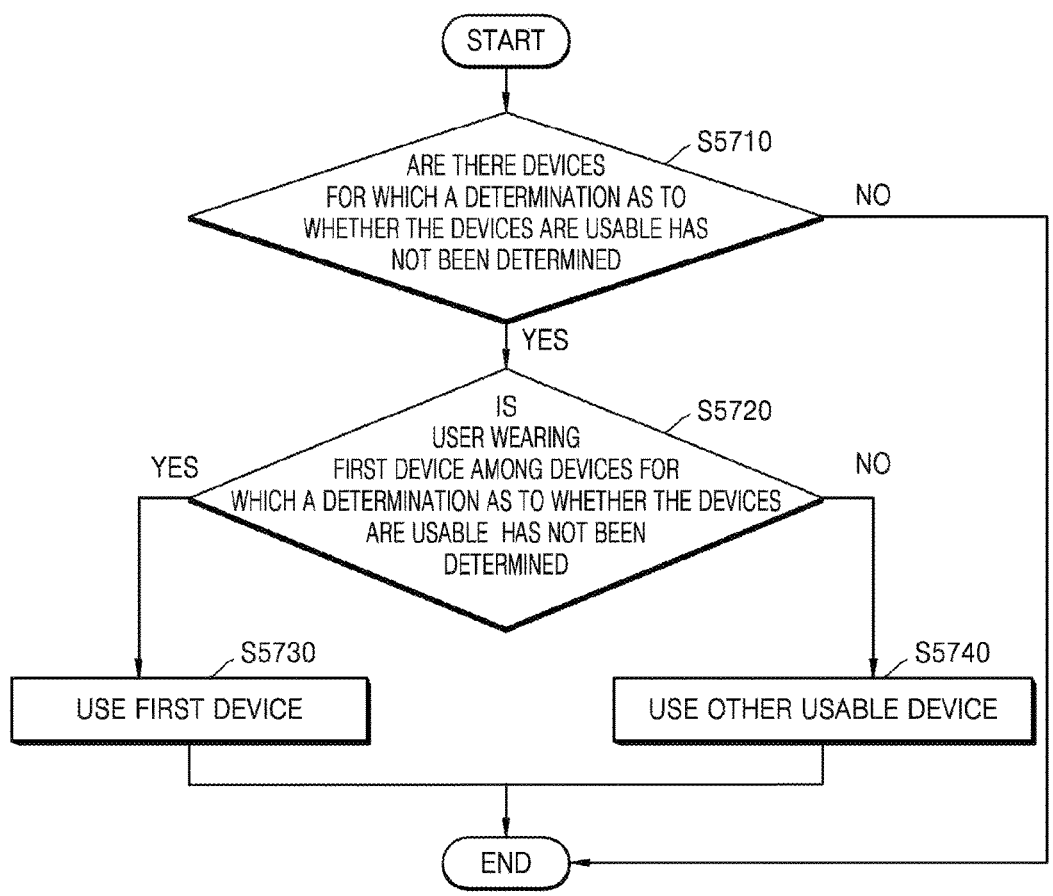
FIGS. 57 and 58 are flowcharts of a method by which a mobile terminal determines a device for performing an operation from among a plurality of devices, according to another exemplary embodiment.
Figure 58:
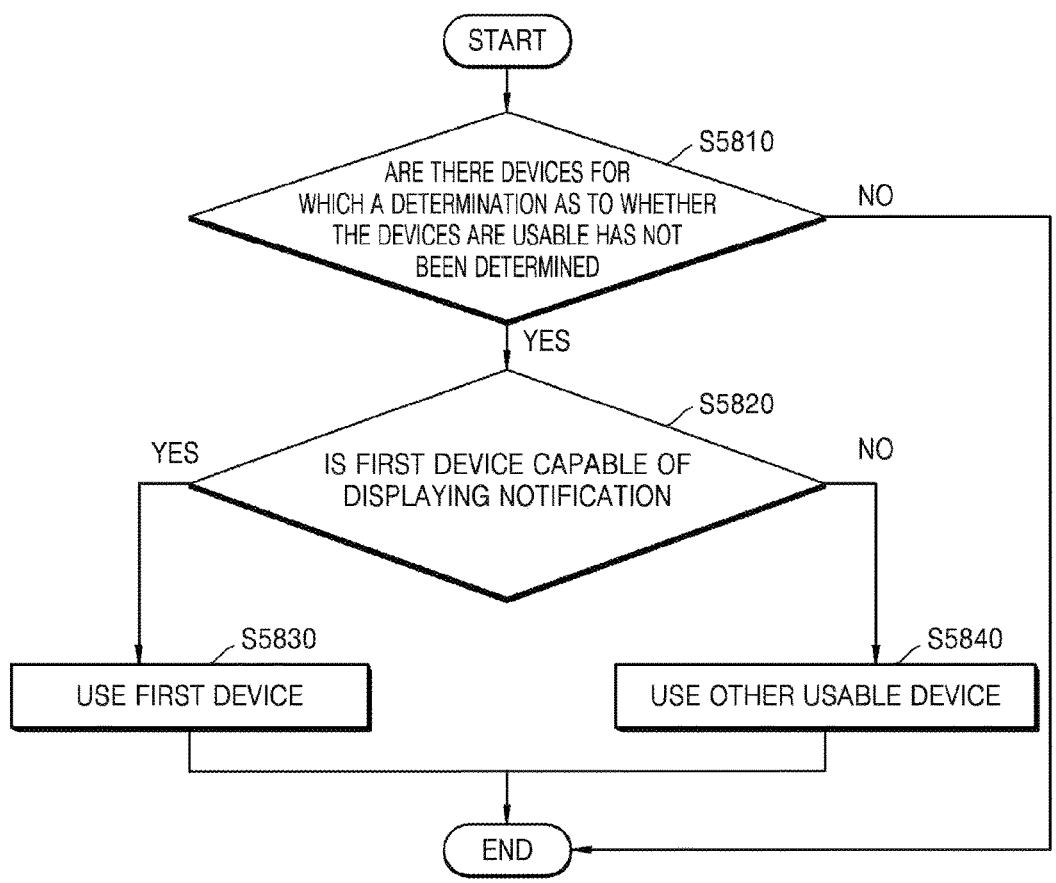

FIGS. 57 and 58 are flowcharts of a method by which the mobile terminal 220 determines a device for performing an operation from among a plurality of devices, according to an exemplary embodiment.

Referring to FIG. 57, in operation S5710, the mobile terminal 220 may check whether there are devices for which a determination as to whether the devices are usable has not been determined, in a similar manner to the device determining method of FIG. 56, and determines a wearable device that is to perform the operation. In operation S5720, the mobile terminal 220 may determine a device that is to perform the operation, based on whether the wearable device is being worn.

In operation S5720, the mobile terminal 220 may determine whether the user is wearing the first device in the list of devices for which a determination as to whether the devices are usable has not been determined. For example, when a biometric signal measured by a wearable device has a value within a valid range, the mobile terminal 220 may determine that the corresponding wearable device is being worn.

When it is determined that the first wearable device is being worn, the mobile terminal 220 may determine the first wearable device as the usable device. In operation S5730, the mobile terminal 220 may perform the operation by using the usable first device. When it is determined that the first wearable device is not worn, the mobile terminal 220 may determine the first wearable device as an unusable device. In operation S5740, the mobile terminal 220 may perform the operation by using another of the usable wearable devices. The mobile terminal 220 may re-determine wearing or non-wearing with respect to other devices except for the first device in the list of devices for which a determination as to whether the devices are usable has not been determined. For example, the mobile terminal 220 may perform operations S5710 and S5720 on the other devices except for the first device in the list of devices for which a determination as to whether the devices are usable has not been determined, and perform operations S5730 or S5740 again.

Referring to FIG. 58, in a similar manner to the device determining method of FIG. 56, the mobile terminal 220 may determine a wearable device that is to perform the operation. In operation S5810, the mobile terminal 220 may check whether there is devices for which a determination as to whether the device are usable has not been determined. In operation S5820, the mobile terminal 220 may determine a device that is to perform the operation based on whether the wearable device is capable of displaying a notification.

In operation S5820, the mobile terminal 220 may determine whether the first device in the list of devices for which a determination as to whether the devices are usable has not been determined is capable of displaying a notification. For example, the mobile terminal 220 may retrieve the capability information about the wearable device and determine whether the corresponding wearable device has the information display capability.

When it is determined that the first wearable device is capable of displaying the notification, the mobile terminal 220 may determine the first wearable device as a usable device. In operation S5830, the mobile terminal 220 may perform the operation by using the first wearable device.

When it is determined that the first wearable device is incapable of displaying the notification, the mobile terminal 220 may determine the first wearable device as an unusable device. In operation S5840, the mobile terminal 220 may perform the required operation by using another usable wearable device. The mobile terminal 220 may re-determine whether other devices except for the first device in the list of devices for which a determination as to whether the devices are usable has not been determined are capable of displaying the notification. For example, the mobile terminal 220 may perform operations S5810 and S5820 on the other devices except for the first device in the list of devices for which a determination as to whether the devices are usable has not been determined, and perform operations S5830 or S5840 again.

Figure 59:
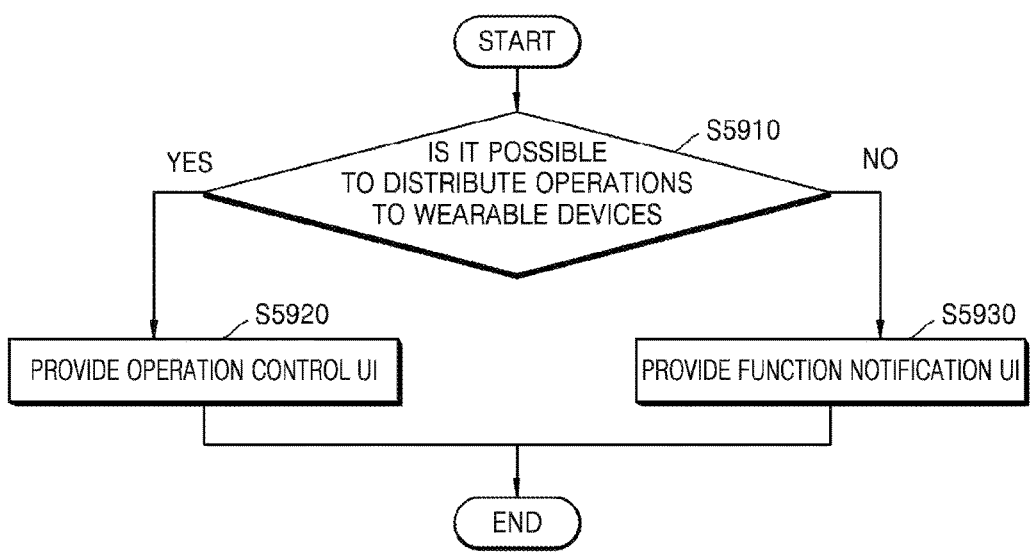
FIG. 59 is a flowchart of a method by which a mobile terminal provides a user interface (UI) to a wearable device, according to an exemplary embodiment.

FIG. 59 is a flowchart of a method by which the mobile terminal 220 provides a UI to a wearable device, according to an exemplary embodiment.

In operation S5910, the mobile terminal 220 according to an exemplary embodiment may determine whether it is possible to distribute operations to a plurality of wearable devices.

In operation S5920, when it is determined that it is possible to distribute the operations to the plurality of wearable devices, the mobile terminal 220 may provide at least one of the wearable devices with an operation control UI.

In operation S5930, when it is determined that it is impossible (or difficult) to distribute the operations to the plurality of wearable devices, the mobile terminal 220 may simply provide a function notification UI.

The function notification UI is an alternative UI that is provided when it is impossible (or difficult) to provide the operation control UI. The mobile terminal 220 may provide the wearable device with information indicating that it is impossible (or difficult) to provide the operation control UI. Alternatively, the mobile terminal 220 may provide no UI when it is impossible (or difficult) to provide the operation control UI.

Figure 60:
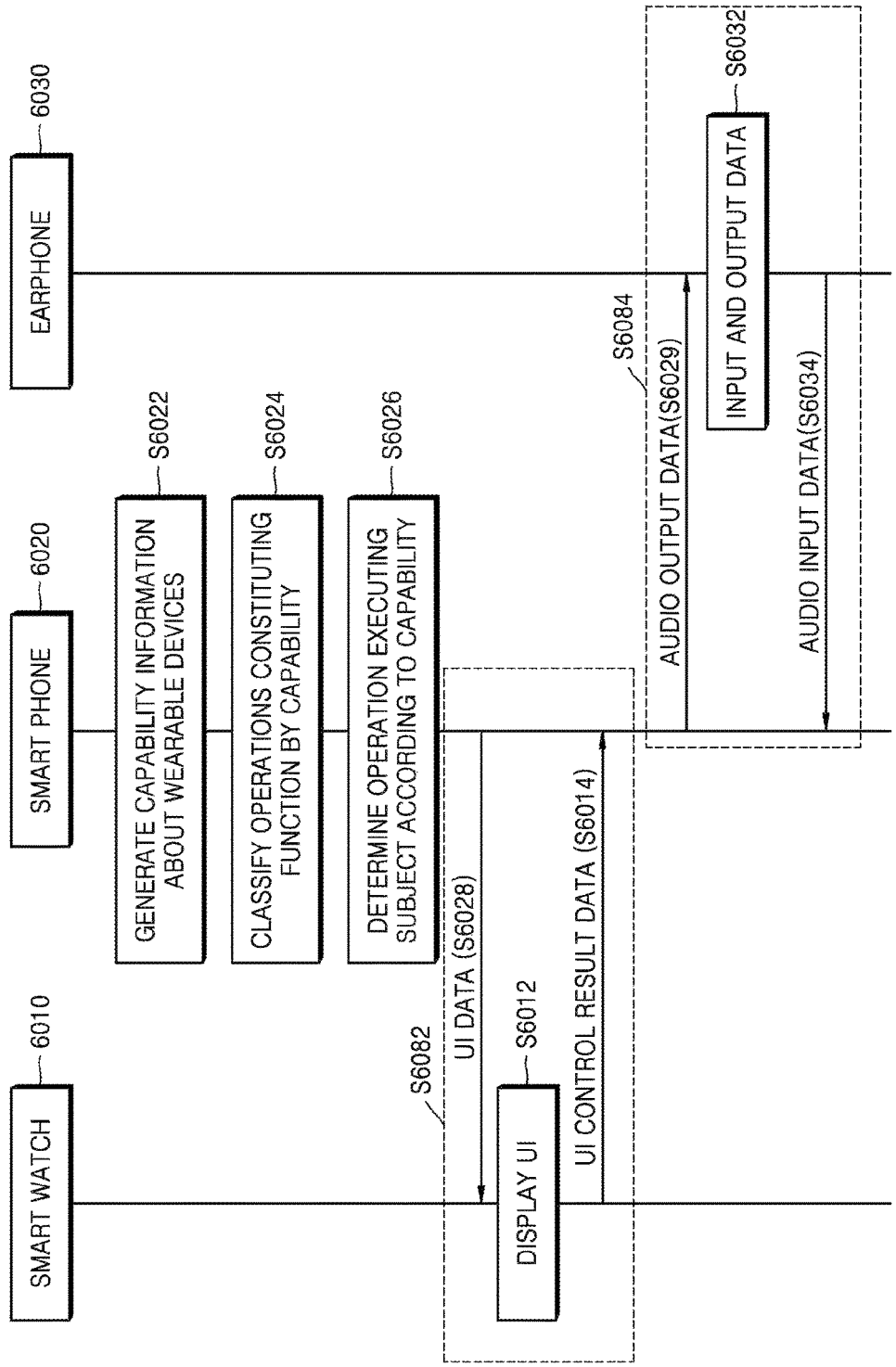
FIG. 60 is a flowchart of a method of providing a call function, according to an exemplary embodiment.

FIG. 60 is a flowchart of a method performed by a call function providing system to provide a call function, according to an exemplary embodiment.

FIG. 60 is a flowchart of a method of providing a call function, according to an exemplary embodiment. In operation S6022, a smart phone 6020 may generate capability information about a plurality of wearable devices. In operation S6024, the smart phone 6020 may classify a plurality of operations constituting the function by capability. In operation S6026, the smart phone 6020 may determine an operation executing subject according to capability. In operation S6028, the smart phone 6020 may transmit UI data to a smart watch 6010. In operation S6012, the smart watch 6010 may display a UI according to the UI data received from the smart phone 6020. In operation S6014, the smart watch 6010 may transmit UI control result data to the smart phone 6020. In operation S6029, the smart phone 6020 may transmit audio output data to an earphone 6030.

The smart phone 6020 may transmit output audio data to the earphone 6030 according to the UI control result data received from the smart watch 6010. The output audio data may be audio data of another user that the smart phone 6020 receives from a base station or other terminal. The smart watch 6010 may transmit, to the smart phone 6020, control data generated by the UI operation of the user. The smart phone 6020 may determine whether to transmit the output audio data to the earphone 6030 by using the control data received from the smart phone 6010. In operation S6029, the earphone 6030 may output the audio by using the audio output data. In operation S6032, the earphone 6030 may receive the audio of the user and generate audio data. The earphone 6030 may include a microphone and receive the audio of the user. In operation S6034, the earphone 6030 may transmit the received audio data to the smart phone 6020. The smart phone 6020 may perform the call function by transmitting the audio data received from the earphone 6030 to the base station or other terminal.

Figure 61:
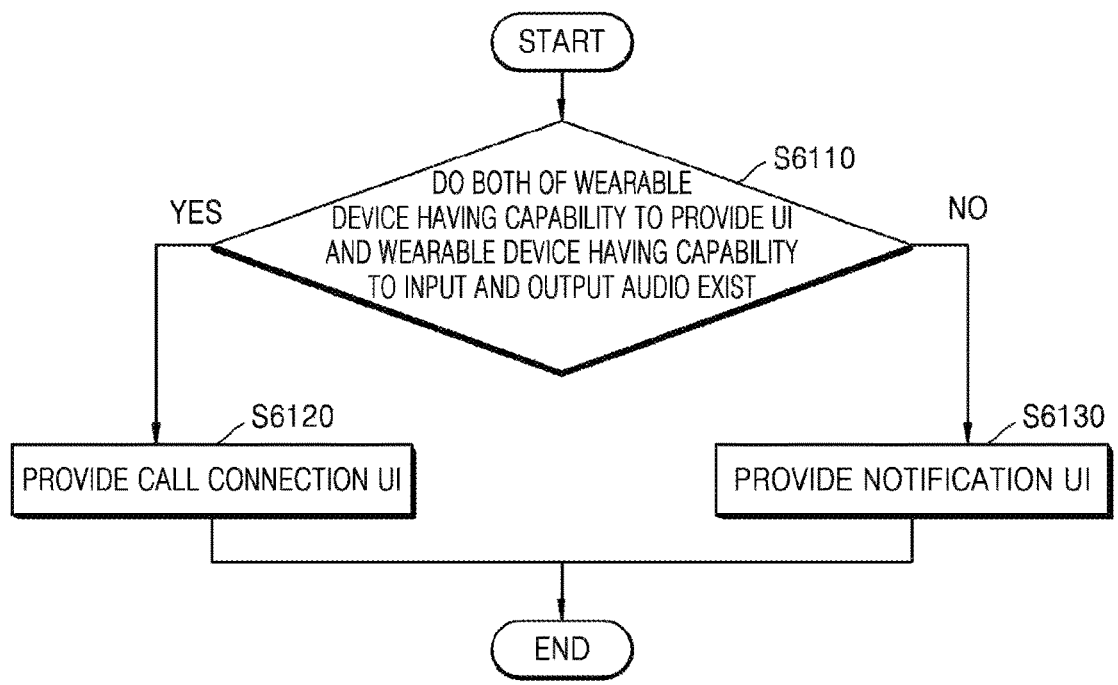
FIG. 61 is a flowchart of a method by which a smart phone determines a UI to be transmitted to the smart watch in a method of providing a call function, according to an exemplary embodiment.

FIG. 61 is a flowchart of a method by which the smart phone 6020 determines a UI to be transmitted to the smart watch 6010 in the method of providing the call function, according to an exemplary embodiment.

Referring to FIG. 61, in operation S6110, the smart phone 6020 may determine whether both a wearable device having a capability to provide the UI and a wearable device having a capability to input and output audio exist.

When it is determined that both the wearable device having the capability to provide the UI and the wearable device having the capability to input and output audio exist, the smart phone 6020 may provide a call connection UI. For example, in operation S6120, the smart phone 6020 may provide the call connection UI to the wearable device having the capability to provide the UI.

In operation S6130, when it is determined that either of the wearable device having the capability to provide the UI and the wearable device having the capability to input and output audio does not exist, the smart phone 6020 may provide a notification UI to the existing wearable device. In operation S6130, when it is determined that both of the wearable device having the capability to provide the UI and the wearable device having the capability to input and output audio do not exist, the smart phone 6020 may provide the notification UI to the smart phone 6020.

The notification UI may be a UI that notifies information, and the type of the information is not limited to any particular type. For example, the notification UI may be a UI notifying that the smart phone 6020 has received a call acceptance request from a base station or other terminal. Alternatively, the notification UI may be a UI notifying that the connection of wearable devices required for providing the call function is insufficient.

Figure 62:
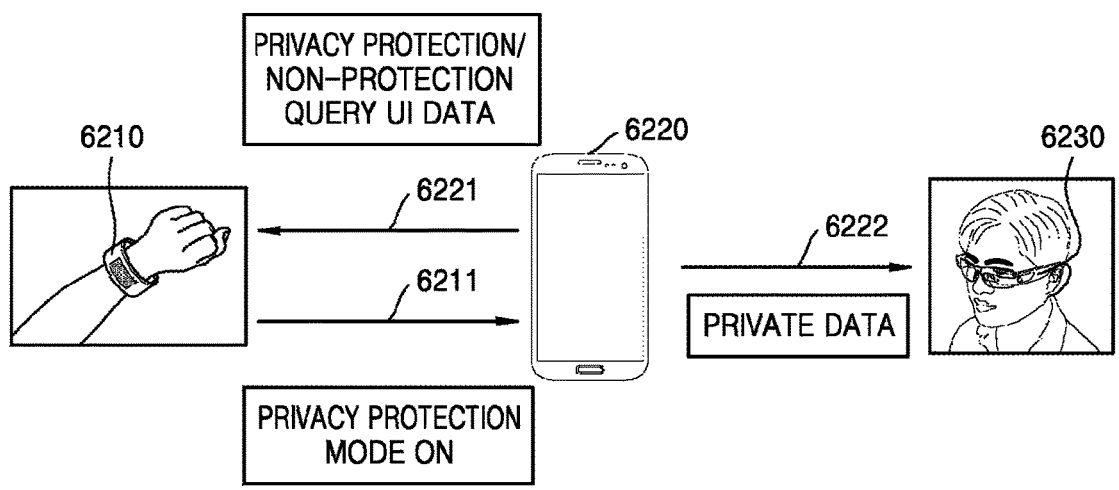
FIGS. 62, 63 and 64 are diagrams for describing a method of providing a private information displaying function, according to an exemplary embodiment.
Figure 63:
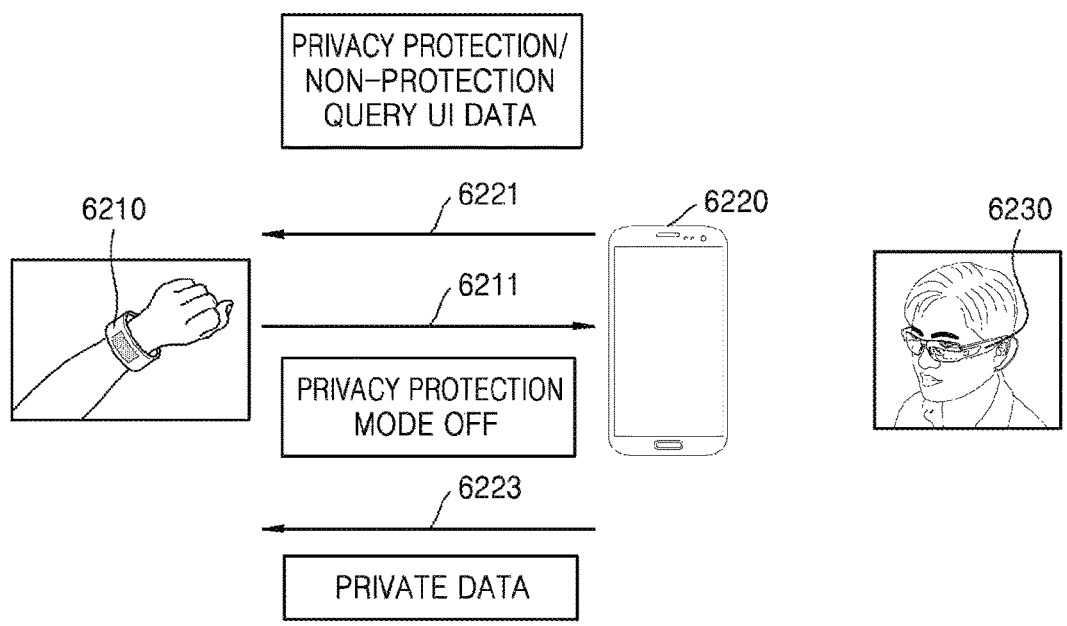
Figure 64:
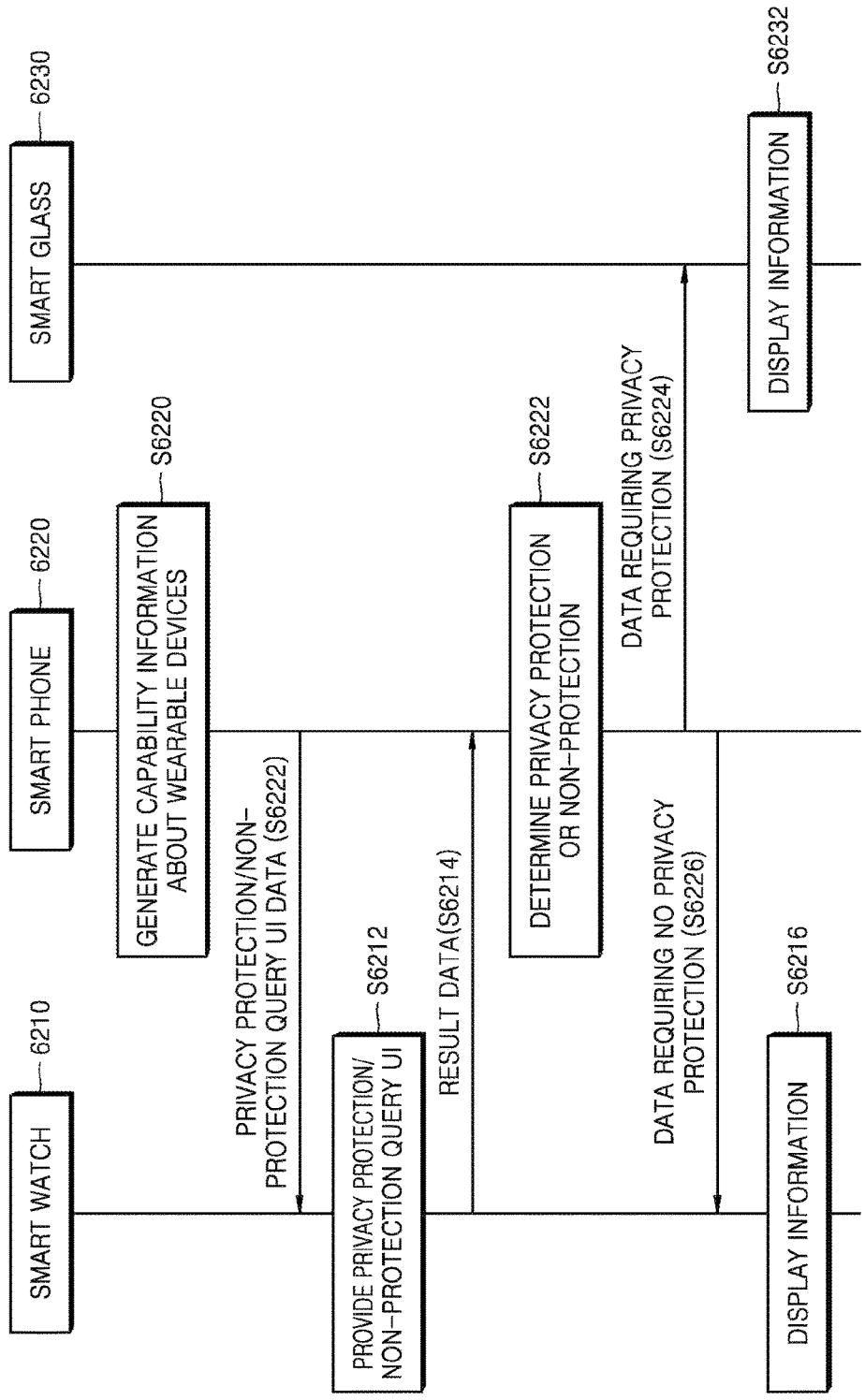

FIGS. 62 to 64 are diagrams for describing a method of providing a private information displaying function, according to an exemplary embodiment.

As illustrated in FIGS. 62 to 64, the method of providing the private information displaying function, according to an exemplary embodiment, may be performed using a smart watch 6210, a smart phone 6220, and a smart glass 6230.

Referring to FIG. 62, the smart watch 6210 may transmit privacy protection or non-protection query UI data to the smart watch 6210. The smart watch 6210 may provide a privacy protection or non-protection query UI to the user and receive relevant input from the user. When an input of operating a privacy protection mode is received from the user, the smart watch 6210 may transmit a privacy protection mode ON message to the smart phone 6220. When the privacy protection mode ON message is received, the smart phone 6220 may transmit data, which is predefined as private data, to the smart glass 6230.

Referring to FIG. 63, when an input of not operating the privacy protection mode is received from the user, or when an input of operating the privacy protection mode is not received from the user, the smart watch 6210 may transmit a privacy protection mode OFF message to the smart phone 6220. When the privacy protection mode OFF message is received, the smart phone 6220 may transmit data, which is predefined as private data, to the smart watch 6210.

When an input of not operating the privacy protection mode is received from the user, or when an input of operating the privacy protection mode is not received from the user, the smart watch 6210 may not transmit a privacy protection mode message to the smart phone 6220. When the privacy protection mode message is not received within a preset time, the smart phone 6220 may transmit data, which is predefined as private data, to the smart watch 6210.

The method of providing the private information displaying function, according to an exemplary embodiment, will be described below with reference to FIG. 64.

In operation S6220, the smart phone 6220 may generate capability information about a plurality of wearable devices.

In operation S6222, the smart phone 6220 may transmit privacy protection or non-protection query UI data to the smart watch 6210.

In operation S6212, the smart watch 6210 may provide a privacy protection or non-protection query UI to the user. The smart watch 6210 may receive an input about the privacy protection or non-protection from the user through the UI. In operation S6214, the smart watch 6210 may transmit, to the smart phone 6220, result data of the query about the privacy protection or non-protection, which is generated using input data regarding the privacy protection or non-protection received from the user.

In operation S6222, the smart phone 6220 may determine the privacy protection or non-protection by using the result data received from the smart watch 6210. In operation S6222, when the result data has a value requesting the privacy protection, the smart phone 6220 may determine the current state as the privacy protection mode. In operation S6224, in the privacy protection mode, the smart phone 6220 may transmit data to the smart glass 6230. FIG. 62 illustrates an example in which the data requiring the privacy protection in the privacy protection mode is transmitted to the smart glass 6230, and the smart glass 6230 displays the data requiring the privacy protection. The smart glass 6230 may display information to the user so that only a person wearing the smart glass 6230 is enabled to easily recognize the information. Since the information requiring the privacy protection is displayed on the smart glass 6230, the user is enabled to personally view the information requiring the privacy protection.

In operation S6226, when the result data does not have a value requesting the privacy protection, the smart phone 6220 may determine the current state as the privacy non-protection mode. In operation S6226, in the privacy non-protection mode, the smart phone 6220 may transmit data to the smart watch 6210. In the privacy non-protection mode, the data requiring no privacy protection may be transmitted to the smart watch 6210. In operation S6216, as illustrated in FIG. 63, the smart watch 6210 may display the data requiring no privacy protection.

Figure 65:
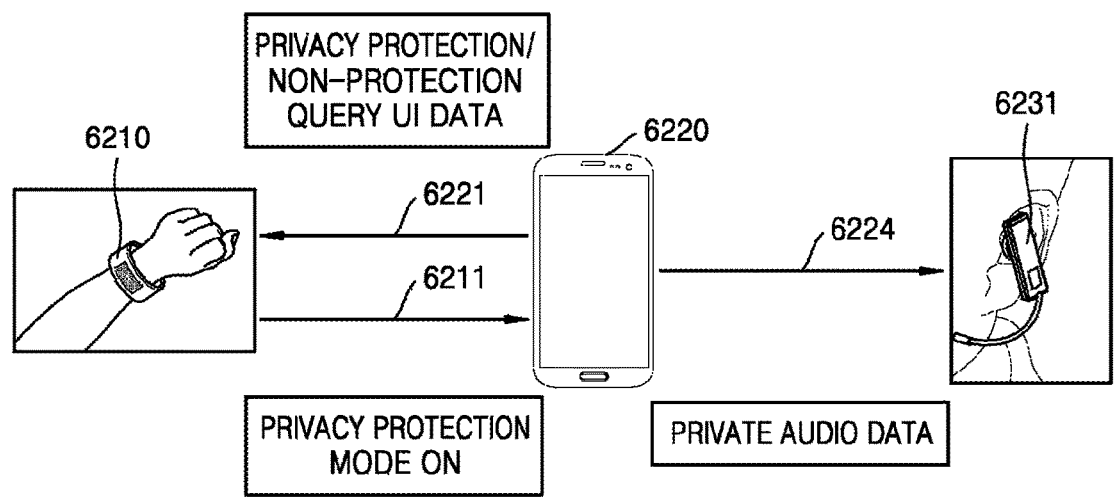
FIGS. 65, 66 and 67 are diagrams for describing a method of providing a private information displaying function, according to another exemplary embodiment.
Figure 66:
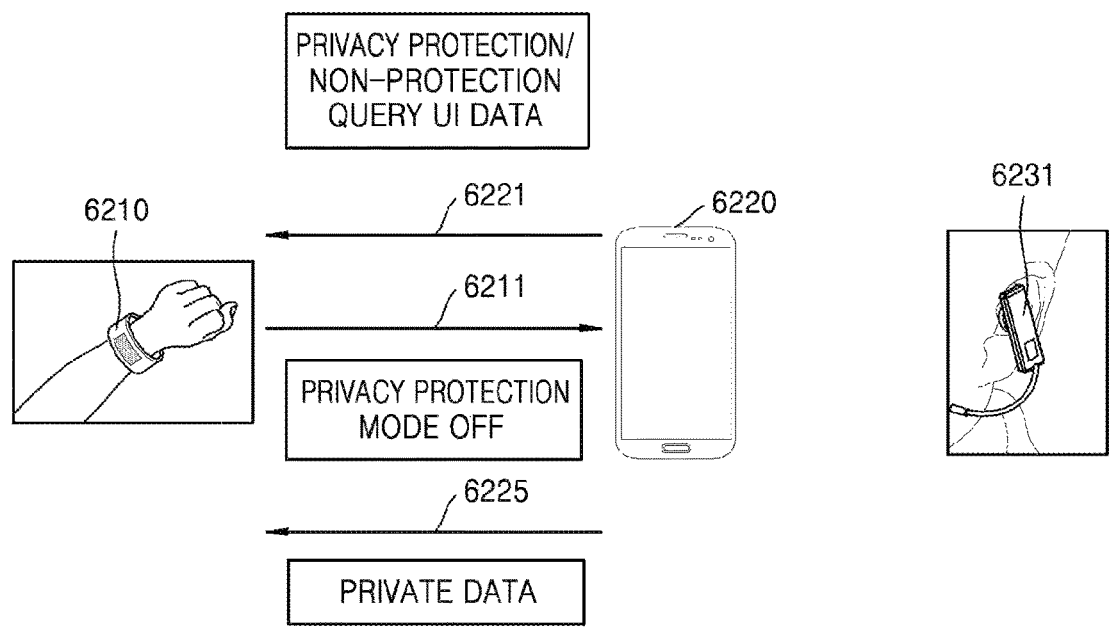
Figure 67:
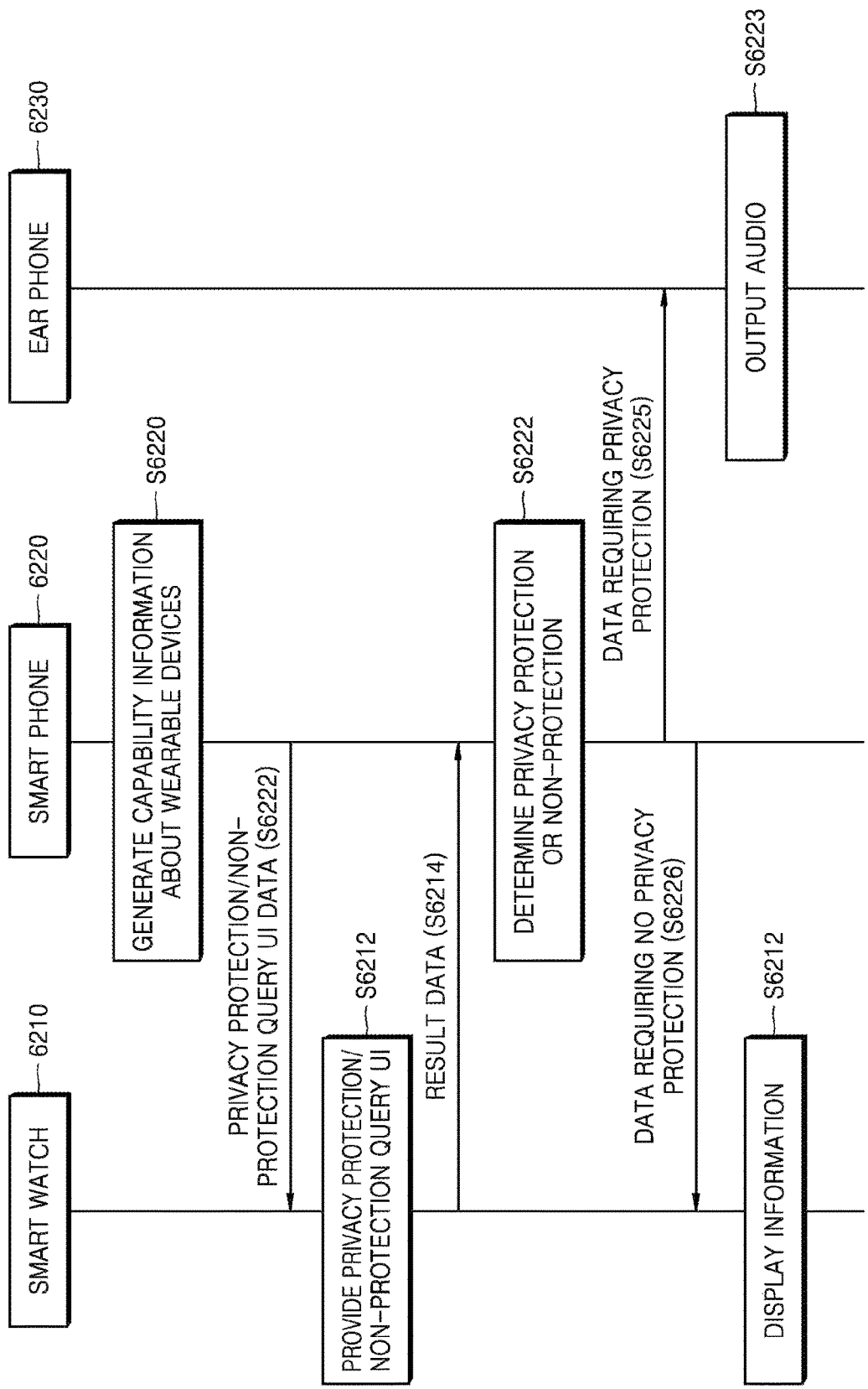

FIGS. 65 to 67 are diagrams for describing a method of providing a private information displaying function, according to another exemplary embodiment.

As illustrated in FIGS. 65 to 67, the method of providing the private information displaying function, according to another exemplary embodiment, may be performed using a smart watch 6210, a smart phone 6220, and an earphone 6231.

The method of providing the private information displaying function, according to another exemplary embodiment, will be described below with reference to FIG. 67.

In operation S6220, the smart phone 6220 may generate capability information about a plurality of wearable devices. In operation S6222, the smart phone 6220 may transmit privacy protection or non-protection query UI data to the smart watch 6210.

In operation S6212, the smart watch 6210 may provide a privacy protection or non-protection query UI to a user. The smart watch 6210 may receive an input about the privacy protection or non-protection from the user through the UI. In operation S6214, the smart watch 6210 may transmit, to the smart phone 6220, result data of the query about the privacy protection or non-protection, which is generated using input data regarding the privacy protection or non-protection received from the user.

In operation S6222, the smart phone 6220 may determine the privacy protection or non-protection by using the result data received from the smart watch 6210. In operation S6222, when the result data has a value requesting the privacy protection, the smart phone 6220 may determine the current state as the privacy protection mode. In operation S6225, in the privacy protection mode, the smart phone 6220 may transmit data to the earphone 6231. The smart phone 6220 may convert the data into audio data so as to transmit the data to the earphone 6231. For example, the smart phone 6220 may convert text data into corresponding audio data and output the audio data in S6223. FIG. 67 illustrates an example in which the data requiring the privacy protection in the privacy protection mode is transmitted to the earphone 6231, and the earphone 6231 displays the data requiring the privacy protection. The earphone 6230 may provide information to the user so that only a person wearing the earphone 6231 is enabled to easily recognize the information. Since the information requiring the privacy protection is output through the earphone 6231, the user is enabled to personally confirm the information requiring the privacy protection.

In operation S6222, when the result data does not have a value requesting the privacy protection, the smart phone 6220 may determine the current state as the privacy non-protection mode. In operation S6226, in the privacy non-protection mode, the smart phone 6220 may transmit data to the smart watch 6210. In the privacy non-protection mode, the data requiring no privacy protection may be transmitted to the smart watch 6210. In operation S6216, as illustrated in FIG. 66, the smart watch 6210 may display the data requiring no privacy protection.

Figure 68:
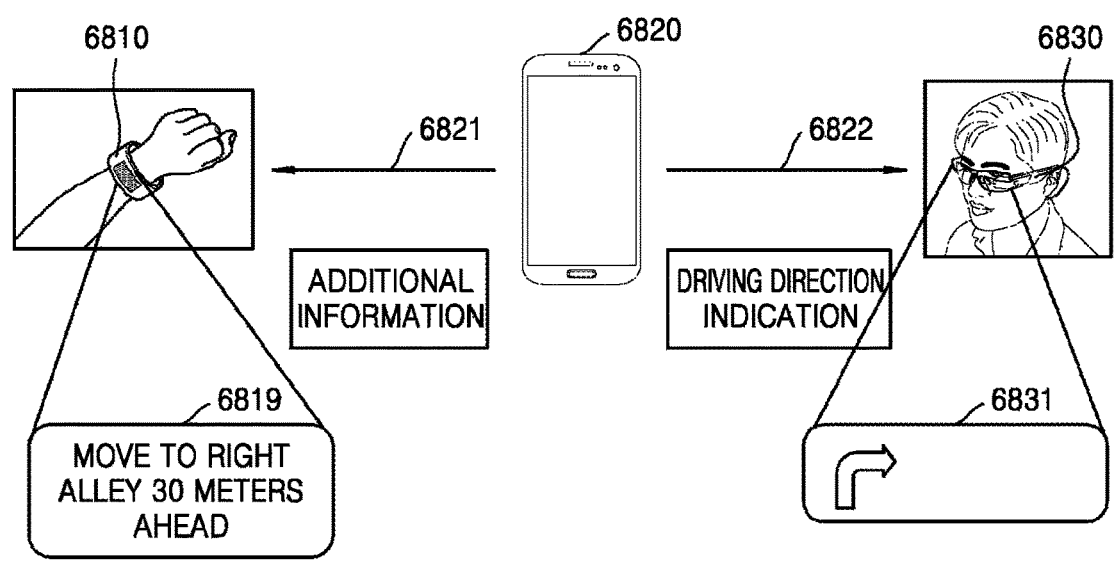
FIGS. 68 and 69 are diagrams for describing a method of providing a navigation function, according to an exemplary embodiment.
Figure 69:
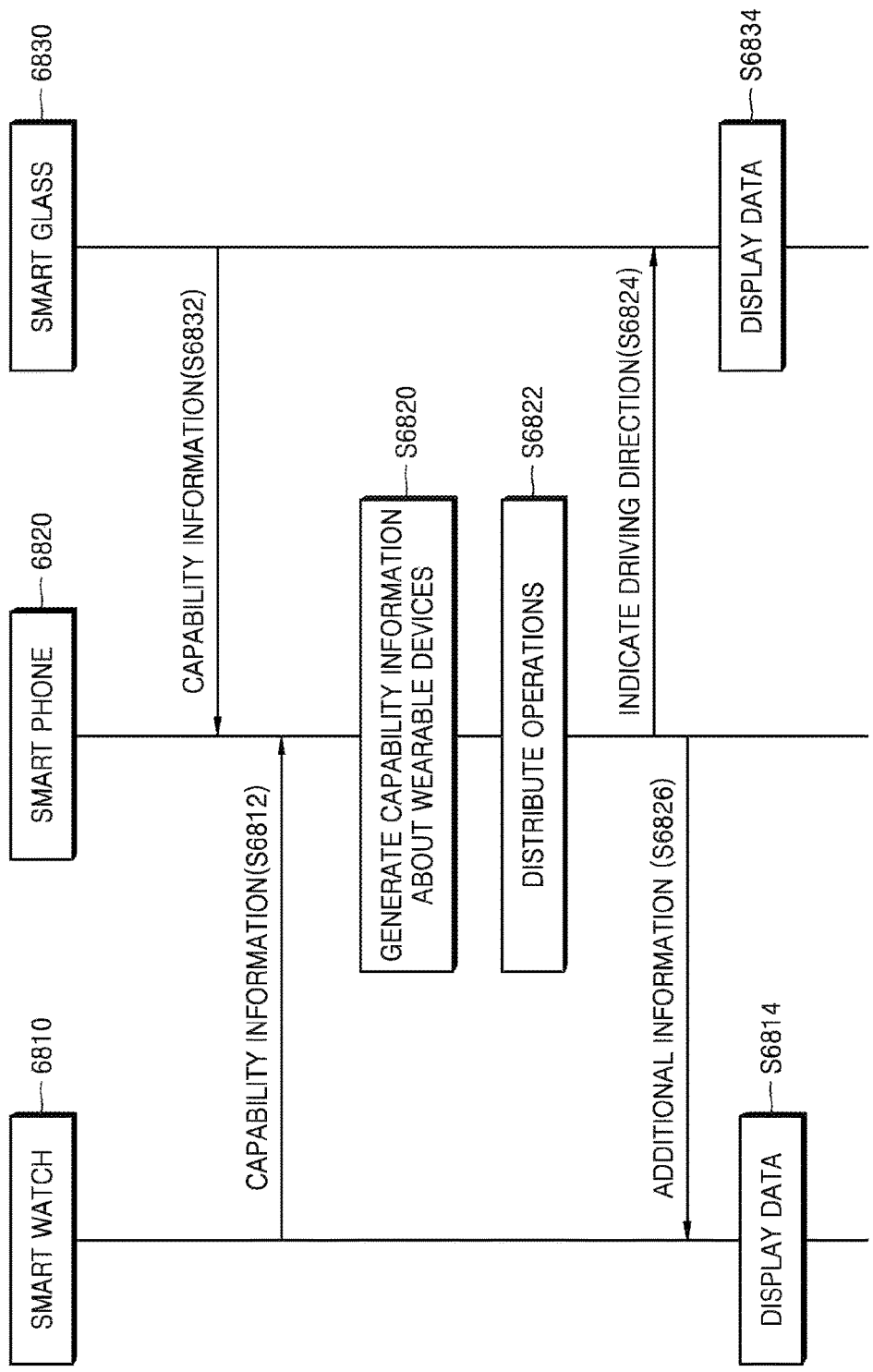

FIGS. 68 and 69 are diagrams for describing a method of providing a navigation function, according to an exemplary embodiment. FIG. 68 is a diagram for describing a system for providing a navigation function, according to an exemplary embodiment.

The system for providing the navigation function, according to an exemplary embodiment, may include a smart phone 6820, a smart watch 6810, and a smart glass 6830.

The smart phone 6820 may be connected to the smart watch 6810 and the smart glass 6830 and display different information from the information displayed by the smart watch 6810 and the smart glass 6830 if the smart phone 6820 is capable of respectively using display capabilities of the smart watch 6810 and the smart glass 6830.

A usage situation of wearable devices will be described below. Since the smart watch 6810 is worn on the wrist of the user, the user may need to move his or her wrist so as to view the information displayed on the smart watch 6810. Therefore, the user may confirm the information displayed on the smart watch 6810 at any time.

Since the smart glass 6830 is worn on the face of the user, the user may view the information displayed on the smart glass 6830 at any time. On the other hand, if too much information is displayed on the smart glass 6830, there is a risk that the smart glass 6830 will block the user's view.

The smart phone 6820 may display different information about wearable devices, taking into consideration an environment where the smart watch 6810 and the smart glass 6830 are used. For example, the smart phone 6820 may transmit data for indicating a moving direction to the smart glass 6830. Referring to FIG. 68, the smart glass 6830 may display a direction symbol, which directs the user to turn right, on a display screen of the smart glass 6830 at operation 6831. The smart glass 6830 may display the direction symbol in a region except for a central region of the display screen of the smart glass 6830. For example, the smart glass 6830 may display the direction symbol in the outermost region of the display screen. Alternatively, the smart glass 6830 may display the direction symbol, which flickers at regular intervals, on the display screen.

In addition, the smart phone 6820 may transmit data for displaying additional information about the moving direction to the smart watch 6810. In addition to the direction information simply displayed on the smart glass 6830, the smart watch 6810 may display additional information instructing the user to move to a right alley 30 meters ahead at operation 6819.

FIG. 69 is a flowchart of a method of providing the navigation function, according to an exemplary embodiment. In operation S6812, the smart phone 6820 may receive capability information from the smart watch 6810. In operation S6832, the smart phone 6820 may receive capability information from the smart glass 6830. Operations S6812 and S6832 may be initiated in response to the smart phone 6820 transmitting a capability information transmission request to the smart watch 6810 and the smart glass 6830.

The smart phone 6820 may receive, from the smart watch 6810, capability information indicating that the smart watch 6810 has a display capability. The smart phone 6820 may further receive, from the smart watch 6810, situation information indicating that the smart watch 6810 is worn on the wrist of the user. The smart phone 6820 may receive the situation information from the smart watch 6810 by receiving an identifier indicating a device type from the smart watch 6810.

Similarly, the smart phone 6820 may receive, from the smart glass 6830, capability information indicating that the smart glass 6830 has a display capability. The smart phone 6820 may further receive, from the smart glass 6830, situation information indicating that the smart glass 6830 is worn on the face of the user. Similarly, the smart phone 6820 may receive the situation information from the smart glass 6830 by receiving an identifier indicating a device type from the smart glass 6830.

In operation S6820, the smart phone 6820 may generate capability information about a plurality of wearable devices. The smart phone 6820 may generate the capability information about the plurality of wearable devices in the memory by using the capability information received from the smart watch 6810 and the smart glass 6830.

In operation S6822, the smart phone 6820 may distribute operations to the wearable devices by using the capability information about the plurality of wearable devices. The smart phone 6820 may distribute an operation of displaying a navigation to the wearable devices by using the capability information about the plurality of wearable devices.

Since the smart phone 6820 has display capabilities of both the smart watch 6810 and the smart glass 6830, the smart phone 6820 may determine that it is possible to distribute an operation of displaying navigation information to both the smart watch 6810 and the smart glass 6830. In operation S6826, the smart phone 6820 may transmit data for displaying additional information to the smart watch 6810 by using the situation information about the smart watch 6810 and the smart glass 6830. In operation S6824, the smart phone 6820 may transmit data for displaying a driving direction to the smart glass 6830. For example, the smart phone 6820 may transmit a plurality of additional information to the smart watch 6810 by using the situation information indicating the smart watch 6810 is worn on the wrist of the user. The smart phone 6820 may transmit, to the smart glass 6830, simple information such as a driving direction which should be promptly displayed, by using the situation information indicating the smart glass 6830 is worn on the face of the user.

In operation S6814, the smart watch 6810 may display additional information to the user by using additional information data received from the smart phone 6820. Similarly, in operation S6834, the smart glass 6830 may display a driving direction to the user by using driving direction indication data received from the smart phone 6820.

Figure 70:
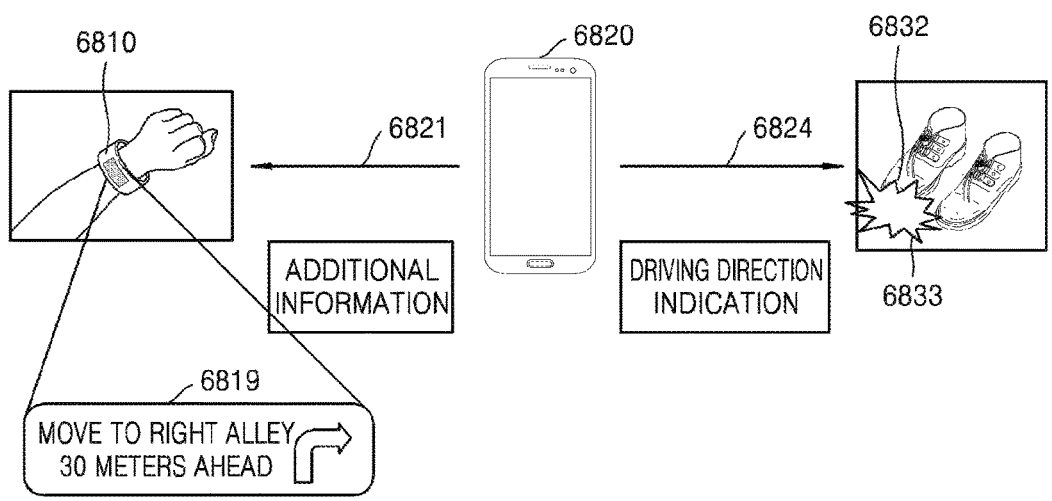
FIG. 70 is a diagram for describing a method of providing a navigation function, according to another exemplary embodiment.
Figure 71:
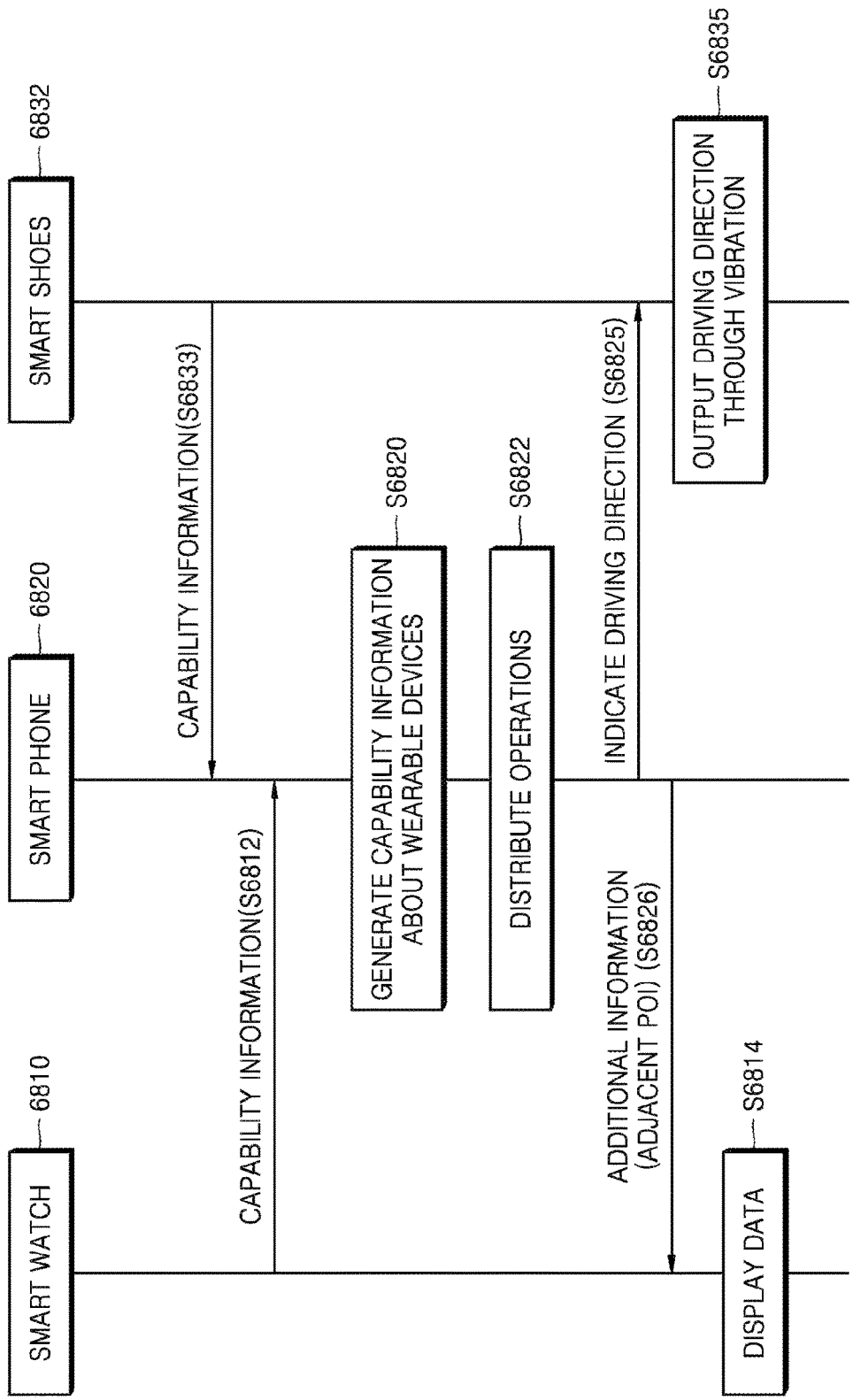
FIG. 71 is a flowchart of a method of providing a navigation function, according to an exemplary embodiment.

FIGS. 70 and 71 are diagrams for describing a method of providing a navigation function, according to another exemplary embodiment.

FIG. 70 is a diagram for describing a system for providing a navigation function, according to an exemplary embodiment.

The system for providing the navigation function, according to an exemplary embodiment, may include a smart phone 6820, a smart watch 6810, and smart shoes 6832.

The smart phone 6820 may be connected to the smart watch 6810 and the smart shoes 6832. The smart phone 6820 may display different information to the smart watch 6810 and the smart shoes 6832 if the smart phone 6820 is capable of respectively using a display capability 6819 of the smart watch 6810 and a vibration capability 6833 of the smart shoes 6832.

A usage situation of wearable devices will be described below. Since the smart watch 6810 is worn on the wrist of the user, the user should move his or her wrist so as to view information displayed on the smart watch 6810. Therefore, the user may confirm the information displayed on the smart watch 6810 at any time.

Since the smart shoes 6832 are worn on the feet of the user, the user may have difficulty in confirming the information visually provided on the smart shoes 6832. Since the smart shoes 6832 are worn on the feet of the user, it is possible to provide a notification to the feet of the user through vibration. Therefore, the user may confirm the information provided through the vibration by the smart shoes 6832 at any time. The smart shoes 6832 may include an individual vibrator provided for each of the feet of the user and individually provide vibrations to the left shoe and the right shoe.

The smart phone 6820 may indicate different information to the wearable devices, taking into consideration an environment where the smart watch 6810 and the smart shoes 6832 are used. For example, the smart phone 6820 may transmit data for indicating a moving direction to the smart glass 6832. Referring to FIG. 70, the smart shoes 6832 may provide a vibration to only the right shoe by using the vibrator of the right shoe so as to provide the user with direction information instructing the user to turn right in operation 6833.

In addition, the smart phone 6820 may transmit data for displaying additional information about the moving direction to the smart watch 6810. In addition to the direction information simply provided through the smart shoes 6832, the smart watch 6810 may display additional information instructing the user to move to a right alley 30 meters ahead in operation 6819.

FIG. 71 is a flowchart of the method of providing the navigation function, according to an exemplary embodiment.

In operation S6812, the smart phone 6820 may receive capability information from the smart watch 6810. In operation S6833, the smart phone 6820 may receive capability information from the smart shoes 6832. Operations S6812 and S6833 may initiated in response to the smart phone 6820 transmitting a capability information transmission request to the smart watch 6810 and the smart shoes 6832.

The smart phone 6820 may receive, from the smart watch 6810, capability information indicating that the smart watch 6810 has a display capability. The smart phone 6820 may further receive, from the smart watch 6810, situation information indicating that the smart watch 6810 is worn on the wrist of the user. The smart phone 6820 may receive the situation information from the smart glass 6810 by receiving an identifier indicating a device type from the smart watch 6810.

Similarly, the smart phone 6820 may receive, from the smart shoes 6832, capability information indicating that the smart shoes 6832 have a display capability. The smart phone 6820 may further receive, from the smart shoes 6832, situation information indicating that the smart shoes 6832 are worn on the feet of the user. Similarly, the smart phone 6820 may receive the situation information from the smart shoes 6832 by receiving an identifier indicating a device type from the smart shoes 6832.

In operation S6820, the smart phone 6820 may generate capability information about a plurality of wearable devices. The smart phone 6820 may generate the capability information about the plurality of wearable devices in the memory by using the capability information received from the smart watch 6810 and the smart shoes 6832.

In operation S6822, the smart phone 6820 may distribute operations to the wearable devices by using the capability information about the plurality of wearable devices. The smart phone 6820 may distribute an operation of displaying navigation information to the wearable devices by using the capability information about the plurality of wearable devices.

Since the smart watch 6810 has the display capability and the smart shoes 6832 have the vibration capability, the smart phone 6820 may distribute an operation of displaying navigation information to the smart watch 6810 and distribute an operation of providing navigation information to the smart shoes 6832 through vibration.

In operation S6826, the smart phone 6820 may transmit data for displaying additional information to the smart watch 6810 by using the situation information about the smart watch 6810 and the smart shoes 6832. In operation S6825, the smart phone 6820 may transmit vibration data for indicating a driving direction to the smart shoes 6832. For example, the smart phone 6820 may transmit a plurality of additional information to the smart watch 6810 by using the situation information indicating the smart watch 6810 is worn on the wrist of the user. The smart phone 6820 may transmit, to the smart shoes 6832, simple information such as a driving direction which should be promptly displayed, by using the situation information indicating the smart shoes 6832 are worn on the feet of the user.

In operation S6814, the smart watch 6810 may display additional information to the user by using additional information data received from the smart phone 6820. In operation S6835, the smart shoes 6832 may provide the user with the driving direction through vibration by using driving direction indication data received from the smart phone 6820.

Figure 72:
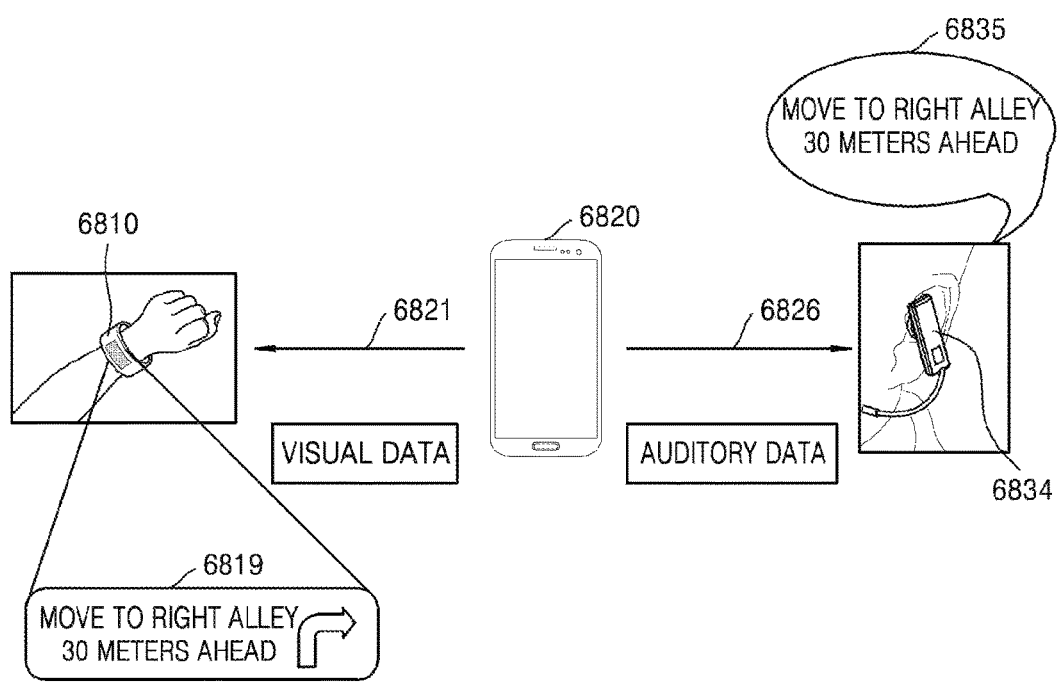
FIGS. 72 and 73 are diagrams for describing a method of providing a navigation function, according to another exemplary embodiment.
Figure 73:
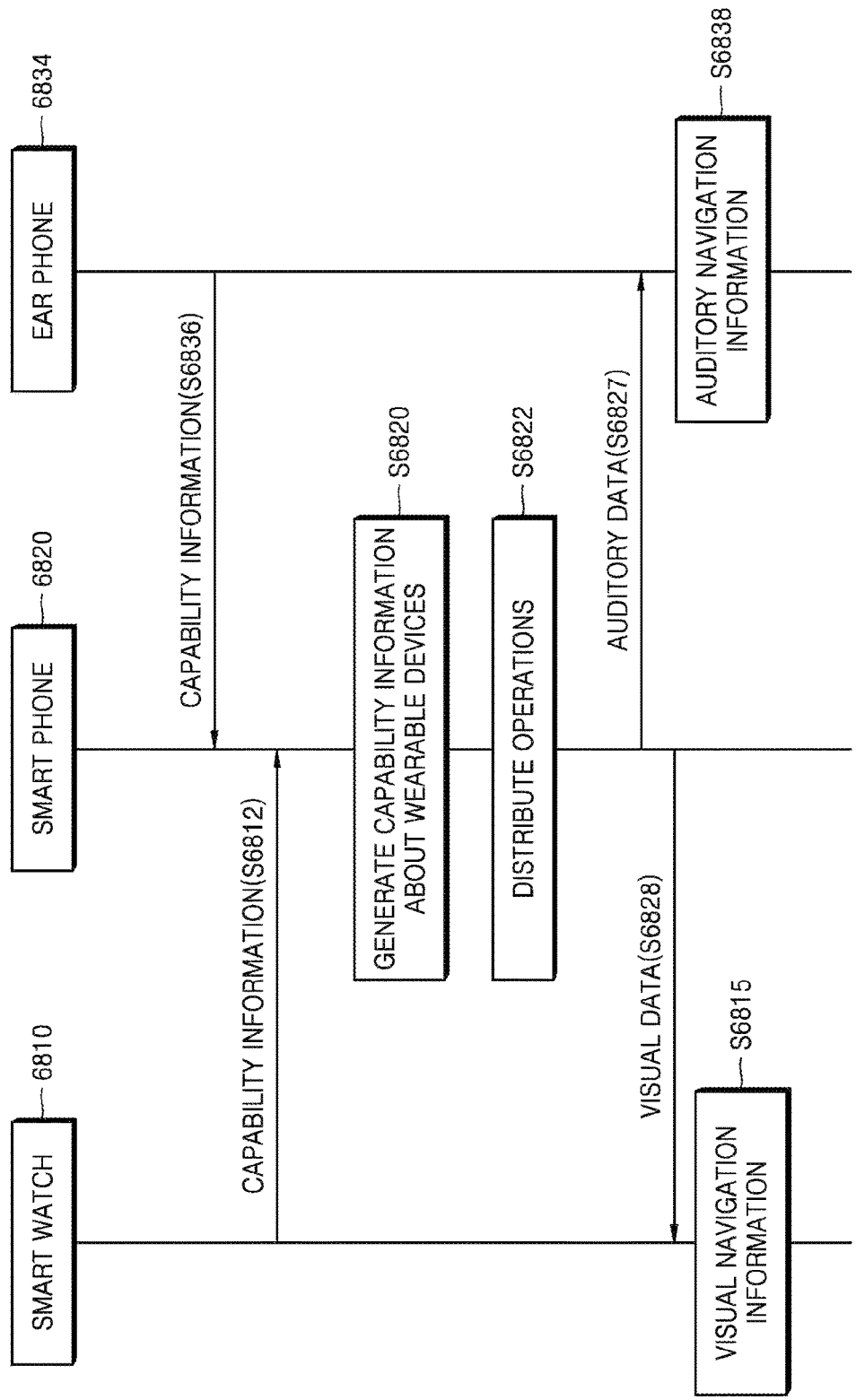

FIGS. 72 and 73 are diagrams for describing a method of providing a navigation function, according to another exemplary embodiment.

FIG. 72 is a diagram for describing a system for providing a navigation function, according to an exemplary embodiment.

The system for providing the navigation function, according to an exemplary embodiment, may include a smart phone 6820, a smart watch 6810, and an earphone 6834.

The smart phone 6820 may be connected to the smart watch 6810 and the earphone 6834. The smart phone 6820 may indicate information to the smart watch 6810 and may indicate different information to the earphone 6834 if the smart phone 6820 is capable of respectively using a display capability 6819 of the smart watch 6810 and an audio output capability 6835 of the earphone 6834.

Since the smart watch 6810 is worn on the wrist of the user, the user should move his or her wrist so as to view information displayed on the smart watch 6810. Therefore, the user may confirm the information displayed on the smart watch 6810 at any time.

The earphone 6834 may provide a notification to the user through audio output. Therefore, the user may confirm the information provided through the audio output by the earphone 6834 at any time. For example, the earphone 6834 may provide the user with the audio output instructing the user to turn right. Alternatively, the earphone 6834 may instruct the user to turn right by outputting a right-turn notification sound to only the right earphone 6834.

The smart phone 6820 may provide the navigation data to the wearable devices, taking into consideration the capability information and the situation information about the smart watch 6810 and the earphone 6834. For example, the smart phone 6820 may transmit auditory data for indicating a moving direction to the earphone 6834. As illustrated in FIG. 72, the earphone 6834 may provide the user with auditory information 6835 instructing the user to turn right.

In addition, the smart phone 6820 may transmit data for displaying additional information about the moving direction to the smart watch 6810. In addition to the auditory information provided through the earphone 6834, the smart watch 6810 may display additional information, that is, visual information 6819 instructing the user to move to a right alley 30 meters ahead.

FIG. 73 is a flowchart of the method of providing a navigation function, according to an exemplary embodiment.

In operation S6812, the smart phone 6820 may receive capability information from the smart watch 6810. In operation S6836, the smart phone 6820 may receive capability information from the earphone 6834. Operations S6812 and S6836 may be initiated in response to the smart phone 6820 transmitting a capability information transmission request to the smart watch 6810 and the earphone 6834.

The smart phone 6820 may receive, from the smart watch 6810, capability information indicating that the smart watch 6810 has a display capability. The smart phone 6820 may further receive, from the smart watch 6810, situation information indicating that the smart watch 6810 is worn on the wrist of the user. The smart phone 6820 may receive the situation information from the smart watch 6810 by receiving an identifier indicating a device type from the smart watch 6810.

Similarly, the smart phone 6820 may receive, from the earphone 6834, capability information indicating that the earphone 6834 has an audio output capability. The smart phone 6820 may further receive, from the earphone 6834, situation information indicating that the earphone 6834 is worn on the ear of the user. Similarly, the smart phone 6820 may receive the situation information from the earphone 6834 by receiving an identifier indicating a device type from the earphone 6834.

In operation S6820, the smart phone 6820 may generate capability information about a plurality of wearable devices. The smart phone 6820 may generate the capability information about the plurality of wearable devices in the memory by using the capability information received from the smart watch 6810 and the earphone 6834.

In operation S6822, the smart phone 6820 may distribute operations to the wearable devices by using the capability information about the plurality of wearable devices. The smart phone 6820 may distribute an operation of providing navigation information to the wearable devices by using the capability information about the plurality of wearable devices.

Since the smart watch 6810 has the display capability and the earphone 6834 have the audio output capability, the smart phone 6820 may distribute an operation of displaying navigation information to the smart watch 6810 and distribute an operation of providing navigation information through audio output to the earphone 6834.

In operation S6828, the smart phone 6820 may transmit data for displaying visual navigation information to the smart watch 6810 by using the situation information about the smart watch 6810 and the earphone 6834. In operation S6827, the smart phone 6820 may transmit auditory navigation information to the earphone 6834. For example, the smart phone 6820 may transmit a plurality of additional information to the smart watch 6810 by using the situation information indicating the smart watch 6810 is worn on the wrist of the user. The smart phone 6820 may transmit, to the earphone 6834, simple information such as a driving direction which should be promptly displayed, by using the situation information indicating the earphone 6834 provides auditory information to the user.

In operation S6815, the smart watch 6810 may display visual navigation information to the user by using visual data received from the smart phone 6820. In operation S6838, the earphone 6834 may provide the auditory navigation information through audio output by using the auditory data received from the smart phone 6820.

Figure 74:
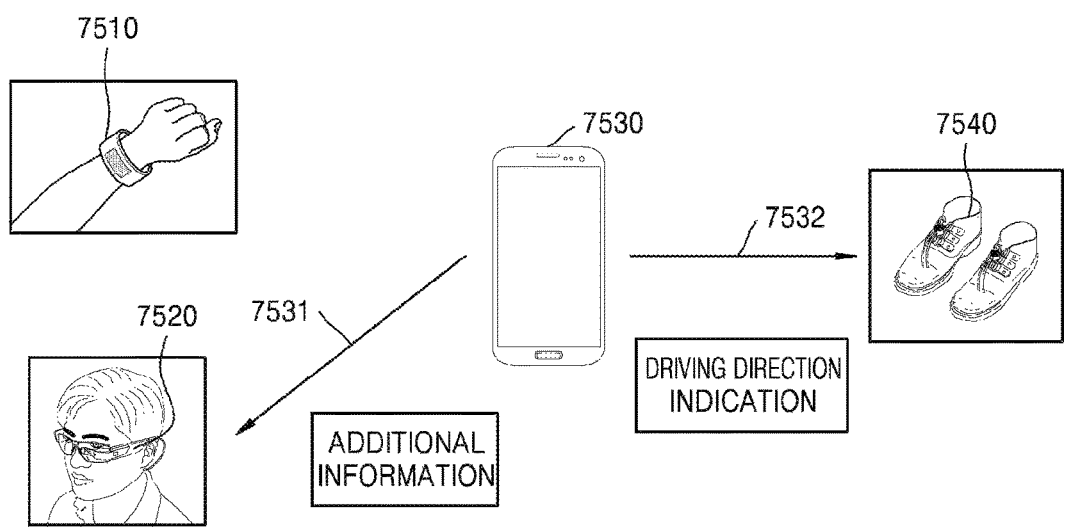
FIGS. 74 and 75 are diagrams for describing a method of providing a navigation function, according to another exemplary embodiment.
Figure 75:
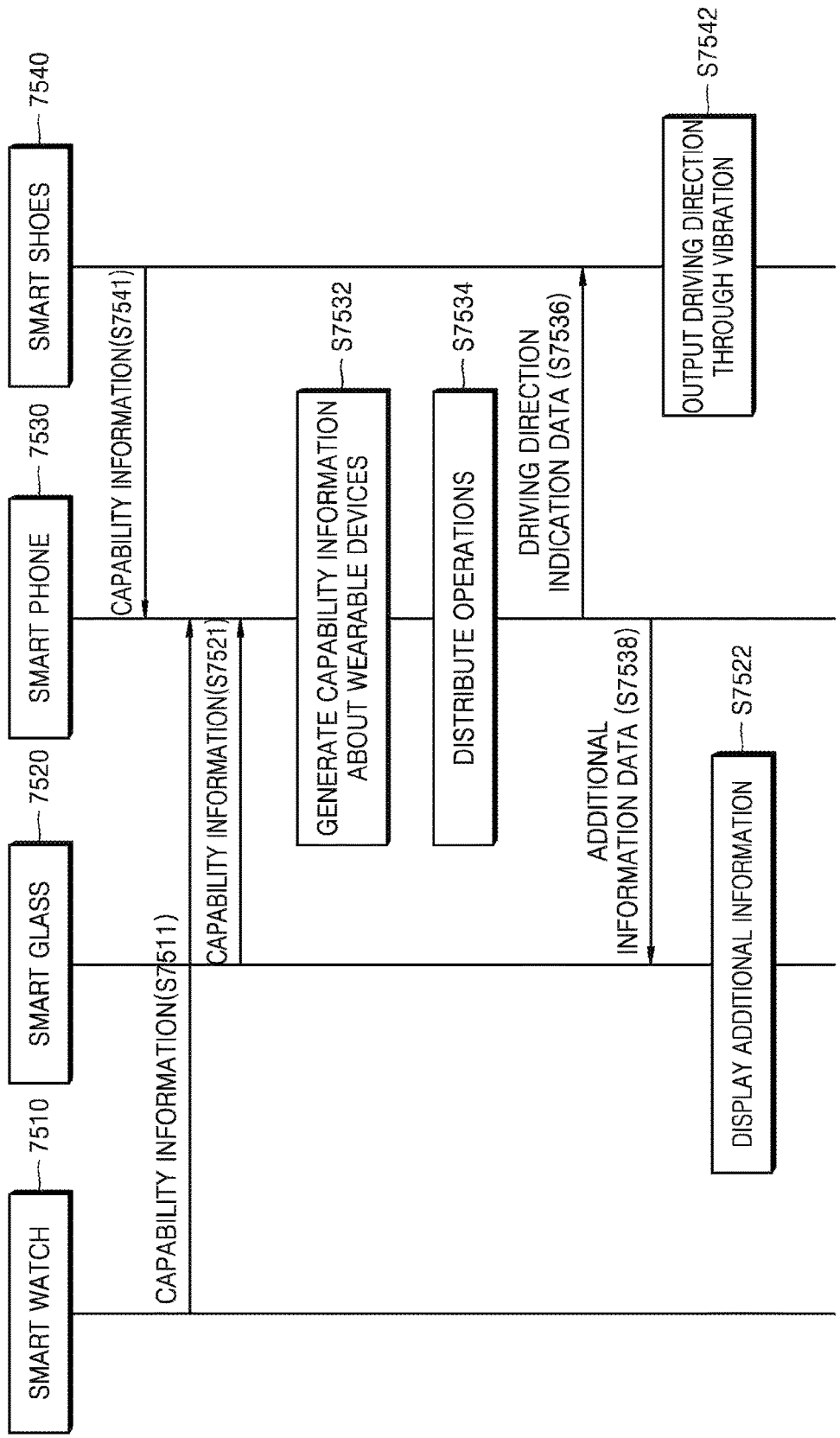

FIGS. 74 and 75 are diagrams for describing a method of providing a navigation function, according to another exemplary embodiment.

FIG. 74 is a diagram for describing a navigation system according to an exemplary embodiment. Referring to FIG. 74, the navigation system according to an exemplary embodiment may include a smart phone 7530, a smart watch 7510, a smart glass 7520, and smart shoes 7540.

The smart phone 7530 may be connected to a plurality of wearable devices for performing operations. When it is possible to use capabilities of the connected wearable devices, the operations of some or all of the connected wearable devices may be used for executing the function of the smart phone 7530.

In the exemplary embodiment of FIG. 74, as described above, the smart phone 7530 may transmit data for displaying additional information for navigation display to the smart watch 7510. The smart phone 7530 may transmit data for promptly and simply displaying the moving direction to the smart glass 7520. The smart phone 7530 may transmit data for providing the moving direction to the user through vibration.

On the other hand, the smart phone 7530 may provide the navigation function by using some of the wearable devices. In the exemplary embodiment of FIG. 74 in which two wearable devices have the display capability, the smart phone 7530 may display additional information about only one of the wearable devices 7510 and 7520 having the display capability.

FIG. 75 is a flowchart of the method of providing the navigation function, according to an exemplary embodiment. Specifically, FIG. 75 is a flowchart of the method of providing the navigation function by using one of the wearable devices having the display capability and smart shoes 7540.

First, the smart phone 7530 may receive, from the wearable devices, capability information about executable capabilities of the wearable devices. In operation S7511, the smart phone 7530 may receive capability information from the smart watch 7510. In operation S7521, the smart phone 7530 may receive capability information from the smart glass 7520. In operation S7541, the smart phone 7530 may receive capability information from the smart shoes 7540. Operations S7511, S7521, and S7541 may be initiated in response to the smart phone 7530 transmitting a capability information transmission request to the smart watch 7510, the smart glass 7520, and the smart shoes 7540.

The smart phone 7530 may receive, from the smart watch 7510, capability information indicating that the smart watch 7510 has the display capability. In addition, the smart phone 7530 may further receive, from the smart watch 7510, situation information indicating that the smart watch 7510 is worn on the wrist of the user. The smart phone 7530 may receive the situation information from the smart watch 7510 by receiving an identifier indicating a device type from the smart watch 7510.

Similarly, the smart phone 7530 may receive, from the smart glass 7520, capability information indicating that the smart glass 7520 has the display capability. The smart phone 7530 may further receive, from the smart glass 7520, situation information indicating that the smart glass 7520 is worn on the face of the user. Similarly, the smart phone 7530 may receive the situation information from the smart glass 7520 by receiving an identifier indicating a device type from the smart glass 7520.

In addition, the smart phone 7530 may receive, from the smart shoes 7540, capability information indicating that the smart shoes 7540 have the display capability. The smart phone 7530 may further receive, from the smart shoes 7540, situation information indicating that the smart shoes 7540 are worn on the feet of the user. Similarly, the smart phone 7530 may receive the situation information from the smart shoes 7540 by receiving an identifier indicating a device type from the smart shoes 7540.

In operation S7532, the smart phone 7530 may generate capability information about a plurality of wearable devices. The smart phone 7530 may generate the capability information about the plurality of wearable devices in the memory by using the capability information received from the smart watch 7510, the smart glass 7520, and the smart shoes 7540.

In operation S7534, the smart phone 7530 may distribute operations to the wearable devices by using the capability information about the plurality of wearable devices. The smart phone 7530 may distribute an operation of displaying a navigation to the wearable devices by using the capability information about the plurality of wearable devices.

Since the smart watch 7510 and the smart glass 7520 have the display capability and the smart shoes 7540 have the vibration capability, the smart phone 7530 may distribute an operation of displaying navigation information to the smart watch 7510 or the smart glass 7520 and distribute an operation of providing navigation information to the smart shoes 7540 through vibration.

For example, the user may preset priority of wearable devices to be used when the wearable devices are connected. For example, the user may set the highest priority to the smart shoes 7540, the second highest priority to the smart glass 7520, and the third highest priority to the smart watch 7510. The order of the priorities are exemplary and are not limited thereto. This feature is not limited to the provision of the navigation function and may be applied to the providing of various functions of the mobile terminal.

In addition, the user may preset the number of wearable devices to be used when the wearable devices are connected. For example, the user may preset two wearable devices or three or more wearable devices such that a dynamic navigation function is provided. This feature is not limited to the provision of the navigation function and may be applied to the providing of various functions.

Hereinafter, it is assumed, for exemplary purposes only, that priorities are input in the order of the smart shoes 7540, the smart glass 7520, and the smart watch 7510 according to the priorities preset to the smart phone 7530, and the navigation function is provided by using two wearable devices. The smart phone 7530 may determine to provide the navigation function by using the smart shoes 7540 and the smart glass 7520 according to the priorities.

In operation S7536, since the smart shoes 7540 have the vibration capability, the smart phone 7530 may transmit driving direction indication data for notifying a driving direction through vibration in the smart shoes 7540. In operation S7542, the smart shoes 7540 may output the driving direction through vibration by using the driving direction indication data received from the smart phone 7530.

In operation S7538, the smart phone 7530 may transmit data for displaying additional information to the smart glass 7520. In operation S7522, the smart glass 7520 may display additional information by using the additional information received from the smart phone 7530.

In the present exemplary embodiment, the example of determining the wearable device to be used according to the preset priorities of the wearable devices has been described, but the method of setting the wearable devices is not limited thereto. For example, as described above, the wearable devices to be used may be determined, taking into consideration the situation information. For example, the wearable devices to be used may be determined, taking into consideration whether the connected devices are wearable devices being worn or are wearable devices supporting the required minimum performance or more among the connected devices.

Figure 76:
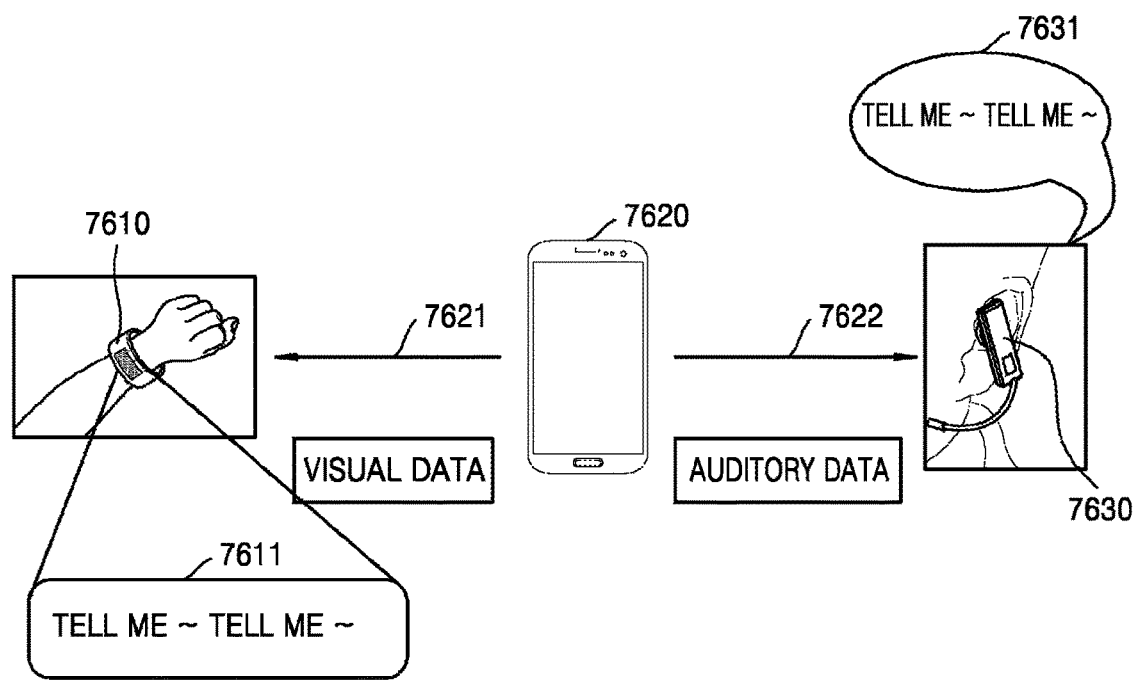
FIGS. 76 and 77 are diagrams for describing a method of providing a music playback function, according to an exemplary embodiment.
Figure 77:
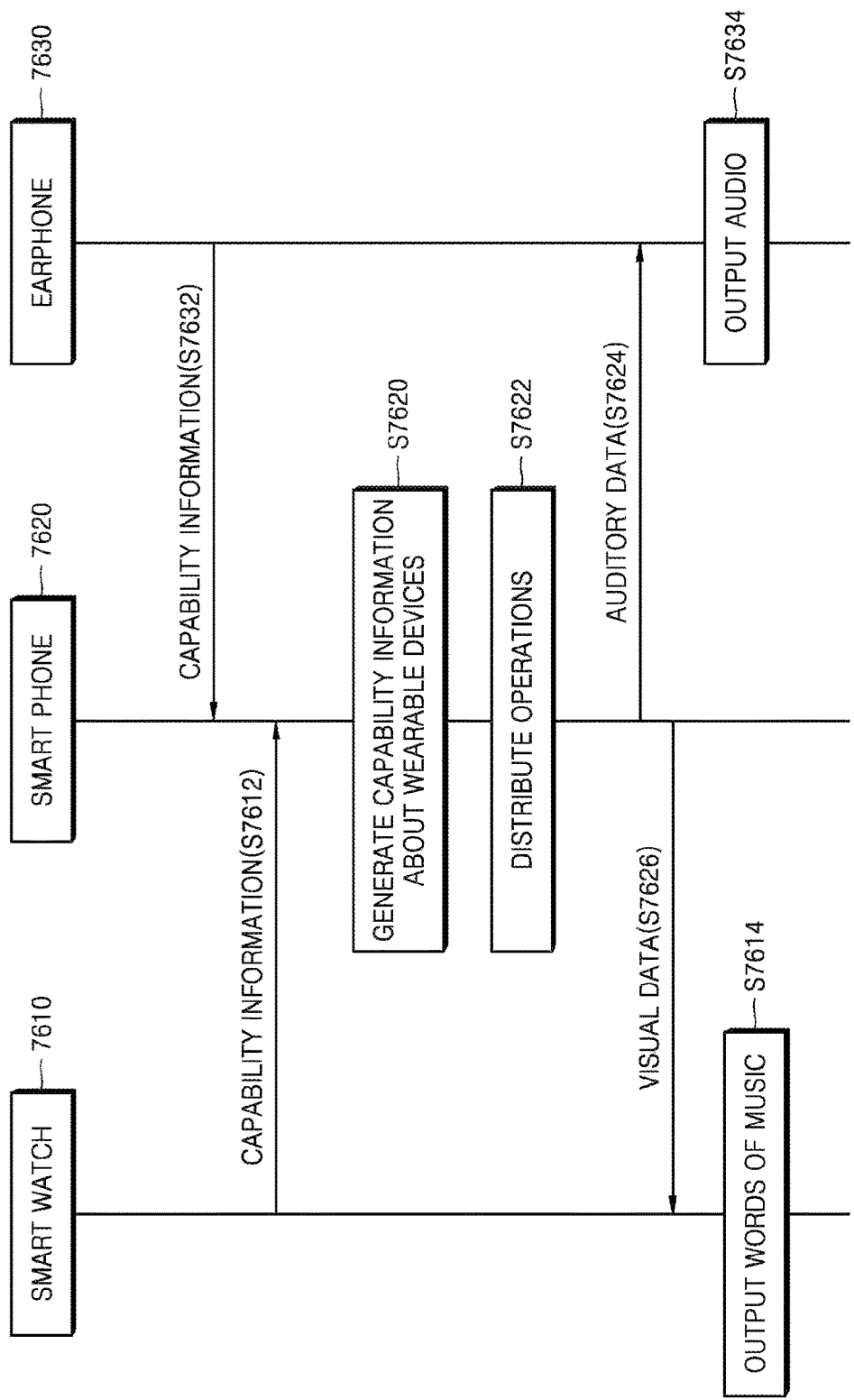

FIGS. 76 and 77 are diagrams for describing a method of providing a music playback function, according to an exemplary embodiment.

FIG. 76 is a diagram for describing a system for providing a music playback function, according to an exemplary embodiment.

The system for providing the music playback function, according to an exemplary embodiment, may include a smart phone 7620, a smart watch 7610, and an earphone 7630.

The smart phone 7620 may be connected to the smart watch 7610 and the earphone 7630. The smart phone 7620 may indicate different information to the smart watch 7610 and the earphone 7630 if the smart phone 7620 is capable of respectively using a display capability 7611 of the smart watch 7610 and an audio output capability 7631 of the earphone 6830.

Since the smart watch 7610 is worn on the wrist of the user, the user should move his or her wrist so as to view information displayed on the smart watch 7610. Therefore, the user may confirm the information displayed on the smart watch 7610 at any time.

The earphone 7630 may output music being played back to the user through audio output. Therefore, the user may listen to music through the audio output of the earphone 7630. The smart phone 7620 may distribute an operation of playing back music to the wearable devices, taking into consideration the capability information and the situation information about the smart watch 7610 and the earphone 7630, and transmit an operation execution request and/or data to be used for the operation execution to the wearable devices so as to execute the distributed operation. For example, the smart phone 7620 may transmit data for outputting the audio of the music being played back to the earphone 7630 and transmit data for displaying the words of the music being played back to the smart watch 7610.

FIG. 77 is a flowchart of the method of providing the music playback function, according to the exemplary embodiment.

In operation S7612, the smart phone 7620 may receive capability information from the smart watch 7610. In operation S7632, the smart phone 7620 may receive capability information from the earphone 7630. Operations S7612 and S7632 may be initiated in response to the smart phone 7620 transmitting a capability information transmission request to the smart watch 7610 and the earphone 7630.

The smart phone 7620 may receive, from the smart watch 7610, capability information indicating that the smart watch 7610 has the display capability. In addition, the smart phone 7620 may further receive, from the smart watch 7610, situation information indicating that the smart watch 7610 is worn on the wrist of the user. The smart phone 7620 may receive the situation information from the smart watch 7610 by receiving an identifier indicating a device type from the smart watch 7610.

Similarly, the smart phone 7620 may receive, from the earphone 7630, capability information indicating that the earphone 7630 has an audio output capability. The smart phone 7620 may further receive, from the earphone 7630, situation information indicating that the earphone 7630 is worn on the ear of the user. Similarly, the smart phone 7620 may receive the situation information from the earphone 7630 by receiving an identifier indicating a device type from the earphone 7630.

In operation S7620, the smart phone 7620 may generate capability information about a plurality of wearable devices. The smart phone 7620 may generate the capability information about the plurality of wearable devices in the memory by using the capability information received from the smart watch 7610 and the earphone 7630.

In operation S7622, the smart phone 7620 may distribute operations to the wearable devices by using the capability information about the plurality of wearable devices. The smart phone 7620 may distribute an operation of providing information related to the music playback to the wearable devices by using the capability information about the plurality of wearable devices.

Since the smart watch 7610 has the display capability and the earphone 7630 have the audio output capability, the smart phone 7620 may distribute an operation of displaying music playback information to the smart watch 7610 and distribute an operation of providing music playback information to the earphone 7630 through audio output.

In operation S7626, the smart phone 7620 may transmit, to the smart watch 7610, visual data for displaying visual music playback information, such as the words of music (e.g., song lyrics), by using the situation information about the smart watch 7610 and the earphone 7630. In operation S7624, the smart phone 7620 may transmit auditory data for outputting audio to the earphone 7630.

In operation S7614, the smart watch 7610 may display visual data such as the words of music to the user by using visual data received from the smart phone 7620. In operation S7634, the earphone 7630 may provide audio output by using the auditory data received from the smart phone 7620.

FIGS. 78 to 82 are diagrams for describing a method of providing a biometric information measuring function, according to exemplary embodiments.

Figure 78:
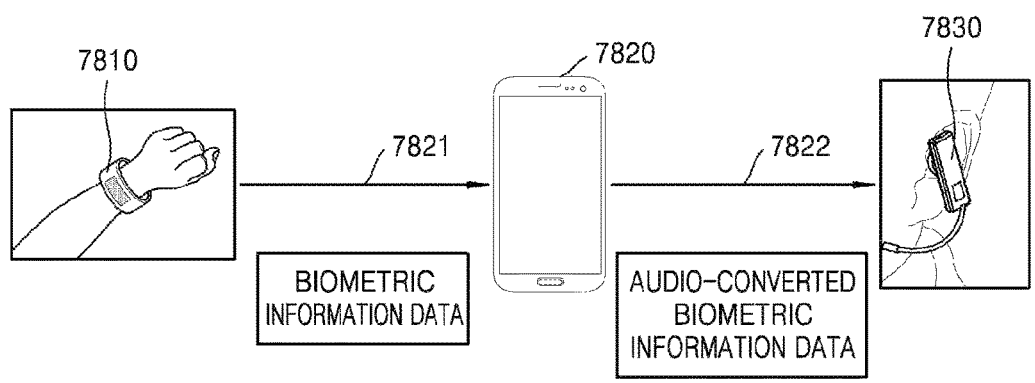
FIGS. 78, 79, 80, 81 and 82 are diagrams for describing a method of providing a biometric information measuring function, according to exemplary embodiments.

As illustrated in FIG. 78, the method of providing the biometric information measuring function, according to an exemplary embodiment, may be performed using a smart watch 7810, a smart phone 7820, and an earphone 7830.

The smart watch 7810 may measure biometric information data and transmit the measured biometric information data to the smart phone 7820. For example, the smart watch 7810 may include a temperature sensor to measure a body temperature of a user. The smart watch 7810 may include a blood pressure measurement sensor to measure a blood pressure of a user.

The smart phone 7820 may convert the measured data into audio and transmit the converted audio to the earphone 7830, so as to provide the biometric information data measured by the smart watch 7810 to the user through the earphone 7830.

The smart phone 7820 may determine a body condition of the user according to a preset method by using the biometric information data measured by the smart watch 7810. For example, when the body temperature of the user is in a preset normal range, the smart phone 7820 may determine that the body temperature of the user is in a normal range. When the body temperature of the user is out of the preset normal range, the smart phone 7820 may determine that the body temperature of the user is not in the normal range. Similarly, when the blood pressure of the user is in a preset normal range, the smart phone 7820 may determine that the blood pressure of the user is in a normal range. When the blood pressure of the user is out of the preset normal range, the smart phone 7820 may determine that the blood pressure of the user is out of the normal range.

The smart phone 7820 may provide a notification to the user when the biometric information about the user is out of the normal range. The smart phone 7820 may provide the notification to the user through the earphone 7830.

Figure 79:
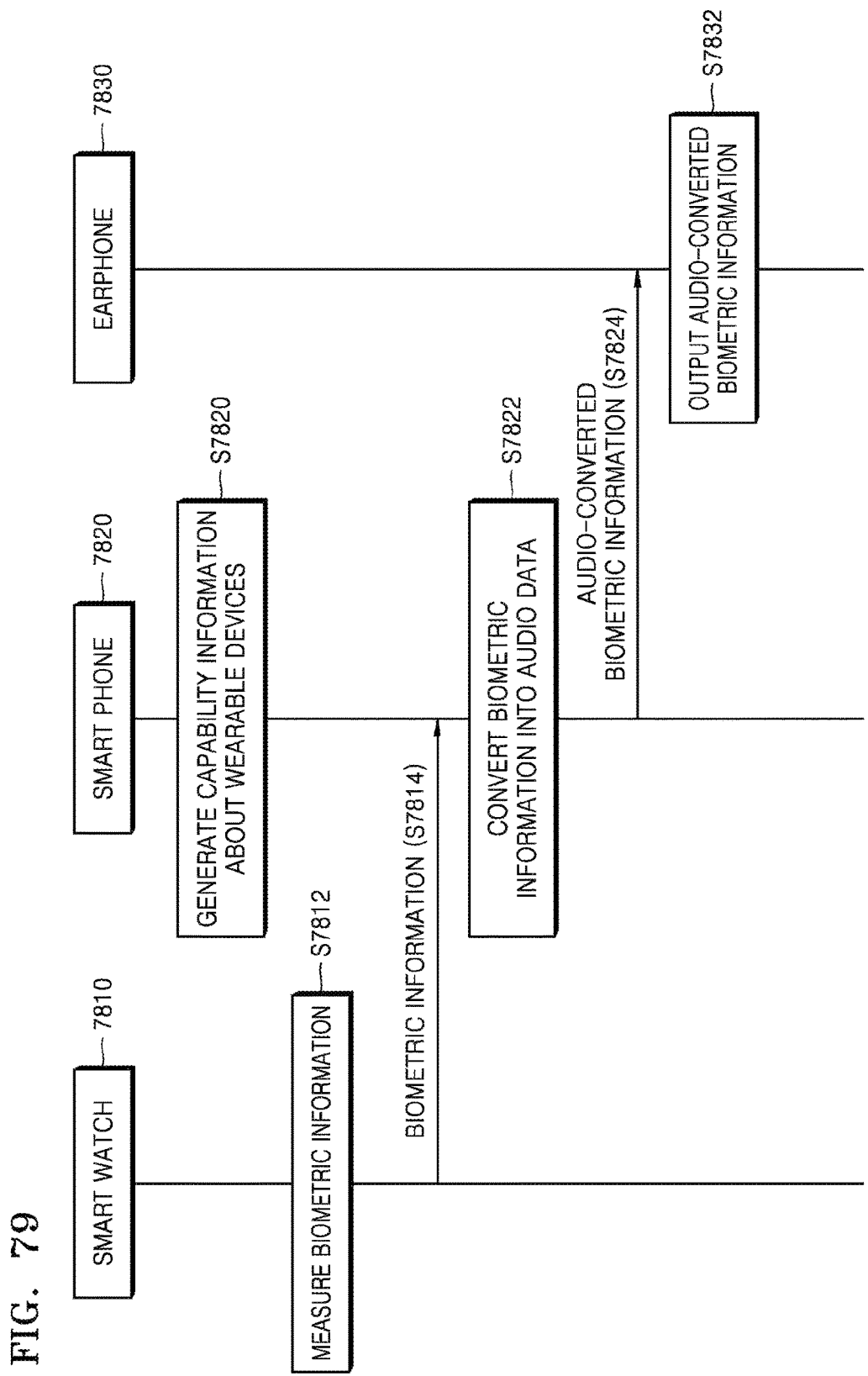

FIG. 79 is a flowchart of a method of providing the biometric information measuring function, according to an exemplary embodiment.

In operation S7820, the smart phone 7820 may generate capability information about a plurality of wearable devices. In operation S7812, the smart watch 7810 may measure biometric information. In operation S7814, the smart watch 7810 may transmit the measured biometric information to the smart phone 7820.

In operation S7822, the smart phone 7820 may convert the received biometric information into audio data. In operation S7824, the smart phone 7820 may transmit the audio data to the earphone 7830.

In operation S7832, the earphone 7830 may provide the biometric information to the user by outputting the biometric information received from the smart phone 7820 in the form of audio.

Figure 80:
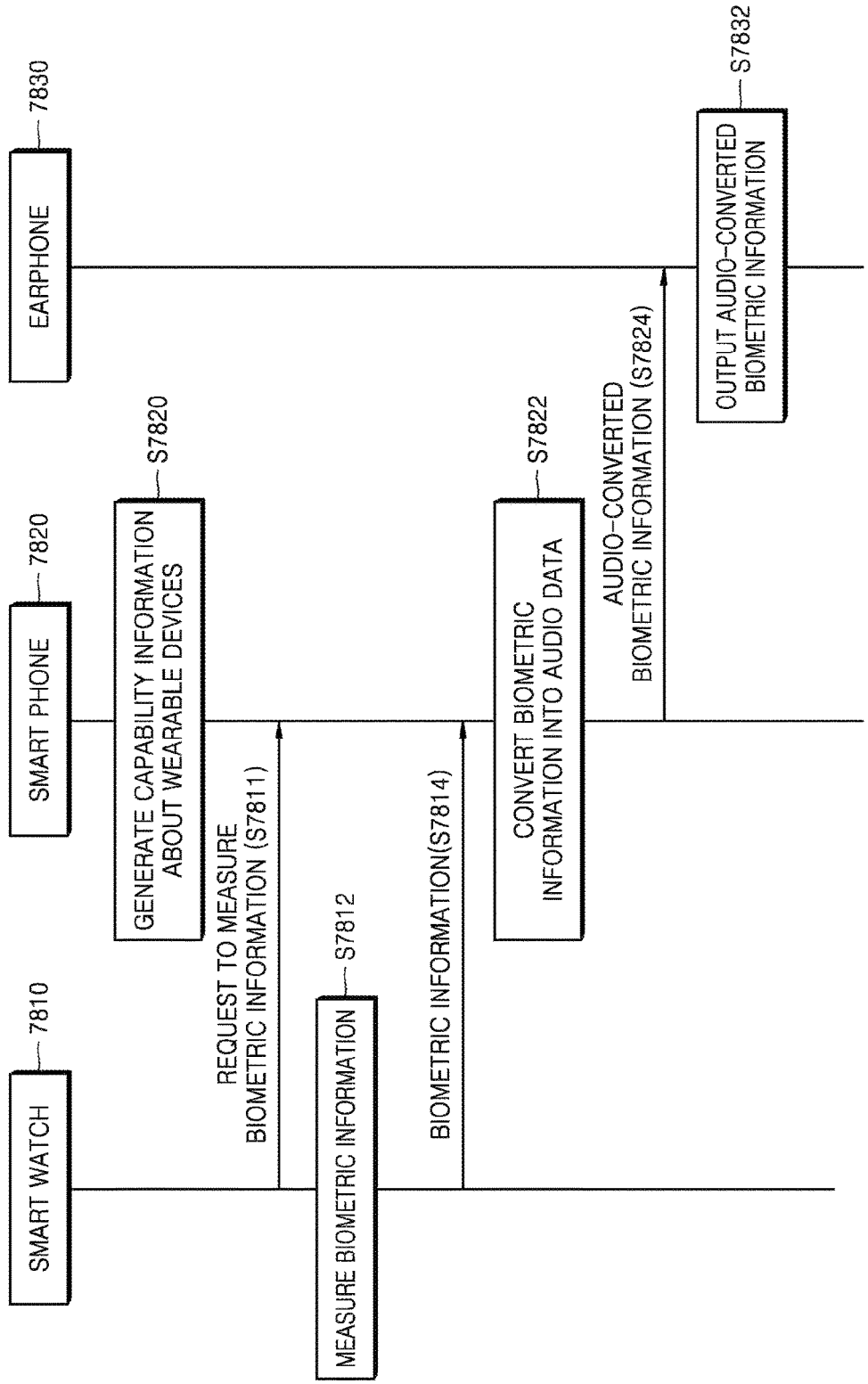

FIG. 80 is a flowchart of a method of providing the biometric information measuring function, according to an exemplary embodiment.

Referring to FIG. 80, in operation S7811, when the user inputs a biometric information measurement request to the smart watch 7810, the smart watch 7810 may transmit the biometric information measurement request to the smart phone 7820. In operation S7812, the smart watch 7810 may measure biometric information. In operation S7814, the smart watch 7810 may transmit the measured biometric information to the smart phone 7820.

In operation S7822, the smart phone 7820 may convert the received biometric information into audio data. The smart phone 7820 may receive the biometric information measurement request from the smart watch 7810 and convert the received biometric information into audio data.

In operation S7824, the smart phone 7820 may transmit the audio data to the earphone 7830. In operation S7832, the earphone 7830 may provide the biometric information to the user by outputting the biometric information received from the smart phone 7820 in the form of audio.

Figure 81:
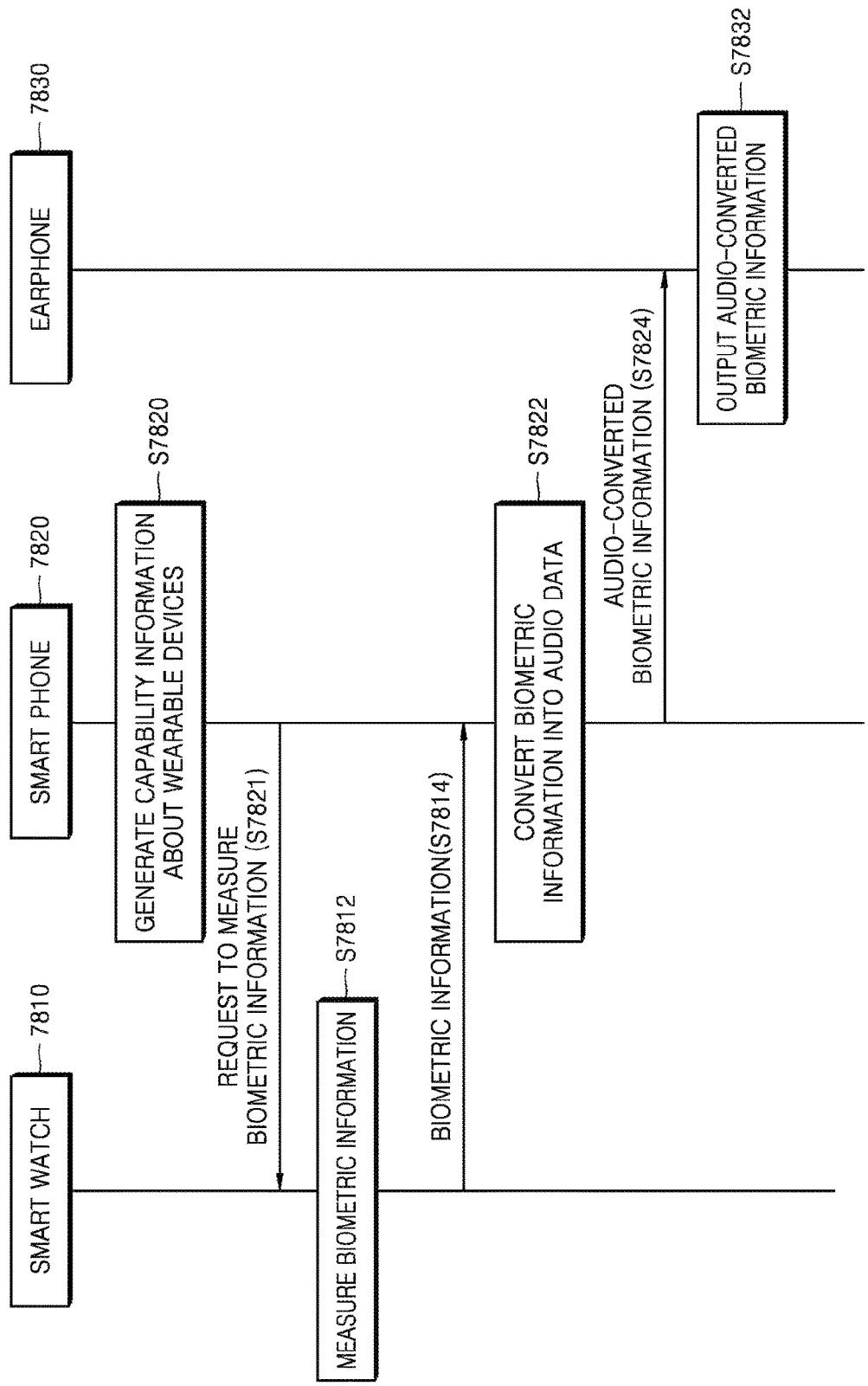

FIG. 81 is a flowchart of a method of providing a biometric information measuring function, according to an exemplary embodiment.

Referring to FIG. 81, in operation S7821, when the user inputs a biometric information measurement request to the smart phone 7820, the smart phone 7820 may transmit the biometric information measurement request to the smart watch 7810. In operation S7812, the smart watch 7810 may measure biometric information. In operation S7814, the smart watch 7810 may transmit the measured biometric information to the smart phone 7820.

In operation S7822, the smart phone 7820 may convert the received biometric information into audio data. The smart phone 7820 may receive the biometric information measurement request from the smart watch 7810 and convert the received biometric information into audio data.

In operation S7824, the smart phone 7820 may transmit the audio data to the earphone 7830. In operation S7832, the earphone 7830 may provide the biometric information to the user by outputting the biometric information received from the smart phone 7820 in the form of audio.

Figure 82:
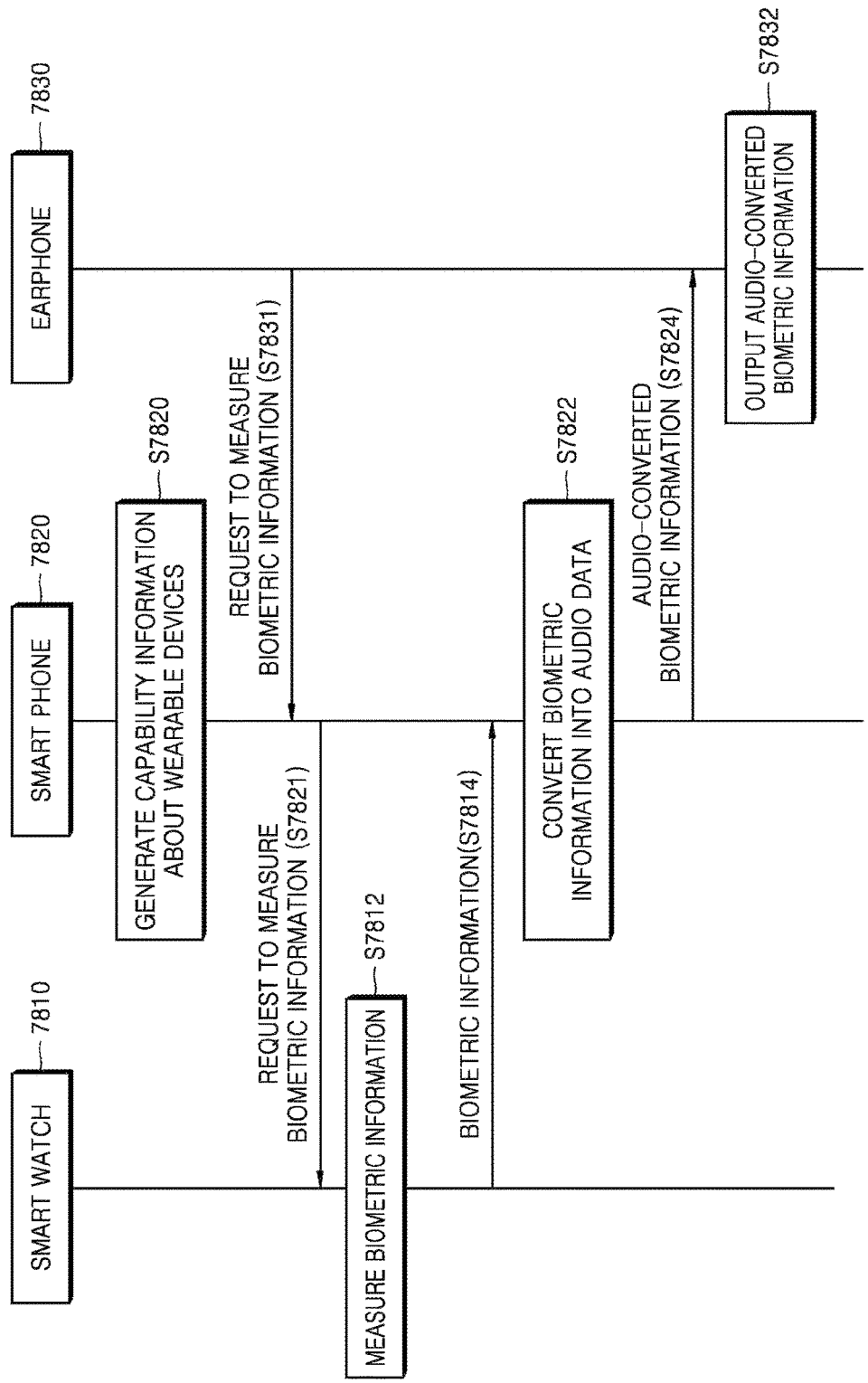

FIG. 82 is a flowchart of a method of providing a biometric information measuring function, according to an exemplary embodiment.

Referring to FIG. 82, in operation S7831, when the user inputs a biometric information measurement request to the earphone 7830, the earphone 7830 may transmit the biometric information measurement request to the smart phone 7820. In operation S7821, when the smart phone 7820 receives the biometric information measurement request from the earphone 7830, the smart phone 7820 may transmit the received biometric information measurement request to the smart watch 7810. Subsequently, the smart watch 7810, the smart phone 7820, and the earphone 7830 may be operated in substantially the same manner as the biometric information measurement method described with reference to FIG. 81.

Figure 83:
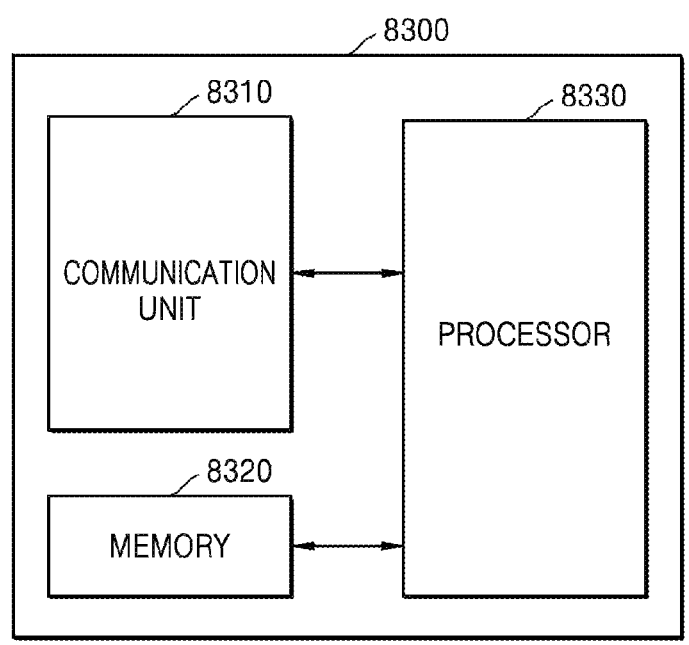
FIGS. 83 and 84 are block diagrams for describing a configuration of a mobile terminal according to an exemplary embodiment.
Figure 84:
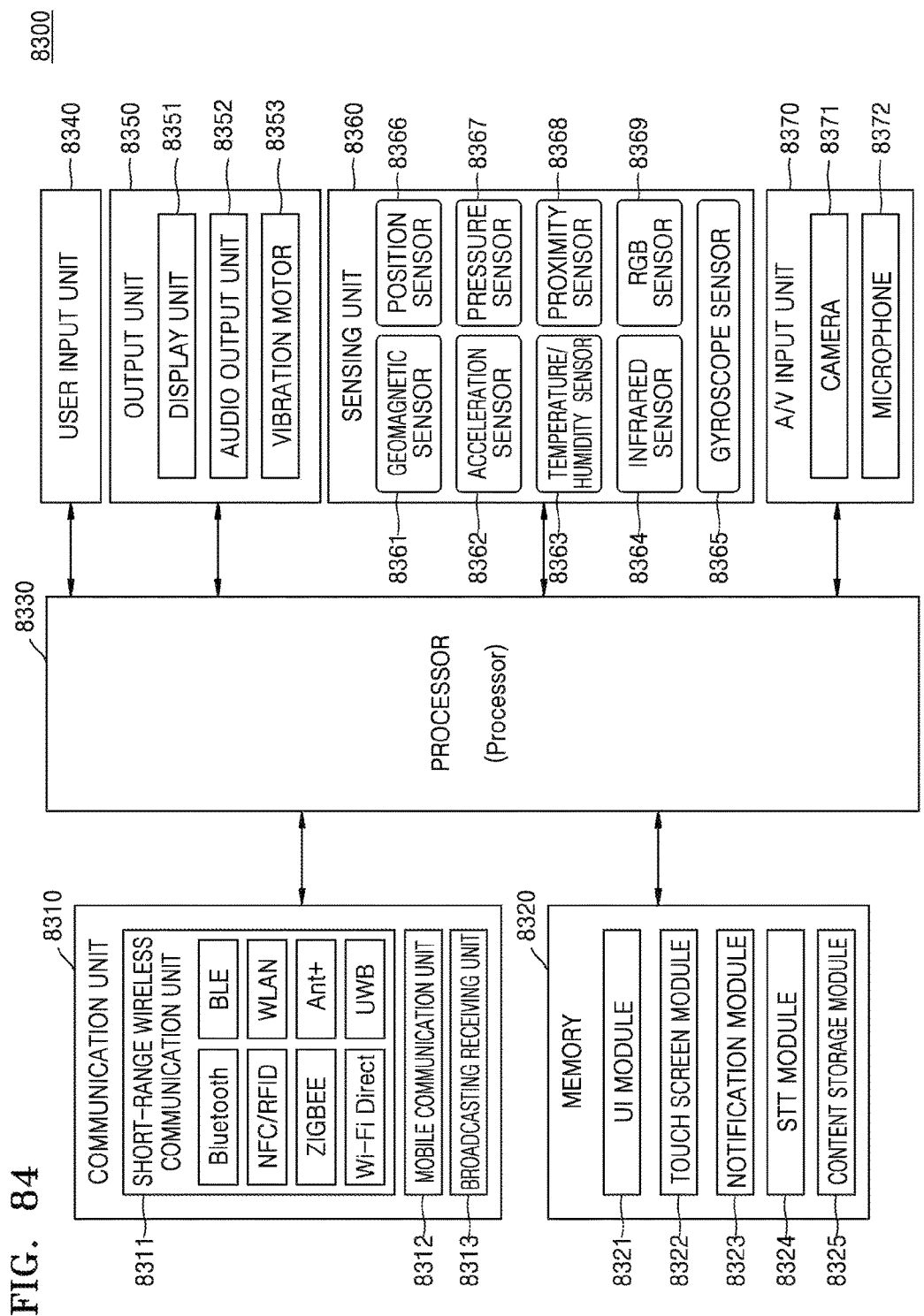

FIGS. 83 and 84 are block diagrams for describing a configuration of a mobile terminal 8300 according to an exemplary embodiment.

As illustrated in FIG. 83, the mobile terminal 8300 according to an exemplary embodiment may include a communication unit 8310 (e.g., communicator), a memory 8320, and a processor 8330. However, all of the illustrated elements in FIG. 83 are not essential elements, and certain of the illustrated elements may be omitted or otherwise modified. The mobile terminal 8300 may be implemented with a larger number of elements than those illustrated in FIG. 83, or may be implemented with a smaller number of elements than those illustrated in FIG. 83.

For example, as illustrated in FIG. 84, the mobile terminal 8300 according to an exemplary embodiment may include a user input unit 8340 (e.g., user inputter), an output unit 8350 (e.g., outputter), a sensing unit 8360 (e.g., sensor), and an audio/video (A/V) input unit 8370 (e.g., A/V inputter), as well as the communication unit 8310, the memory 8320, and the processor 8330.

Hereinafter, the elements of the mobile terminal 8300 will be described in sequence.

The communication unit 8310 may include one or more elements for communication between the mobile terminal 8300 and an external device or between the mobile terminal 8300 and a server. For example, the communication unit 8310 may include a short-range wireless communication unit 8311, a mobile communication unit 8312, and a broadcasting receiving unit 8313.

The short-range wireless communication unit 8311 may include a Bluetooth communication unit, a Bluetooth low energy (BLE) communication unit (e.g., BLE communicator), a near field communication (NFC)/RFID unit (e.g., near field communicator), a wireless local access network (WLAN) (Wi-Fi) communication unit (e.g., WLAN communicator), a Zigbee communication unit (e.g., Zigbee communicator), an infrared data association (IrDA) communication unit (e.g., IrDA communicator), a Wi-Fi direction (WFD) communication unit (e.g., WFD communicator), an ultra wideband (UWB) communication unit (e.g., UWB communicator), or an Ant+ communication unit (e.g., Ant+ communicator), but is not limited thereto.

The mobile communication unit 8312 may include a 3G communication unit (E.g. 3G communicator) and/or a 4G communication unit (E.g. 4G communicator), but is not limited thereto. The mobile communication unit 8312 may transmit and receive a wireless signal with at least one selected from a base station, an external terminal, and a server via a mobile communication network. The wireless signal may include a voice call signal, a video call signal, or various types of data according to text or multimedia message transmission and reception.

The broadcasting receiving unit 8313 may receive broadcasting signals and/or broadcasting-related information from the outside via a broadcasting channel. The broadcasting channel may include a satellite channel and a terrestrial channel. According to various exemplary embodiments, the mobile terminal 8300 may not include the broadcasting receiving unit 8313.

The communication unit 8310 may communicate with a plurality of wearable devices. The communication unit 8310 may receive, from the wearable devices, information about executable operations of the wearable devices. The communication unit 8310 may receive, from the wearable devices, capability information about the wearable devices.

The communication unit 8310 may transmit, to the wearable devices, information about operations to be performed by the wearable devices. The information about the operations may include an operation execution request and/or data for performing the operations.

The communication unit 8310 may receive pulse information, electrocardiogram (ECG) information, and temperature information from an external wearable device. For example, the mobile terminal 8300 may receive pulse information and temperature information from a smart watch.

The memory 8320 may store programs for processing and control of the processor 8330 and may store input data or output data. For example, the memory 8320 may store applications and multimedia content. In addition, the memory 8320 may store information about operations for executing a function of the mobile terminal 8300. The memory 8320 may store mapping information about operations for executing the function of the mobile terminal 8300 and the wearable devices that are to perform the operations. The memory 8320 may store capability information about the wearable devices.

The memory 8320 may include at least one storage medium selected from among a flash memory, a hard disk, a multimedia card micro type memory, a card type memory (for example, SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. In addition, the mobile terminal 8300 may operate a web storage or a cloud server that performs the storage function of the memory 8320 on the Internet.

The programs, stored in the memory 8320, may be classified into a plurality of modules according to functions. For example, the programs may be classified into a UI module 8321, a touch screen module 8322, a notification module 8323, and a speak-to-text (STT) module 8324.

The UI module 8321 may provide a specialized UI or GUI that interworks with the mobile terminal 8300 according to applications. The touch screen module 8322 may detect a touch gesture of a user on a touch screen and transmit information about the touch gesture to the processor 8340. According to an exemplary embodiment, the touch screen module 8322 may recognize and analyze touch codes. The touch screen module 8322 may be implemented with separate hardware including a controller.

Various types of sensors may be disposed inside or near the touch screen so as to sense a touch on the touch screen or a hovering above the touch screen. An example of the sensor for sensing the touch on the touch screen may be a tactile sensor. The tactile sensor may sense a touch of a specific object with a greater sensitivity than sensitivity of human touch. The tactile sensor may sense a variety of information, such as the roughness of the touch surface, the hardness of the touch object, and the temperature of the touch point.

In addition, an example of the sensor for sensing the touch on the touch screen may be a proximity sensor.

The proximity sensor may be a sensor that uses an electromagnetic force or infrared light to sense the presence or absence of an object approaching a predetermined detection surface or an object existing near the sensor, without any mechanical contact. Examples of the proximity sensor may include a transmission-type photoelectric sensor, a direct reflection-type photoelectric sensor, a mirror reflection-type photoelectric sensor, a radio frequency oscillation-type proximity sensor, an electrostatic capacitance-type proximity sensor, a magnetic-type proximity sensor, and an infrared proximity sensor. Touch gestures of the user may include a tap, a touch and hold, a double-tap, a drag, a panning, a flick, a drag-and-drop, a swipe, and the like.

The notification module 8323 may generate a signal for notifying an event occurring in the mobile terminal 8300. Examples of the event occurring in the mobile terminal 8300 may include a call signal reception, a message reception, a key signal input, and a schedule notification. The notification module 8323 may output a notification signal through the display unit 8351 in the form of a video signal. The notification module 8323 may output a notification signal through the audio output unit 8352 in the form of an audio signal. The notification module 8323 may output a notification signal through a vibration motor 8353 in the form of a vibration signal.

The STT module 8324 may convert a voice included in multimedia content into a text to generate a transcript corresponding to the multimedia content. The transcript may be mapped to information about a playback time of the multimedia content.

A content storage module 8325 may include at least one type of content. The content storage module 8325 may store multimedia content. The content storage module 8325 may store multimedia content to be played back in the mobile terminal 8300 or at least one wearable device. The multimedia content may include text data, still image and/or moving image data, audio data, and the like.

The processor 8330 may include a CPU (Central processing Unit), an AP (Application Processor) and/or an APU (Accelerated Processing Unit), but is not limited thereto. For example, the processor 8330 may include an ARM processor, an Intel processor and/or an AMD processor, but is not limited thereto. The processor 8330 may control an overall operation of the mobile terminal 8300. For example, the processor 8330 may control the output unit 8350, the user input unit 8340, the communication unit 8310, the sensing unit 8360, and the A/V input unit 8370 by executing the programs stored in the memory 8320.

The processor 8330 may recognize connections of a first wearable device and a second wearable device that are to perform operations by using the mapping information stored in the memory 8320. When the connection of the second wearable device is recognized, the processor 8330 may control the communication unit 8310 to transmit, to the first wearable device, information for performing an operation that is performed together with an operation to be performed by the second wearable device so as to execute the function of the mobile terminal 8300.

When the connection of the second wearable device is not recognized, the processor 8330 may control the communication unit 8310 to transmit, to the first wearable device, information for performing an operation that is performed, without an operation of the second wearable device, so as to execute the function of the mobile terminal 8300.

The processor 8330 may control the communication unit 8310 to transmit, to the first wearable device, information about a UI for executing the function of the mobile terminal 8300.

The processor 8330 may use the mapping information to determine a wearable device, which is capable of performing the operation for executing the function of the mobile terminal 8300, as a wearable device that is to perform the operation.

The processor 8330 may use device performance information and minimum performance information to determine a wearable device that is to perform the operation for executing the function of the mobile terminal 8300. The mapping information may include device performance information about the wearable device and minimum performance information required for performing the operation for executing the function of the mobile terminal 8300.

The processor 8330 may use the device performance information and the minimum performance information to determine a wearable device, which is capable of performing an operation with performance required for the operation of executing the function of the mobile terminal 8300, as a wearable device that is to perform the operation.

The processor 8330 may use the device performance information and the minimum performance information to determine a wearable device that is to execute a UI for executing the function of the mobile terminal 8300.

The processor 8330 may control the operation to be performed by the second wearable device by using operation execution result data of the first wearable device, which is received from the first wearable device.

The processor 8330 may recognize connections of the first wearable device and the second wearable device, which are to perform the operations, by using the mapping information stored in the memory 8320. When the connection of the second wearable device is recognized, the processor 8330 may control the communication unit 8310 to transmit, to the first wearable device, information for executing a UI that is performed together with an audio output operation to be performed by the second wearable device so as to execute the function of the mobile terminal 8300. When the connection of the second wearable device is not recognized, the processor 8330 may control the communication unit 8310 to transmit, to the first wearable device, information for performing a UI which is performed, without the audio output operation of the second wearable device, so as to execute the function of the mobile terminal 8300.

The processor 8330 may determine a first wearable device, which is to perform a first operation for executing the function of the mobile terminal 8300, and a second wearable device, which is to perform a second operation performed together with the first operation so as to execute the function of the mobile terminal 8300, by using the capability information about the plurality of wearable devices, which is stored in the memory 8320. The processor 8330 may control the communication unit 8310 to transmit information about the first operation to the first wearable device and transmit information about the second operation to the second wearable device, by using the information about the determined devices.

The user input unit 8340 may be a unit that allows the user to input data for controlling the mobile terminal 8300. For example, the user input unit 8340 may include a key pad, a dome switch, a touch pad (a touch-type capacitive touch pad, a pressure-type resistive touch pad, an infrared beam sensing type touch pad, a surface acoustic wave type touch pad, an integral strain gauge type touch pad, a piezo effect type touch pad, or the like), a jog wheel, and a jog switch, but is not limited thereto.

The output unit 8350 may output an audio signal, a video signal, or a vibration signal. The output unit 8350 may include a display unit 8351 (e.g., display), an audio output unit 8352 (e.g., audio outputter), and a vibration motor 8353.

The display unit 8351 may display information processed by the mobile terminal 8300. In a case where the display unit 8351 and a touch pad form a layered structure to constitute a touch screen, the display unit 8351 may also be used as an input device as well as an output unit. The display unit 8351 may include at least one selected from among a liquid crystal display (LCD), a thin-film transistor-liquid crystal display (TFT-LCD), an organic light-emitting diode (OLED), a flexible display, a 3D display, and an electrophoretic display. According to implementations of the mobile terminal 8300, the mobile terminal 8300 may include two or more display units 8351.

The audio output unit 8352 may output audio data received from the communication unit 8310 or audio data stored in the memory 8320. In addition, the audio output unit 8352 may output an audio signal related to the functions performed by the mobile terminal 8300 (for example, a call signal reception sound, a message reception sound, and a notification sound). The audio output unit 8352 may include a speaker, a buzzer, or the like.

The vibration motor 8353 may output a vibration signal. For example, the vibration motor 8353 may output a vibration signal which corresponds to an output of audio data or video data (for example, a call signal reception sound, a message reception sound, or the like). In addition, the vibration motor 8353 may output a vibration signal when a touch is input to a touch screen.

The sensing unit 8360 may sense a state of the mobile terminal 8300 or a state around the mobile terminal 8300 and transfer the sensed information to the processor 8330.

The sensing unit 8360 may include at least one selected from among a geomagnetic sensor 8361, an acceleration sensor 8362, a temperature/humidity sensor 8363, an infrared sensor 8364, a gyroscope sensor 8365, a position sensor (for example, GPS) 8366, a pressure sensor 8367, a proximity sensor 8368, and an RGB sensor (illuminance sensor) 8369, but is not limited thereto. Since the functions of the respective sensors may be intuitively inferred from the names of the sensors, a detailed description thereof will be omitted.

The A/V input unit 8370 may enable the user to input audio or video signals and may include a camera 8371 and a microphone 8372. The camera 8371 may obtain an image frame, such as a still picture or a moving picture, through an image sensor in a video phone mode or a photographing mode. An image captured through the image sensor may be processed through the processor 8330 or a separate image processor (not illustrated).

The image frame processed in the camera 8371 may be stored in the memory 8320 or may be transmitted to the outside through the communication unit 8310. The A/V input unit 8370 may include two or more cameras 8371 according to the configuration of the mobile terminal 8300.

The microphone 8372 may receive external audio signals and process the external audio signals into electrical voice data. For example, the microphone 8372 may receive audio signals from an external device or a person who speaks. The microphone 8372 may use various noise removal algorithms for removing noise generated in the process of receiving external audio signals.

Figure 85:
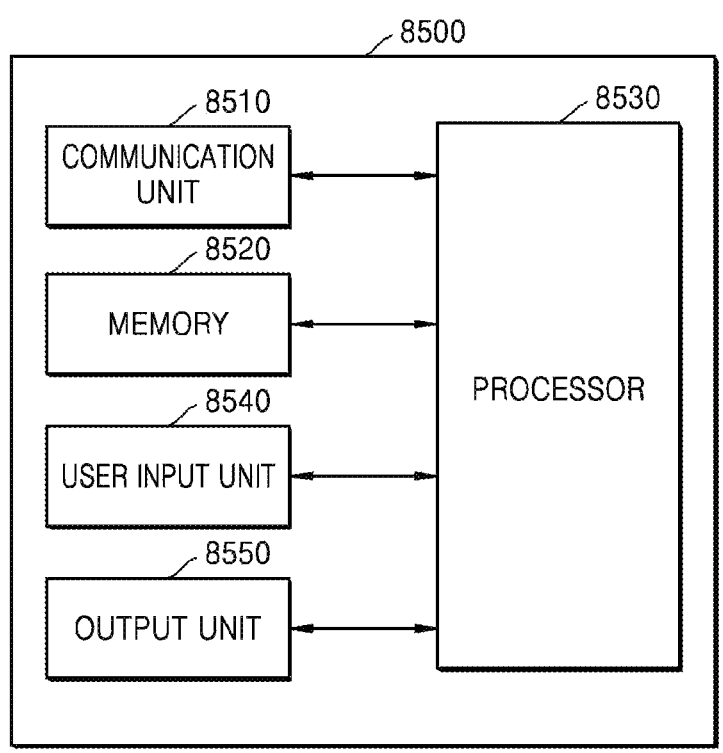
FIGS. 85, 86 and 87 are block diagrams for describing a configuration of a wearable device according to an exemplary embodiment.
Figure 86:
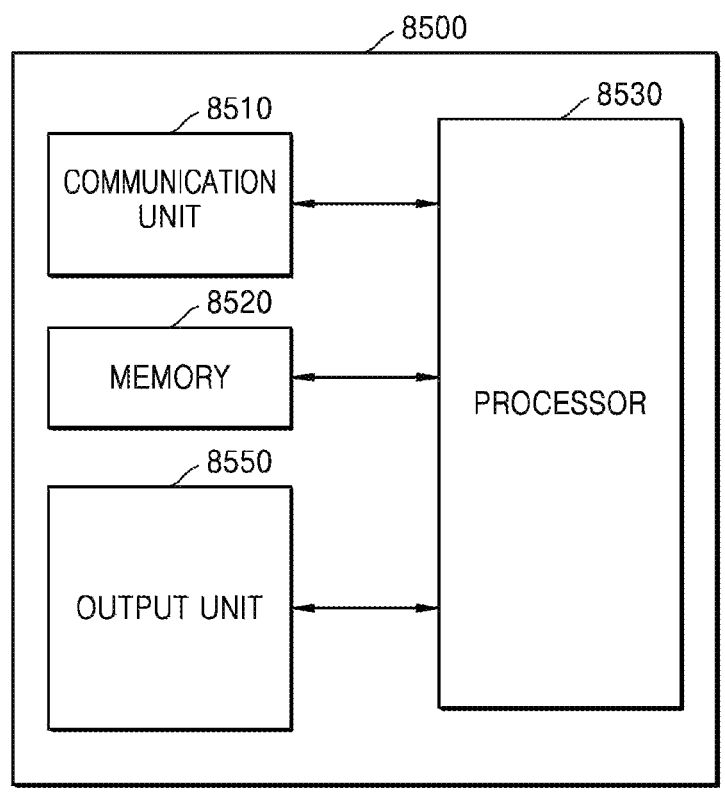
Figure 87:
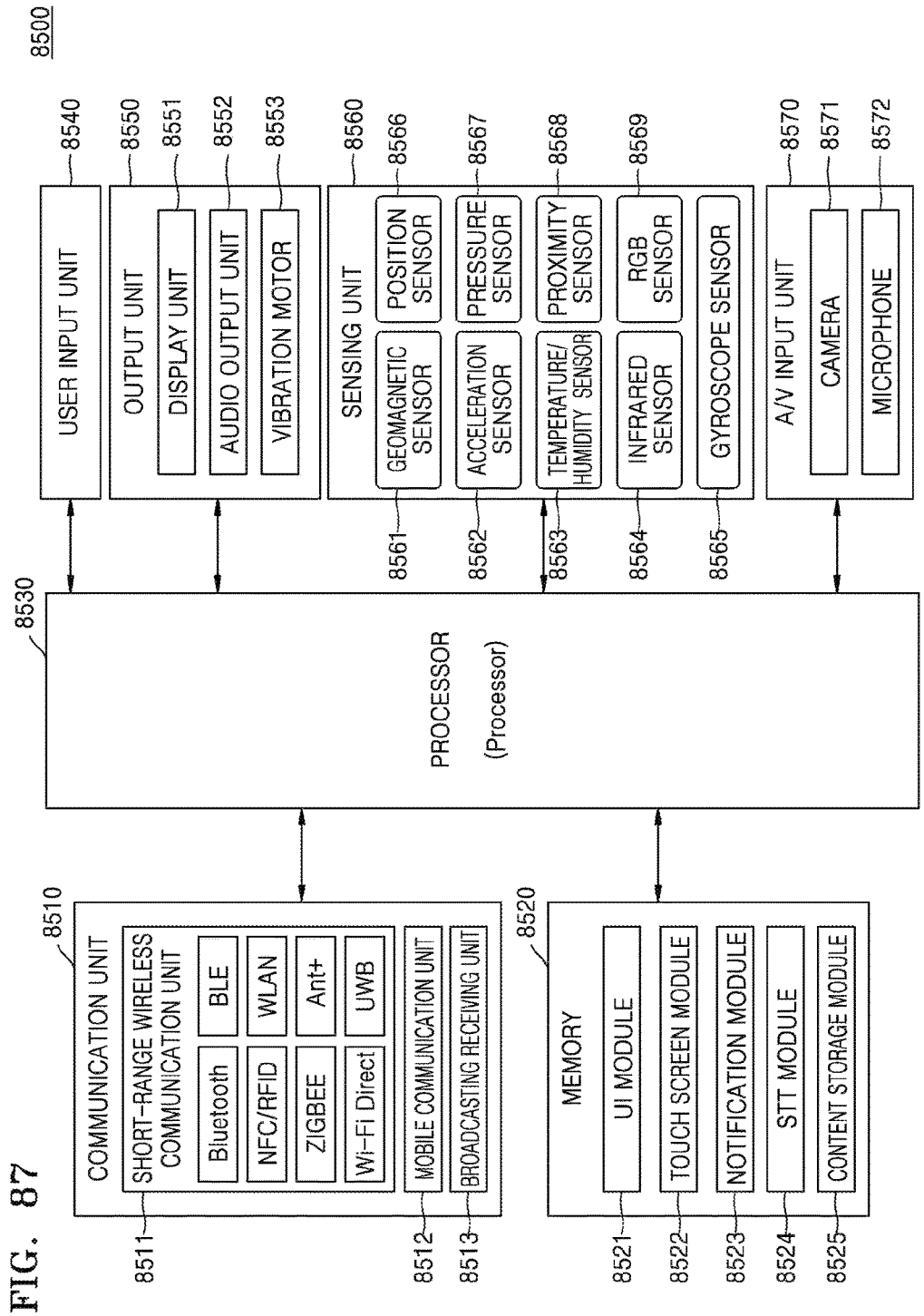

FIGS. 85 to 87 are block diagrams for describing a configuration of a wearable device 8500 according to an exemplary embodiment.

As illustrated in FIG. 85, the wearable device 8500 according to an exemplary embodiment may include a communication unit 8510 (e.g., communicator), a memory 8520, a processor 8530, a user input unit 8540 (e.g., user inputter), and an output unit 8550 (e.g., outputter). However, all of the illustrated elements in FIG. 85 are not essential elements. For example, as illustrated in FIG. 86, the user input unit 8540 may be omitted. Thus, the wearable device 8500 may be implemented with a smaller number of elements than those illustrated in FIG. 85. As illustrated in FIG. 87, the wearable device 8500 may be implemented with a larger number of elements than those illustrated in FIG. 85.

For example, as illustrated in FIG. 87, the wearable device 8500 according to an exemplary embodiment may include a user input unit 8540 (e.g., user inputter), an output unit 8550 (e.g., outputter), a sensing unit 8560 (e.g., sensor), and an A/V input unit 8570 (A/V inputter), as well as the communication unit 8510 (e.g., communicator), the memory 8520, and the processor 8530. The elements of the wearable device 8500 may be substantially the same as those of the mobile terminal 8300, or the elements of the elements of the wearable device 8500 may correspond to those of the mobile terminal 8300 but differ in certain respects. Hereinafter, the elements of the wearable device 8500, which are different from the elements of the mobile terminal 8300, will be described.

The communication unit 8510 may include one or more elements for communication between the wearable device 8500 and the mobile terminal 8500. For example, the communication unit 8510 may include a short-range wireless communication unit 8511 (e.g., short-range wireless communicator), a mobile communication unit 8512 (e.g., mobile communicator), and a broadcasting receiving unit 8513 (e.g., broadcasting receiver).

The communication unit 8510 may receive, from the mobile terminal 8300, information for performing an operation according to connection information about whether wearable devices that are configured to perform operations for executing the function of the mobile terminal 8300 are connected to the mobile terminal 8300.

The communication unit 8510 may transmit, to the mobile terminal 8300, result data obtained by performing the operation according to the information for performing the operation. For example, the wearable device 8500 may transmit pulse information and temperature information to the mobile terminal 8300.

The processor 8530 may control an overall operation of the wearable device 8500. For example, the processor 8530 may control the output unit 8550, the user input unit 8540, the communication unit 8510, the sensing unit 8560, and the A/V input unit 8570 by executing the programs stored in the memory 8520.

Based on the information for performing the operation, the processor 8530 may control the communication unit 8510, the memory 8520, the user input unit 8540, the sensing unit 8560, and the A/V input unit 8570 to, when another wearable device is connected to the mobile terminal 8300, perform an operation that is performed together with an operation to be performed by the other wearable device so as to execute the function of the mobile terminal 8300 and, when another wearable device is not connected to the mobile terminal 8300, perform an operation that is performed, without the operation of the other wearable device, so as to execute the function of the mobile terminal 8300.

In addition, other exemplary embodiments can also be implemented through computer readable code or instructions in or on a medium, e.g., a computer readable medium, to control at least one processing element to implement any above described exemplary embodiment. The medium can correspond to any medium or type of media permitting the storage and/or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored or transferred and executed in a distributed fashion. Furthermore, the processing element could include a processor or a computer processor, and processing elements may be distributed and/or included in a single device.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device comprising:
    a communication interface configured to communicate with a first wearable device and a second wearable device and communicate with another electronic device to execute a call function; and
    a processor configured to:
        receive an external call acceptance request based on the call function,
        transmit a notification indicating the received external call acceptance request to the first wearable device,
        receive a call acceptance request from the first wearable device,
        start a call in response to the received call acceptance request,
        transmit audio output data received from the other electronic device to the second wearable device and receive audio input data from the second wearable device so as to transmit the audio input data to the other electronic device,
        transmit, to the first wearable device, data to configure a user interface which is used to control the call or display a state of the call during the call, and
        end the call when an end request requesting to end the call is received from one of the first wearable device and the second wearable device during the call,
    wherein the processor is further configured to identify, among a plurality of wearable devices, certain wearable devices having performance information exceeding minimum performance information based on a comparison of performance information of the plurality of wearable devices to the minimum performance information, the minimum performance information being known as a requirement to perform specific operation with the electronic device, and
    wherein the processor is configured to select wearable devices having performance information closest in value to the minimum performance information, among the certain wearable devices, as the first wearable device and the second wearable device.

2. The electronic device of claim 1, wherein the processor is further configured to determine the first wearable device and the second wearable device are usable for the call function based on whether the first wearable device and the second wearable device are worn by a user.

3. The electronic device of claim 1, wherein the notification includes data to configure a call connection user interface.

4. The electronic device of claim 3, wherein the data to configure the call connection user interface includes at least one of caller information, a call acceptance control, a call decline, and a message transfer.

5. The electronic device of claim 1, wherein the processor is further configured to transmit data to configure a user interface indicating receiving of the call to the first wearable device.

6. The electronic device of claim 5, wherein the data to configure the user interface indicating the receiving of the call includes at least one of caller information, an audio increase control, an audio decrease control, and a call end.

7. The electronic device of claim 1, wherein the processor is further configured to receive a call decline request from the first wearable device, and transmit data to configure a call decline user interface to the first wearable device.

8. The electronic device of claim 7, wherein the data to configure the call decline user interface includes at least one of caller information, a message transfer control, and a call decline control.

9. The electronic device of claim 1, further comprising:
a memory configured to store capability information of the first wearable device and the second wearable device;
wherein the processor is further configured to control the first wearable device and the second wearable device based on the capability information.

10. The electronic device of claim 1, wherein the processor is further configured to acquire situation information indicating whether at least one of the first wearable device and the second wearable device is currently being worn, and execute the call function according to communication between the first wearable device and the electronic device and communication between the second wearable device and the electronic device, based on the acquired situation information.

11. The electronic device of claim 1, wherein the first wearable device is a smart watch and the second wearable device is an earphone.

12. A communication method performed by an electronic device, the communication method comprising:
communicating, through a communication interface, with a first wearable device and a second wearable device;
receiving an external call acceptance request based on a call function which is executed to communicate with another electronic device;
transmitting a notification indicating the received external call acceptance request to the first wearable device;
receiving a call acceptance request from the first wearable device;
starting a call in response to the received call acceptance request;
transmitting audio output data received from the other electronic device to the second wearable device, and receiving audio input data from the second wearable device so as to transmit the audio input data to the other electronic device;
transmitting, to the first wearable device, data to configure a user interface which is used to control the call or display a state of the call during the call; and
ending the call when an end request requesting to end the call is received from at least one of the first wearable device and the second wearable device during the call,
wherein the communication method further comprises identifying, among a plurality of wearable devices, certain wearable devices having performance information exceeding minimum performance information based on a comparison of performance information of the plurality of wearable devices to the minimum performance information, the minimum performance information being known as a requirement to perform a specific operation with the electronic device, and
wherein the method further comprises selecting wearable devices having performance information closest in value to the minimum performance information, among the certain wearable devices, as the first wearable device and the second wearable device.

13. The communication method of claim 12, further comprising determining the first wearable device and the second wearable device are usable for the call function based on whether the first wearable device and the second wearable device are worn by a user.

14. The communication method of claim 12, wherein the notification includes data to configure a call connection user interface.

15. The communication method of claim 14, wherein the data to configure the call connection user interface includes at least one of caller information, a call acceptance control, a call decline, and a message transfer.

16. The communication method of claim 12, further comprising transmitting data to configure a user interface indicating receiving of the call to the first wearable device.

17. The communication method of claim 16, wherein the data to configure the user interface indicating the receiving of the call includes at least one of caller information, an audio increase control, an audio decrease control, and a call end.

18. The communication method of claim 12, further comprising:
receiving a call decline request from the first wearable device; and
transmitting data to configure a call decline user interface to the first wearable device.

19. The communication method of claim 18, wherein the data to configure the call decline user interface includes at least one of caller information, a message transfer control, and a call decline control.

20. The communication method of claim 12, further comprising:
storing capability information of the first wearable device and the second wearable device; and
controlling the first wearable device and the second wearable device based on the capability information.

21. The communication method of claim 12, further comprising:
acquiring situation information indicating whether at least one of the first wearable device and the second wearable device is currently being worn; and
executing the call function according to communication between the first wearable device and the electronic device and communication between the second wearable device and the electronic device, based on the acquired situation information.

22. The communication method claim 12, wherein the first wearable device is a smart watch and the second wearable device is an earphone.

23. A non-transitory computer readable recording medium having instructions stored thereon which, when executed, causes an electronic device to perform a communication method comprising:
communicating, through a communication interface, with a first wearable device and a second wearable device;
receiving an external call acceptance request based on a call function which is executed to communicate with another electronic device;
transmitting a notification indicating the received external call acceptance request to the first wearable device;

receiving a call acceptance request from the first wearable device;

starting a call in response to the received call acceptance request;

transmitting audio output data received from the other electronic device to the second wearable device, and receiving audio input data from the second wearable device so as to transmit the audio input data to the other electronic device;

transmitting, to the first wearable device, data to configure a user interface which is used to control the call or display a state of the call during the call; and ending the call when an end request requesting to end the call is received from at least one of the first wearable device and the second wearable device during the call, wherein the communication method further comprises identifying, among a plurality of wearable devices, certain wearable devices having performance information exceeding minimum performance information based on a comparison of performance information of the plurality of wearable devices to the minimum performance information, the minimum performance information being known as a requirement to perform a specific operation with the electronic device, and wherein the method further comprises selecting wearable devices having performance information closest in value to the minimum performance information, among the certain wearable devices, as the first wearable device and the second wearable device.

24. The non-transitory computer readable recording medium of claim 23, wherein the communication method further comprises determining the first wearable device and the second wearable device are usable for the call function based on whether the first wearable device and the second wearable device are worn by a user.

* * * * *